United States Patent [19]
Doi

[11] Patent Number: 6,088,081
[45] Date of Patent: Jul. 11, 2000

[54] IMAGE RECORDING APPARATUS

[75] Inventor: Masato Doi, Hino, Japan

[73] Assignee: Konica Corporation, Tokyo, Japan

[21] Appl. No.: 09/042,872

[22] Filed: Mar. 17, 1998

[30] Foreign Application Priority Data

| Mar. 27, 1997 | [JP] | Japan | 9-074853 |
| Mar. 27, 1997 | [JP] | Japan | 9-075248 |
| Mar. 31, 1997 | [JP] | Japan | 9-080459 |
| Aug. 27, 1997 | [JP] | Japan | 9-230918 |

[51] Int. Cl.$^7$ .............. G03B 27/58; G03B 27/52
[52] U.S. Cl. .............................. 355/47; 355/27
[58] Field of Search .................. 355/27–29, 40, 355/41, 407, 84–85; 358/296, 300; 399/303–305; 347/250

[56] References Cited

U.S. PATENT DOCUMENTS

| 4,466,578 | 8/1984 | Shibuya et al. | 242/65 |
| 4,825,074 | 4/1989 | Yoshikawa | 250/317.1 |
| 4,863,543 | 9/1989 | Shiozawa et al. | 156/235 |
| 4,874,456 | 10/1989 | Takagi | 156/471 |
| 5,149,082 | 9/1992 | Morita | 271/276 |
| 5,249,026 | 9/1993 | Kojima | 355/327 |
| 5,329,301 | 7/1994 | Balzeit et al. | 346/134 |
| 5,442,426 | 8/1995 | Yamamura et al. | 355/256 |
| 5,879,505 | 3/1999 | Fujisawa et al. | 156/374 |
| 5,911,100 | 6/1999 | Hasegawa et al. | 399/303 |

Primary Examiner—Safet Metjahic
Assistant Examiner—Hung Henry Nguyen
Attorney, Agent, or Firm—Cantor Colbun LLP

[57] ABSTRACT

In an image recording apparatus for recording an image on a recording sheet wound around a circumferential surface of a drum rotatable while retaining the recording sheet wound around the circumferential surface thereof, the drum is provided with a plurality of through holes to suck the recording sheet, connecting grooves to connect among the plurality of holes provided on the circumferential surface, and a leading end supply section to which the leading end of the recording sheet is supplied, wherein the connecting grooves shaped in parallel to the leading end of the recording sheet are not provided to the leading end supply section, and a drum controller controls the position of the circumferential surface of the drum so as to supply the leading end of the recording sheet to the leading end supply section when the recording sheet is supplied to the drum.

46 Claims, 34 Drawing Sheets

IMAGE RECORDING APPARATUS

BACKGROUND OF THE INVENTION

The present invention relates to an image recording apparatus wherein an image is recorded on a recording sheet wound around a drum to cover its circumferential surface.

There has been known an image recording apparatus wherein an image is recorded on a recording sheet such as a recording paper which is wound, with its recording surface facing outward, around a drum to cover its circumferential surface.

For example, there are given those wherein the recording sheet is a silver halide photographic light-sensitive material and laser exposure is used for recording an image and those wherein the recording sheet is a thermosensitive paper and laser exposure is used for recording an image.

In these image recording apparatuses, a method to exfoliate the recording sheet wound around a drum after image recording has been one wherein grooves are provided on the circumferential surface of the drum to be in parallel with the direction of drum rotation and exfoliation claws (peeling claws) are brought into contact with the grooves to exfoliate or peel the recording sheet from the drum.

As a method to fix on a drum a recording sheet wound around the drum, there has been known a method wherein a recording sheet is fixed on the circumferential surface of the drum by means of vacuum suction which is performed through a plurality of through-holes provided on the circumferential surface of the drum. On the circumferential surface of the drum, there are provided suction-communicating grooves through which the through holes are communicated or connected with each other so that the entire surface of the recording sheet on the circumferential surface of the drum may be attracted uniformly.

When a recording sheet is supplied to a drum to be wound around the drum, the leading edge of the recording sheet needs to be positioned on the circumferential surface of the drum. As a method of the positioning, there have been known a method to position by means of a roller which is pressed on the drum surface, and a method wherein a positioning member which nips a recording sheet is provided at the prescribed position on the drum for positioning.

As the latest trend in an image recording apparatus, the speed of revolution of a drum is accelerated for the purpose of shortening the time required for image recording. In addition, for the purpose of obtaining high image quality of the recorded image, a recording sheet such as a recording paper needs to be fixed on the drum surface smoothly.

However, when a conventional drum equipped with grooves which are to be touched by exfoliation claws and are in parallel with the rotary direction of the drum is rotated at high speed, the grooves which are to be touched by exfoliation claws serve as a path for the high speed air flow, resulting in occurrence of swelled portions each having a width identical mostly to that of the groove. Therefore, unevenness is caused on the recording sheet, and image quality is lowered accordingly. Further, when the swelling of the recording sheet is increased, negative pressure for suction through the through-holes on the drum is deteriorated, resulting in apprehensions that the recording sheet would come off the drum.

There is further a problem that when supplying a recording sheet to the drum, a leading edge of the recording sheet enters a conventional suction-communicating groove provided on the drum and the recording sheet fails to be supplied.

With regard to positioning of the leading edge of a recording sheet on the circumferential surface of a drum, a leading edge regulating member such as a roller or a positioning member is brought into contact with the drum in the conventional method. Therefore, the structure is complicated and further, adjustment is necessary in assembling.

The invention has been attained in view of the problems mentioned above.

The first object of the invention is to prevent occurrence of unevenness on the recording sheet surface and accidental swelling of the recording sheet, and to realize stable fixing of the recording sheet on the drum, and thereby to obtain outputted images having high image quality.

Further, the object is to make it possible to supply a recording sheet to a drum by preventing erroneous supply of the recording sheet to the drum, to make it possible to realize surely, with a simple structure, the positioning of the leading edge of the recording sheet on the circumferential surface of the drum, and to make the fixing of the recording sheet on the drum to be certain.

There has been known an image recording apparatus wherein a drum is rotated at a low-speed to make the recording sheet on which images are recorded to be wound around the drum to cover, on a close contact basis, the outer circumferential surface of the drum by a squeeze roller, then the drum is rotated at a high-speed to write images, and the drum is rotated at a low-speed to supply and eject a recording sheet.

In this image recording apparatus, a mechanism for low-speed rotation needs to be separated when high-speed rotation is made, resulting in the complicated mechanism, because a drum has been switched for high-speed rotation and low-speed rotation.

The second object of the invention is to provide an image forming apparatus wherein a drum can be rotated at a low-speed by a simple mechanism when supplying and ejecting a recording sheet, and to provide an image forming apparatus wherein a squeeze roller can surely be driven from a drum, or a drum can surely be driven from a squeeze roller.

There has been known an image recording apparatus wherein when supplying a recording sheet to a drum, the leading edge of the recording sheet is positioned by a positioning member provided on the drum side, and the recording sheet is exfoliated after completion of writing of images on the recording sheet.

In the image recording apparatus mentioned above, however, in the case of a positioning member located on the part of a drum, when the drum is rotated at a high-speed, dynamic imbalance is easily caused to cause a vibration, and the positioning member is hard to be machined, and it is difficult to position accurately the center of gravity of the drum on the rotary shaft of the drum.

The object of the invention is to provide an image forming apparatus wherein rotation of a drum at a high-speed is stabilized, and thereby the leading edge of a recording sheet can be positioned accurately.

As an image recording apparatus to record images on a recording sheet, there has been known one wherein a recording sheet is wound around a rotary drum and images are formed on the recording sheet wound around the rotary drum. In particular, there has been known one wherein a rotary drum which is hollow and is provided with plural holes each being passing through from the circumferential surface to the inside and rotates while holding the wound recording sheet, and a decompressing means which decompresses the inside of the rotary drum are provided, and the recording sheet wound around the rotary drum to cover its circumferential surface is brought into close contact with the rotary drum by decompression of the decompressing means so that images are recorded on the recording sheet.

In an image recording apparatus of this type, depending on a size of a recording sheet, suction force by means of the decompressing means applied on the recording sheet is varied as an edge position of the recording sheet is deviated from the regular position, or in accordance with the pressure inside the drum, and depending upon the speed of revolution of the drum, centrifugal force applied on the recording sheet and exfoliating force caused by an air current exceed the suction force to exfoliate the recording sheet from the rotary drum, which is a problem.

The fourth object of the invention is one to solve the problems mentioned above, which is to increase sharply the number of sizes of the recording sheet which can be selected by keeping the well balance between the suction force by means of the decompressing means which varies depending on the size of a recording sheet and is applied on the recording sheet and a group of centrifugal force which varies depending on the speed of revolution of the rotary drum and is applied on the recording sheet and exfoliating force caused by an air current and without lowering quality of recorded images.

SUMMARY OF THE INVENTION

The first object of the invention can be attained by following Items 1–32.

Item 1

An image recording apparatus to record images on a recording sheet wound around a drum to cover its circumferential surface, wherein there is provided an exfoliating member which exfoliates the recording sheet from the drum circumferential surface by coming in contact with the sheet surface of the recording sheet wound around the drum circumferential surface from the outside of the drum circumferential surface.

Since the recording sheet is exfoliated from the drum by the exfoliating member which comes in contact with the recording sheet surface from the outside of the drum circumferential surface and holds the recording sheet, it is not necessary to machine the drum circumferential surface to make thereon the grooves for exfoliation, making the cost reduction possible. Further, by eliminating grooves for exfoliation on the drum circumferential surface, it is possible to obtain stably the finished images with high quality and to prevent exfoliation of the recording sheet from the drum in the course of image recording due to improvement of close contact between the drum and the recording sheet in the course of drum rotation, thus stability can be improved.

The foregoing is effective especially in the case of an image recording apparatus for recording images by rotating the drum at a high-speed.

Item 2

The image recording apparatus described in Item 1, wherein the exfoliating member is one to exfoliate, through its adhesion, the recording sheet wound around the drum circumferential surface from the drum circumferential surface.

Since the recording sheet is exfoliated from the drum by an adhesive exfoliating member, it is not necessary to machine the drum circumferential surface to make thereon the grooves for exfoliation, making the cost reduction possible. Further, by eliminating grooves for exfoliation on the drum circumferential surface, it is possible to obtain stably the finished images with high quality and to prevent exfoliation of the recording sheet from the drum in the course of image recording due to improvement of close contact between the drum and the recording sheet in the course of drum rotation, thus stability can be improved.

The foregoing is effective especially in the case of an image recording apparatus for recording images by rotating the drum at a high-speed.

Item 3

The image recording apparatus described in Item 1, wherein the exfoliating member is one to exfoliate, through electrostatic attraction, the recording sheet wound around the drum circumferential surface from the drum circumferential surface.

Since the recording sheet is exfoliated from the drum by an exfoliating member utilizing electrostatic attraction, it is not necessary to machine the drum circumferential surface to make thereon the grooves for exfoliation, making the cost reduction possible. Further, by eliminating grooves for exfoliation on the drum circumferential surface, it is possible to obtain stably the finished images with high quality and to prevent exfoliation of the recording sheet from the drum in the course of image recording due to improvement of close contact between the drum and the recording sheet in the course of drum rotation, thus, stability can be improved.

The foregoing is effective especially in the case of an image recording apparatus for recording images by rotating the drum at a high-speed.

Exfoliation of the recording sheet from the exfoliating member can also be conducted easily by releasing the electrostatic attraction.

Item 4

The image recording apparatus described in Item 1, wherein the exfoliating member is one to exfoliate, through its vacuum suction, the recording sheet wound around the drum circumferential surface from the drum circumferential surface.

Since the recording sheet is exfoliated from the drum by an exfoliating member utilizing vacuum suction, it is not necessary to machine the drum circumferential surface to make thereon the grooves for exfoliation, making the cost reduction possible. Further, by eliminating grooves for exfoliation on the drum circumferential surface, it is possible to obtain stably the finished images with high quality and to prevent exfoliation of the recording sheet from the drum in the course of image recording due to improvement of close contact between the drum and the recording sheet in the course of drum rotation, thus stability can be improved.

The foregoing is effective especially in the case of an image recording apparatus for recording images by rotating the drum at a high-speed.

Exfoliation of the recording sheet from the exfoliating member can also be conducted easily and in a short period of time by releasing the vacuum suction, making it possible to shorten the time for exfoliation.

Item 5

The image recording apparatus described in either one of Items 1–4, wherein the recording sheet wound around the drum circumferential surface is exfoliated from the drum by bringing the exfoliating member into contact with an edge of the recording sheet.

Exfoliation conducted by bringing the exfoliating member into contact with an edge of the recording sheet makes it possible to exfoliate smoothly in a small space and to guide the recording sheet which has been exfoliated to an ejection path easily.

Item 6

The image recording apparatus described in either one of Items 1–5, wherein the exfoliating member is an exfoliating roller.

A roller used as an exfoliating member makes it possible to press on a broad area of the recording sheet on the drum circumferential surface easily, and to realize close contact. In addition, it is also possible to realize a simple conveyance mechanism for the exfoliated recording sheet.

Item 7

An image recording apparatus to record images on a recording sheet wound around the drum circumferential surface, wherein there are provided an exfoliating roller which comes in contact with the recording sheet wound around the drum circumferential surface to exfoliate the recording sheet from the drum, and an auxiliary exfoliating member which touches the recording sheet which has been exfoliated by the exfoliating roller and is in contact with the exfoliating roller to exfoliate the recording sheet from the exfoliating roller.

Since the recording sheet is exfoliated from the drum through the exfoliating roller, it is not necessary to machine the drum circumferential surface to make thereon the grooves for exfoliation, making the cost reduction possible. Further, by eliminating grooves for exfoliation on the drum circumferential surface, it is possible to obtain stably the finished images with high quality and to prevent exfoliation of the recording sheet from the drum in the course of image recording due to improvement of close contact between the drum and the recording sheet in the course of drum rotation, thus, stability can be improved.

The foregoing is effective especially in the case of an image recording apparatus for recording images by rotating the drum at a high-speed.

Item 8

The image recording apparatus described in Item 7 wherein the exfoliating roller is provided on its circumferential surface with grooves which are mostly in parallel with the rotation direction of the exfoliating roller, the auxiliary exfoliating member is provided with a projection which can be inserted into the groove on the exfoliating roller, and the auxiliary exfoliating member inserts its projection into the groove on the exfoliating roller and thereby exfoliates the recording sheet from the exfoliating roller.

The recording sheet can be exfoliated from the exfoliating roller easily and surely, and exfoliation of the recording sheet from the exfoliating roller can be conducted without switching the suction power of the exfoliating roller.

Item 9

The image recording apparatus described in Item 7 or Item 8, wherein the exfoliating roller is a tandem roller, and the auxiliary exfoliating member is a crenelated guide having thereon a crenelated edge which can engage with a crenel on the tandem roller.

The tandem roller used as an exfoliating roller makes it unnecessary to machine the exfoliating roller circumferential surface to make thereon the grooves, and the crenelated guide which has the pattern that is in inverse relation to that of the tandem roller and serves as an exfoliating member makes the standby function of the exfoliating member to be unnecessary, which makes the cost reduction possible. In addition, the aforesaid structure is more durable than the exfoliating member which exfoliates the recording sheet by touching the drum.

The recording sheet can be exfoliated from the exfoliating roller easily and surely, and exfoliation of the recording sheet from the exfoliating roller can be conducted without switching the suction power of the exfoliating roller.

Item 10

An image recording apparatus to record images on a recording sheet wound around the drum circumferential surface, wherein an exfoliation/squeeze combination roller is provided, and when exfoliating the recording sheet wound around the drum circumferential surface, the exfoliation/squeeze combination roller is brought into contact with the recording sheet wound around the drum circumferential surface to exfoliate the recording sheet, while when supplying the recording sheet to the drum, the exfoliation/squeeze combination roller is brought into contact with the recording sheet on the drum circumferential surface so that the recording sheet may be brought into close contact with the drum circumferential surface.

Since the exfoliating roller serves also as the squeeze roller, the structure can be made simple, and the recording sheet can be brought into close contact with the drum, resulting in an improvement in quality of finished images.

Item 11

The image recording apparatus described in Item 10, wherein, when exfoliating the recording sheet wound around the drum circumferential surface from the drum, the recording sheet is exfoliated through electrostatic attraction of the exfoliation/squeeze combination roller, while when supplying the recording sheet to the drum, the electrostatic attraction of the exfoliation/squeeze combination roller is released and the recording sheet is brought into close contact with the drum circumferential surface.

Since the exfoliating roller serves also as the squeeze roller, the structure can be made simple, and the recording sheet can be brought into close contact with the drum, resulting in further improvement in quality of finished images.

In the foregoing, control is easy because it is possible to control with the electrostatic attraction.

Item 12

The image recording apparatus described in Item 10, wherein, when exfoliating the recording sheet wound around the drum circumferential surface from the drum, the recording sheet is exfoliated through vacuum suction of the exfoliation/squeeze combination roller, while when supplying the recording sheet to the drum, the vacuum suction of the exfoliation/squeeze combination roller is released and the recording sheet is brought into close contact with the drum circumferential surface.

Since the exfoliating roller serves also as the squeeze roller, the structure can be made simple, and the recording sheet can be brought into close contact with the drum, resulting in further improvement in quality of finished images.

In the foregoing, control is easy because it is possible to control with the vacuum suction.

Item 13

The image recording apparatus described in Item 10, wherein, when exfoliating the recording sheet wound around the drum circumferential surface from the drum, the recording sheet is exfoliated through vacuum suction of the exfoliation/squeeze combination roller, while when supplying the recording sheet to the drum, air is jetted from the circumferential surface of the exfoliation/squeeze combination roller so that the recording sheet may be brought into close contact with the drum circumferential surface.

Since the exfoliating roller serves also as the squeeze roller, the structure can be made simple, and the recording sheet can be brought into close contact with the drum, resulting in further improvement in quality of finished images.

In the foregoing, control is easy because it is possible to control with the vacuum suction.

Further, in the foregoing, it is possible to obtain greater squeeze effect by jetting air from the exfoliating roller, when winding the recording sheet around the drum.

Due to this, creases on the recording sheet caused in the course of winding around the drum can be prevented by a simple structure.

Item 14

An image recording apparatus to record images on a recording sheet wound around the drum circumferential surface, wherein there are provided an exfoliating roller which exfoliates, through electrostatic attraction, the recording sheet wound around the drum circumferential surface and a conveyance roller which conveys the recording sheet while being paired with the exfoliating roller, and when exfoliating the recording sheet wound around the drum circumferential surface from the drum, the exfoliating roller is brought into contact with the recording sheet wound around the drum circumferential surface and thereby the recording sheet is exfoliated by means of the electrostatic attraction, while when the recording sheet is nipped between the exfoliating roller and the conveyance roller, the electrostatic attraction of the exfoliating roller is released.

In the foregoing, the conveyance roller facing the exfoliating roller makes it possible to realize the conveyance of the recording sheet exfoliated from the drum with a simple structure, and it makes the conveyance to be sure because suction by the exfoliating roller is released after the recording sheet has been nipped between the rollers.

In the foregoing, control is easy because it is possible to control with the electrostatic attraction.

Item 15

An image recording apparatus to record images on a recording sheet wound around the drum circumferential surface, wherein there are provided an exfoliating roller which exfoliates, through vacuum suction, the recording sheet wound around the drum circumferential surface, and a conveyance roller which conveys the recording sheet while being paired with the exfoliating roller, and when exfoliating the recording sheet wound around the drum circumferential surface from the drum, the exfoliating roller is brought into contact with the recording sheet wound around the drum circumferential surface and thereby the recording sheet is exfoliated by means of the vacuum suction, while when the recording sheet is nipped between the exfoliating roller and the conveyance roller, the vacuum suction of the exfoliating roller is released.

In the foregoing, control is easy because it is possible to control with the vacuum suction.

Item 16

The image recording apparatus described in Item 14 or Item 15, wherein the conveyance roller is movable and it makes the exfoliating roller to be capable of being released from its pressure contact.

Since the pressure contact between the exfoliating roller and the conveyance roller is possible, an edge portion of the recording sheet exfoliated from the drum can be conveyed surely, further, the edge portion of the recording sheet can be prevented from being folded, and the degree of freedom is increased for the position (dimension from the edge of the recording sheet to the portion of suction) of the recording sheet sucked by the exfoliating roller when the recording sheet is exfoliated from the drum.

Item 17

An image recording apparatus to record images on a recording sheet wound around the drum circumferential surface, wherein an exfoliating means which touches the recording sheet wound around the drum circumferential surface to exfoliate the recording sheet from the drum is provided, and the drum is one which causes the recording sheet to be wound around the drum circumferential surface by vacuum suction, and when exfoliating the recording sheet from the drum, the vacuum suction of the drum is released.

Due to the releasing of the vacuum suction of the drum made after the exfoliating means has held the recording sheet, the recording sheet can be transferred surely from the drum to the exfoliating means, and due to releasing of the vacuum suction made by the drum, deviation of the recording sheet can be regulated. Further, conveyance of the recording sheet from the exfoliating means to an ejection path can be conducted stably and surely because skewing of the recording sheet can be prevented.

Item 18

The image recording apparatus described in Item 17, wherein the exfoliating means is one to exfoliate the recording sheet from the drum by means of vacuum suction, and when either one of the drum and the exfoliating means is performing vacuum suction, the other releases the vacuum suction.

By controlling vacuum suction of the exfoliating member and that of the drum exclusively, it is possible to make the structure of the control system to be simple.

In the foregoing, the recording sheet can be transferred surely from the drum to the exfoliating means, and releasing of the vacuum suction of the drum can regulate deviation of the recording sheet. Further, conveyance of the recording sheet from the exfoliating means to an ejection path can be conducted stably and surely because skewing of the recording sheet can be prevented.

Item 19

The image recording apparatus described in Item 18, wherein the drum jets air from its circumferential surface when exfoliating the recording sheet from the drum, while when supplying the recording sheet to the drum, the exfoliating member jets air to the drum, and when either one of the drum and the exfoliating means is conducting vacuum suction, the other jets air.

By controlling exclusively the vacuum suction and air jetting of the exfoliating member and of the drum in the foregoing, it is possible to make the structure of the control system to be simple.

Further, the recording sheet can be transferred surely from the drum to the exfoliating means, and deviation of the recording sheet can be regulated when the drum releases the vacuum suction. In addition, since the air jetting from the drum makes the recording sheet to be lifted from the drum surface when the recording sheet is conveyed, it is possible to convey the recording sheet with a small conveyance force even when the drum is not rotated in synchronization with the conveyance speed for ejection of the recording sheet, resulting in an increase of stability for ejection of the recording sheet.

Furthermore, since the air jetting is from the exfoliating member when the recording sheet is wound around the drum, it is also possible to obtain a squeeze effect which means that the recording sheet is pressed against the drum. Due to this, creases on the recording sheet caused in the course of winding around the drum can be prevented by a simple structure.

Item 20

The image recording apparatus described in Item 17, wherein the exfoliating means is one which exfoliates the recording sheet from the drum by means of electrostatic attraction, and the drum releases its vacuum suction while the recording sheet is exfoliated from the drum by the exfoliating means through electrostatic attraction.

By releasing the vacuum suction of the drum after the exfoliating means holds the recording sheet by means of electrostatic attraction, the recording sheet can be transferred surely from the drum to the exfoliating means, and deviation of the recording sheet can be regulated by the releasing of vacuum suction of the drum. Further, conveyance of the recording sheet from the exfoliating means to an ejection path can be conducted stably and surely because skewing of the recording sheet can be prevented.

Item 21

An image recording apparatus to record images on a recording sheet wound around the drum circumferential surface, wherein an exfoliating means which touches the recording sheet wound around the drum circumferential surface to exfoliate the recording sheet from the drum is provided, and when supplying the recording sheet to the drum, the exfoliating means jets air against the recording sheet on the drum circumferential surface.

In the foregoing, it is possible to obtain greater squeeze effect by jetting air from the exfoliating roller, when winding the recording sheet around the drum.

Due to this, creases on the recording sheet caused in the course of winding around the drum can be prevented by a simple structure.

Item 22

An image recording apparatus to record images on a recording sheet wound around the drum circumferential surface, wherein an exfoliating means which touches the recording sheet wound around the drum circumferential surface to exfoliate the recording sheet from the drum is provided, and when the recording sheet is exfoliated from the drum by the exfoliating means, air is jetted from the circumferential surface of the drum.

Further, the recording sheet can be transferred surely from the drum to the exfoliating means, and deviation of the recording sheet can be regulated when the drum releases the vacuum suction. In addition, since the air jetting from the drum makes the recording sheet to be lifted from the drum surface when the recording sheet is conveyed, it is possible to convey the recording sheet with a small conveyance force even when the drum is not rotated in synchronization with the conveyance speed for ejection of the recording sheet, resulting in an increase of stability for ejection of the recording sheet.

Item 23

An image recording apparatus to record images on a recording sheet wound around the drum circumferential surface, wherein the drum is one around which the recording sheet is wound by means of vacuum suction to cover the circumferential surface of the drum, and the drum has a plurality of through holes provided on the drum circumferential surface through which the recording sheet is sucked and has suction-communicating grooves representing the grooves which are provided on the drum circumferential surface to communicate plural through holes on the drum circumferential surface, while the suction-communicating grooves are provided on the drum circumferential surface to be diagonal to the side representing a leading edge of the recording sheet in the direction for supplying the recording sheet to the drum.

By providing the suction-communicating grooves on the drum to be diagonal to the direction for supplying the recording sheet, it is possible to prevent erroneous supply of the recording sheet when it is supplied and thereby to improve sharply the stability of operations of the image recording apparatus, without deteriorating the efficiency to suck and fix the recording sheet and without providing complicated mechanisms.

Item 24

The image recording apparatus described in Item 23, wherein the aforesaid suction-communicating grooves which are diagonal to the side representing a leading edge of the recording sheet in the direction for supplying the recording sheet to the drum are provided at least on the drum circumferential surface portion which is touched by the leading edge of the recording sheet in the direction for supplying the recording sheet when the recording sheet is supplied to the drum.

In the foregoing, the cost for processing the drum can be reduced.

Item 25

An image recording apparatus to record images on a recording sheet wound around the drum circumferential surface, wherein the drum is one around which the recording sheet is wound by means of vacuum suction to cover the circumferential surface of the drum, and the drum has a plurality of through holes provided on the drum circumferential surface through which the recording sheet is sucked and has suction-communicating grooves representing the grooves which are provided on the drum circumferential surface to communicate plural through holes on the drum circumferential surface, while the side of the suction-communicating groove being mostly in parallel with the side representing a leading edge of the recording sheet in the direction for supplying it to the drum is in a shape to incline so that a groove width of the suction-communicating groove at the outer portion of the drum circumferential surface is greater than that at the inner portion of the drum circumferential surface.

Due to the inclined sectional side of the suction-communicating groove which is touched by the leading edge of the recording sheet when it is supplied, even when the leading edge of the recording sheet enters the suction-communicating groove, it can come out of the groove without being caught by the groove. Therefore, even in the case of a simple pattern of suction-communicating grooves, it is possible to prevent erroneous supply of the recording sheet when it is supplied and thereby to improve sharply the stability of operations of the image recording apparatus, without deteriorating the efficiency to suck and fix the recording sheet and without providing complicated mechanisms.

Item 26

The image recording apparatus described in Item 25, wherein, on the drum circumferential surface portion which is touched by at least the leading edge of the recording sheet in the direction for supplying it when supplying the recording sheet to the drum, there are provided the suction-communicating grooves each being mostly in parallel with the side of the recording sheet representing a leading edge thereof in the direction for supplying the recording sheet to the drum, and having the side of the groove located at the downstream side in the direction to supply the recording sheet being inclined so that a groove width of the suction-communicating groove at the outer portion of the drum circumferential surface is greater than that at the inner portion of the drum circumferential surface.

In the foregoing, the cost for processing the drum can be reduced.

Item 27

An image recording apparatus to record images on a recording sheet wound around the drum circumferential surface, wherein the drum is one around which the recording sheet is wound by means of vacuum suction to cover the circumferential surface of the drum, and the drum has a plurality of through holes provided on the drum circumferential surface through which the recording sheet is sucked and has suction-communicating grooves representing the grooves which are provided on the drum circumferential surface to communicate plural through holes on the drum circumferential surface, while the aforesaid suction-communicating grooves which are in parallel with the side representing a leading edge of the recording sheet in the direction for supplying the recording sheet to the drum are not provided at least on the drum circumferential surface portion which is touched by the leading edge of the recording sheet in the direction for supplying the recording sheet when the recording sheet is supplied to the drum.

In the foregoing, by providing no suction-communicating groove being in parallel with the side representing a leading edge of the recording sheet in the direction for supplying it at the drum circumferential surface portion which is touched by the leading edge of the recording sheet in the direction for supplying it when supplying the recording sheet to the drum, it is possible to prevent erroneous supply of the recording sheet when it is supplied and thereby to improve sharply the stability of operations of the image recording apparatus, without deteriorating the efficiency to suck and fix the recording sheet and without providing complicated mechanisms.

Item 28

The image recording apparatus described in Item 27, wherein the suction-communicating grooves are not provided at the drum circumferential surface portion which is touched by the leading edge of the recording sheet in the direction for supplying it when supplying the recording sheet to the drum.

In the foregoing, by providing no suction-communicating groove at the drum circumferential surface portion which is touched by the leading edge of the recording sheet in the direction for supplying it when supplying the recording sheet to the drum, it is possible to prevent erroneous supply of the recording sheet when it is supplied and thereby to improve sharply the stability of operations of the image recording apparatus, without deteriorating the efficiency to suck and fix the recording sheet and without providing complicated mechanisms.

Item 29

An image recording apparatus to record images on a recording sheet wound around the drum circumferential surface, wherein at least the leading edge of the recording sheet in the direction for supplying it is stuck to the drum circumferential surface and thereby the position of the leading edge of the recording sheet in the direction for supplying it to the drum is determined on the drum circumferential surface.

When recording an image by rotating a drum at a high speed, it is necessary to fix a recording sheet firmly on the drum circumferential surface. In this case, when stability is pursued by a vacuum suction system alone, a large and expensive vacuum pump is needed. When a recording sheet comes off the rotating drum, it usually starts coming off from the end portion of the recording sheet. Therefore, it has become possible to make a vacuum pump small by assisting the fixation of the end portion of the recording sheet on the drum surface with adhesive substances. Due to this, it has become possible to reduce cost of an apparatus sharply and to reduce noises. It has further become possible to fix a recording sheet in a smaller size.

Item 30

An image recording apparatus to record images on a recording sheet wound around the drum circumferential surface, wherein a groove for positioning the leading edge of the recording sheet is provided at the position on the drum surface with which the leading edge of the recording sheet in the direction of supplying thereof makes contact to be perpendicular to the direction for supplying the recording sheet.

In the foregoing, it is possible to position the leading edge of the recording sheet at the low cost without providing the complicated regulating mechanism for the leading edge, and to keep the stable fixing of the recording sheet without affecting the fixed recording sheet adversely even in the case of high speed rotation of the drum, because the groove whose direction is perpendicular to the direction of supplying of the recording sheet is provided at the position on the drum surface with which the leading edge of the recording sheet comes in contact so that the leading edge of the recording sheet may touch the groove. Further, in the case of ejection of the recording sheet, a simple mechanism can eject the recording sheet because there is no regulating member for the leading edge which obstructs the ejection of the recording sheet.

It is also possible to improve the speed for replacement of the recording sheet.

Item 31

The image recording apparatus described in either one of Items 1–30, wherein the image recording apparatus is one in which the recording sheet is subjected to scanning exposure to be recorded thereon with an image while the drum around which the recording sheet is wound is rotated.

In the foregoing, no object touches the recording sheet on the drum circumferential surface in the course of image recording because the image recording is conducted by applying light, and flatness of the recording sheet on the drum circumferential surface becomes more important because of no contact of an object which corrects unevenness on the surface of an image sheet caused by rotation. Thus, the foregoing offers the remarkable effect of the invention that flatness of the recording sheet on the drum circumferential surface can be kept to be satisfactory even in the course of image recording of the recording sheet.

Item 32

The image recording apparatus described in either one of Items 1–31, wherein the image recording apparatus is one in which an image is recorded on the recording sheet while the drum around which the recording sheet is wound is rotated, and the drum is rotated at the rotating speed of 300 rpm or higher in the course of image recording.

Because of high-speed rotation of the drum in the course of image recording, there is a high possibility that air enters the groove for exfoliation on the drum circumferential surface when the drum rotates for image recording and unevenness is caused on the surface of the recording sheet. In the foregoing, therefore, elimination of the groove for exfoliation on the drum circumferential surface offers the remarkable effect to improve close contact between the drum and the recording sheet under the drum rotation and to stably obtain finished images of high quality, and the remarkable effect to prevent exfoliation of the recording sheet from the drum in the course of image recording and to improve stability.

The second object of the invention can be achieved by structures in Items 33–34.

Item 33

An image recording apparatus to write images on a recording sheet wound around an outer circumferential surface of a drum, wherein there are provided a drum means around which the recording sheet to be recorded thereon with images is wound to cover the outer circumferential surface of the drum means, the first drum driving means which rotates the drum means at the writing speed in the course of writing images, a squeeze roller means which brings the recording sheet into close contact with the drum means, a squeeze roller displacing means which displaces the squeeze roller means to the position for close contact with the drum means and to the position for separation from the drum means, and the second drum driving means which rotates the drum means at the rotating speed lower than that by the first drum driving means through the squeeze roller means when supplying the recording sheet to the drum means and when ejecting the recording sheet.

Item 34

An image recording apparatus having therein a drum means around which a recording sheet is wound to cover the outer circumferential surface of the drum means, and a squeeze roller means which brings the recording sheet into close contact with the drum means, to write images on the recording sheet wound around the outer circumferential surface of the drum means, wherein an outer circumferential surface of the squeeze roller means excluding the portion which is touched by the recording sheet is at least in pressure contact with an outer circumferential surface of the drum means excluding the portion which is touched by the recording sheet so that the squeeze roller means can drive the drum means to rotate, or the drum means can drive the squeeze roller means to rotate.

The third object of the invention can be achieved by structures in Items 35–37.

Item 35

An image recording apparatus to write images on a recording sheet wound around an outer circumferential surface of a drum, wherein there are provided a drum means around which the recording sheet to be recorded thereon with images is wound to cover an outer circumferential surface of the drum means, a positioning means which positions a leading edge of the recording sheet on the outer circumferential surface of the drum means, and a positioning means moving means which brings the positioning means into contact with the drum means when positioning the recording sheet on the drum means, while separates the positioning means from the drum means after completion of the positioning.

Item 36

An image recording apparatus to write images on a recording sheet wound around an outer circumferential surface of a drum, wherein there are provided around which the recording sheet to be recorded thereon with images is wound to cover an outer circumferential surface of the drum means, a positioning means which positions a leading edge of the recording sheet on the drum means, a positioning moving means which brings the positioning means into contact with the drum means when positioning the recording sheet on the drum means, while separates the positioning means from the drum means after completion of the positioning, and a squeeze roller means which is provided in the vicinity of a line passing through a contact point between the positioning portion of the positioning means and the outer circumferential surface of the drum means and being in parallel with the drum axis of the drum means, and brings the recording sheet into close contact with the drum means.

Item 37

An image recording apparatus to write images on a recording sheet wound around an outer circumferential surface of a drum, wherein there are provided a drum means around which a recording sheet to be recorded thereon with an image is wound and in which the rotation center axis represents an origin, a horizontal line represents an X axis and a vertical line represents a Y axis, a writing means in which a light source for image writing is positioned on the X axis on the part of the first quadrant on the coordinates formed by the X axis and Y axis, a positioning means which positions the leading edge of the recording sheet on the outer circumferential surface of the drum means and is provided in the range on the first quadrant including the X and Y axes, and an exfoliating means which is positioned in the range including the X and Y axes on the third quadrant and exfoliates the recording sheet on the outer circumferential surface of the drum means.

The fourth object of the invention can be achieved by structures in Item 38.

Item 38

An image recording apparatus having therein a rotary drum which is hollow and is provided with plural through-holes each passing through from the circumferential surface to the inside, and rotates while holding a wound recording sheet, and a decompressing means which decompresses the inside of the rotary drum, to record images on the recording sheet wound around the rotary drum, wherein the rotating speed of the rotary drum is changed depending on a size of the recording sheet wound around the rotary drum, an edge position of the recording sheet, or the pressure in the inside of the rotary drum.

Explanation of Terminology

"A tandem roller" in the invention means one wherein a plurality of small rollers are provided on a single shaft at prescribed intervals. A portion of the shaft can be regarded as a groove of the roller.

"Recording sheet" in the invention means a film-shaped medium on which an image can be recorded. For example, there are given a plain paper, a thermosensitive paper and a silver halide photographic light-sensitive material such as a color paper and a monochromatic paper.

Figure 9A:
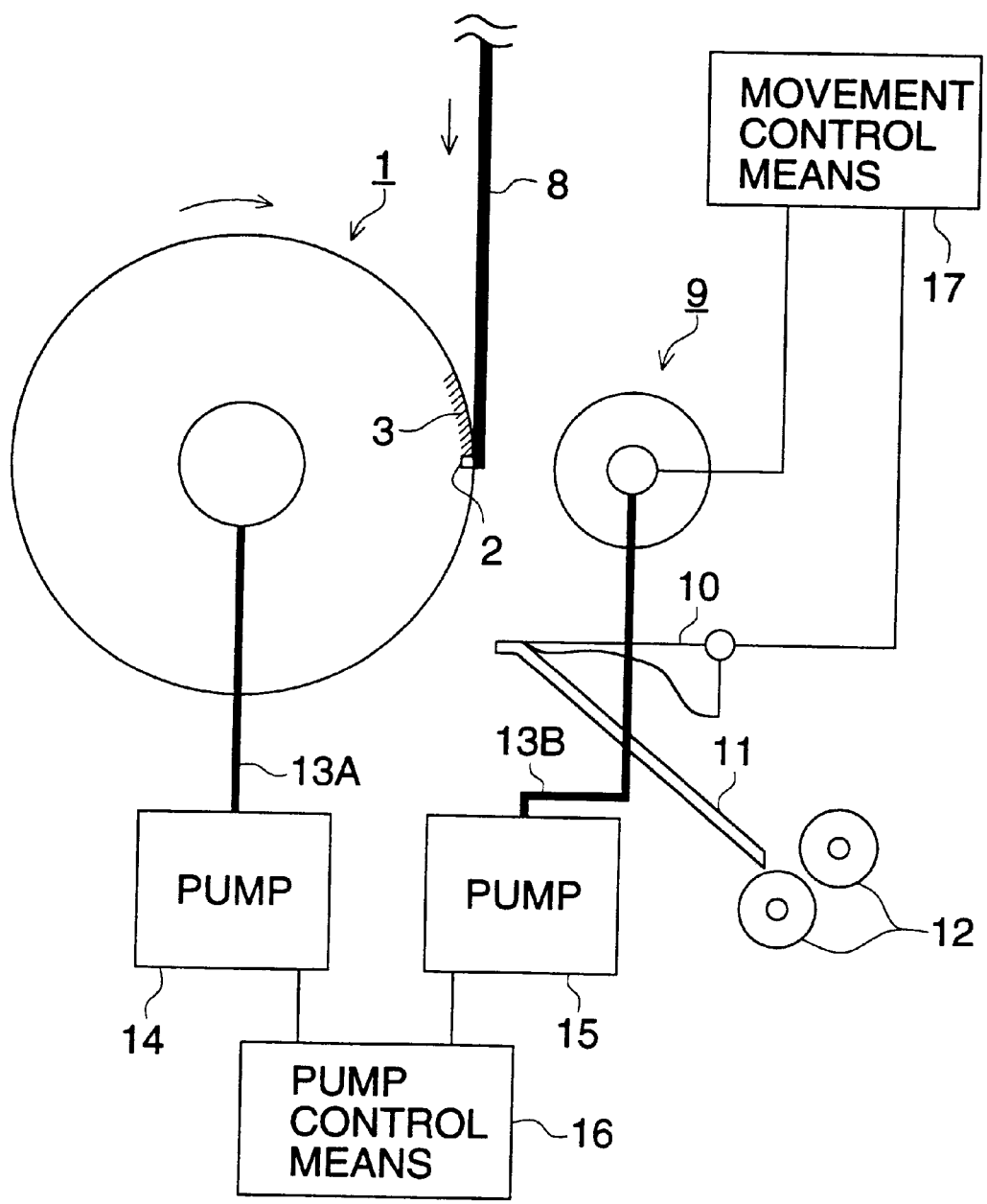
Figure 9:
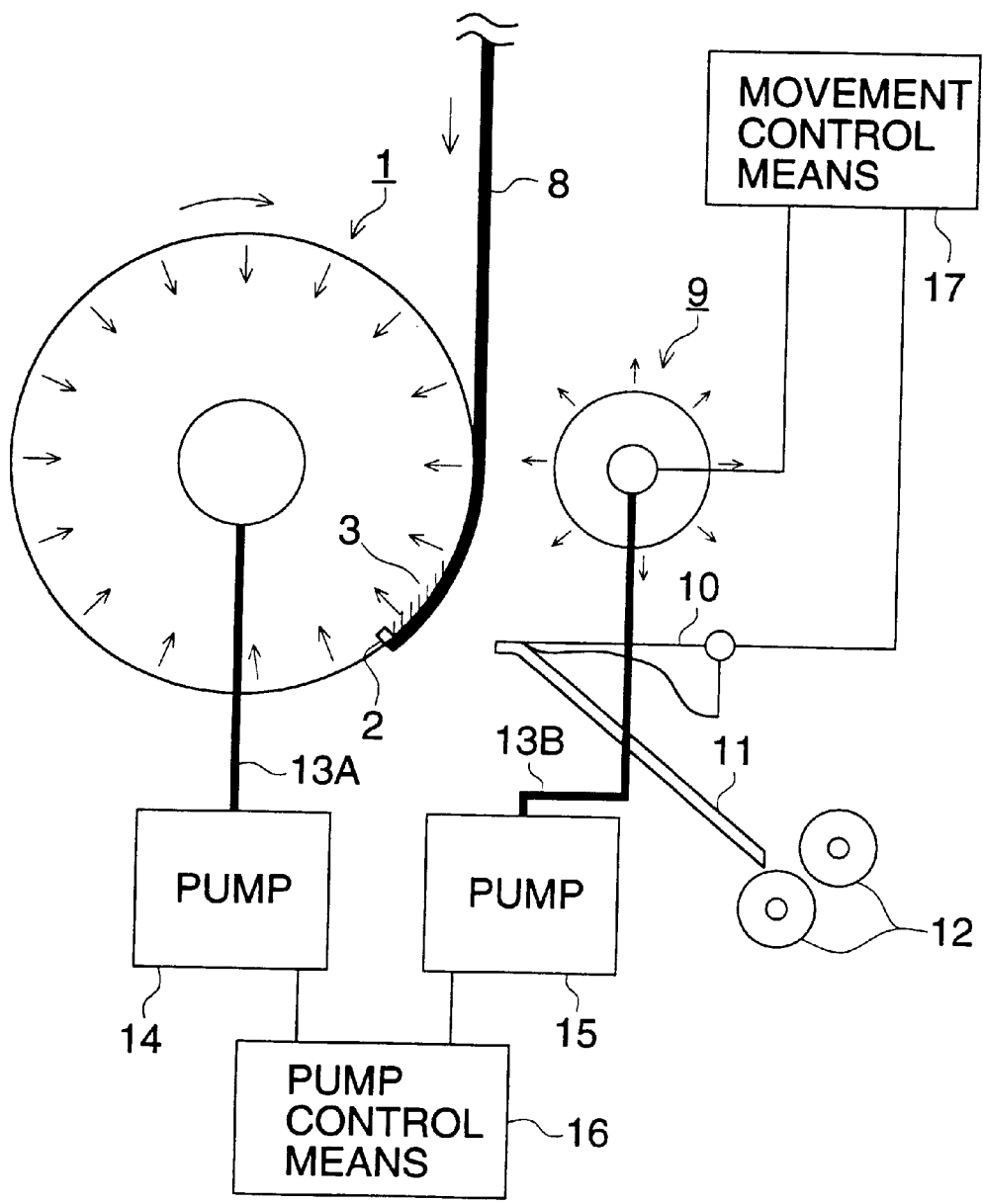

Each of FIGS. 9(A) and 9(B) is a schematic illustration showing an example of Embodiment 4 relating the mechanism for sheet supply to the drum.

Figure 10:
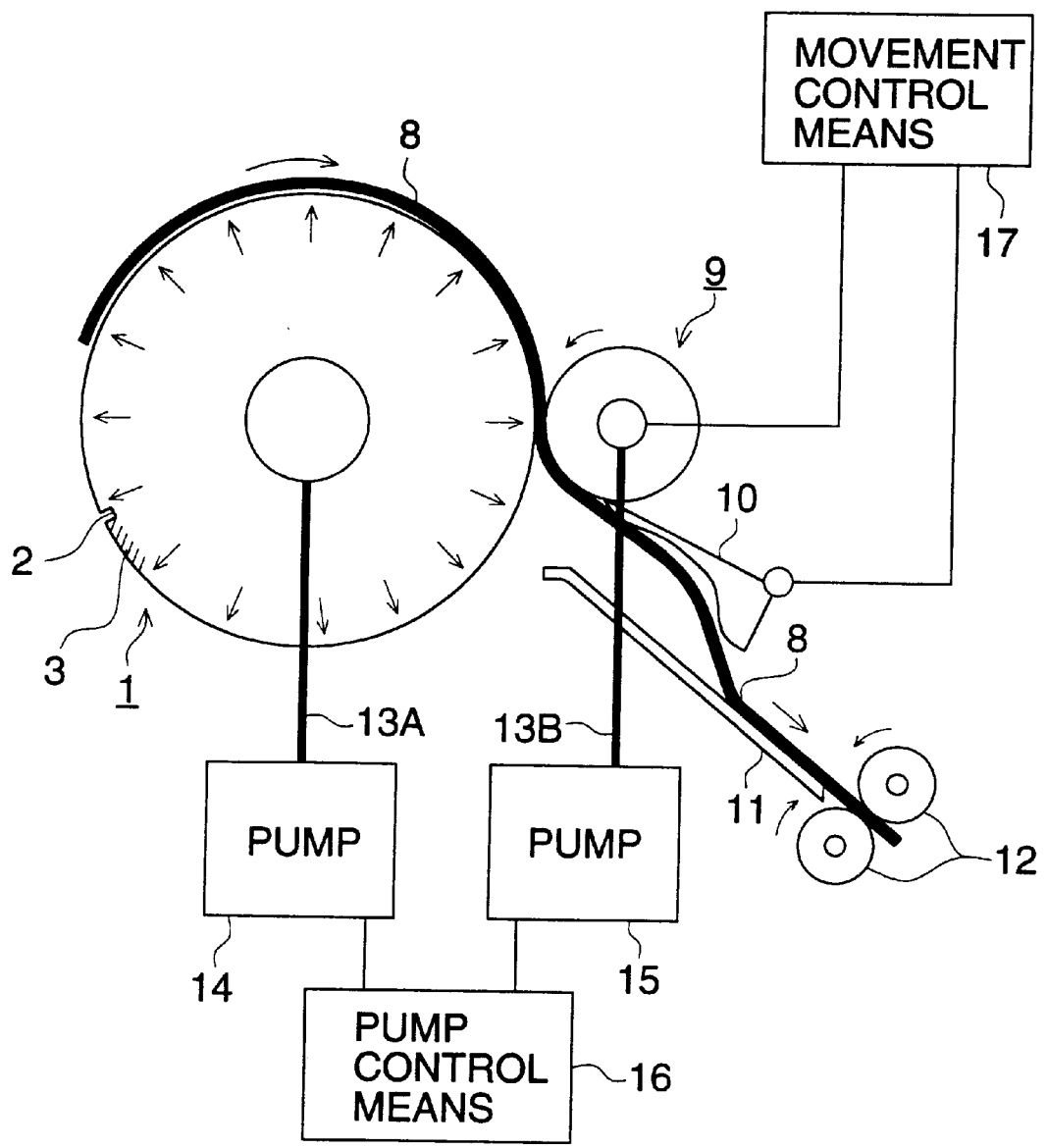

FIG. 10 is a schematic illustration showing an example of an embodiment of a mechanism for exfoliation of a recording sheet from the drum.

Figure 11:
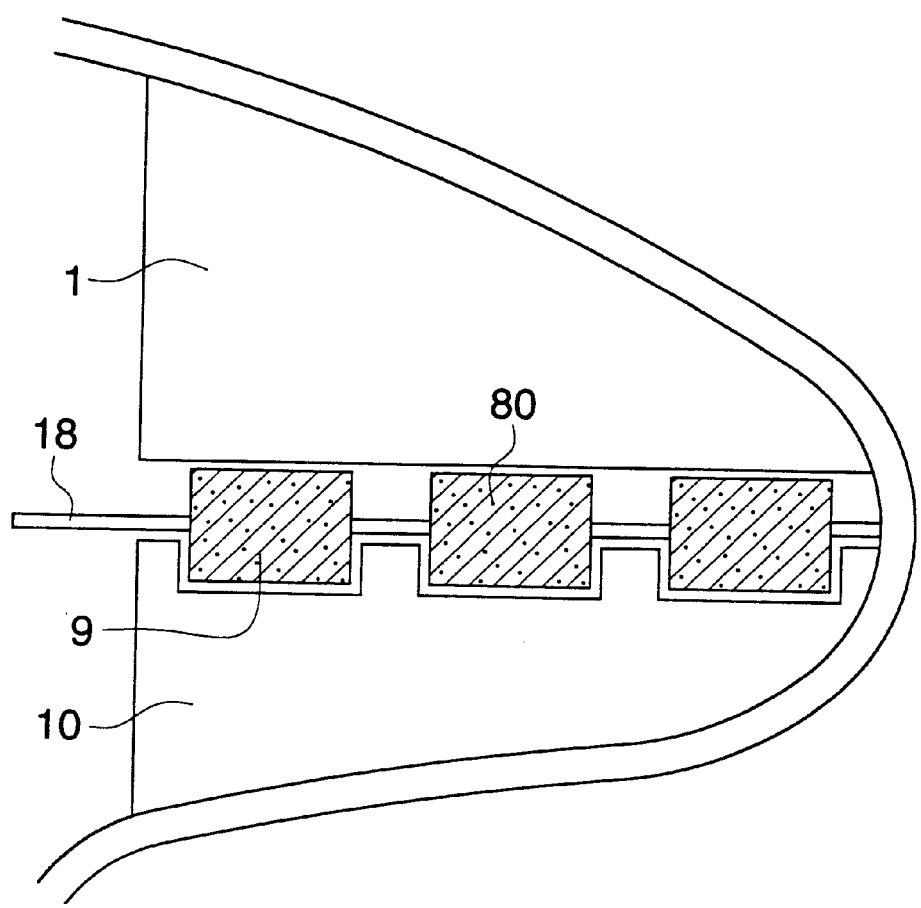

FIG. 11 is a top view of an exfoliating roller and an exfoliating guide relating to the present embodiment.

Figure 12:
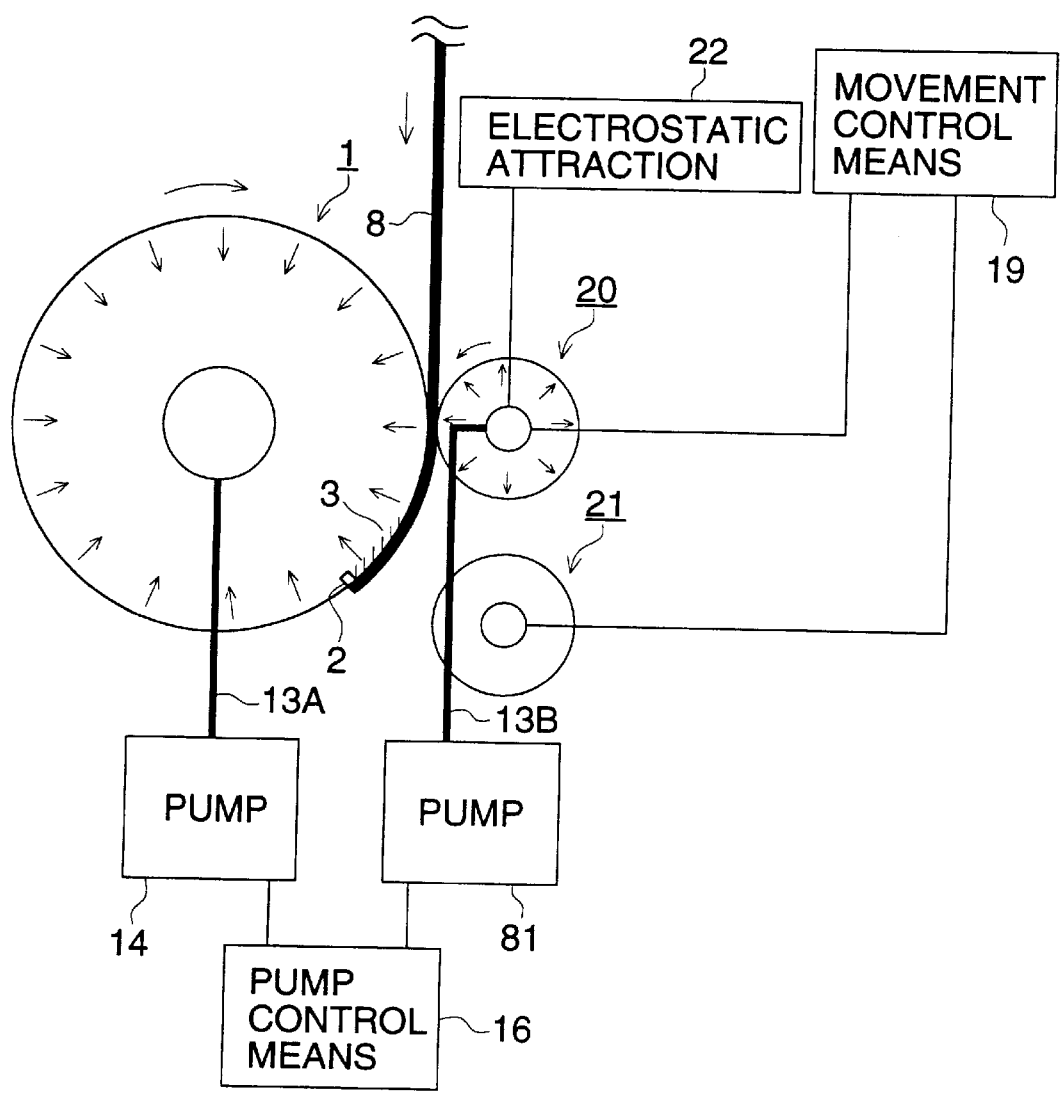

FIG. 12 is a schematic illustration showing an example of Embodiment 5 relating the mechanism for sheet supply to the drum.

Figure 13:
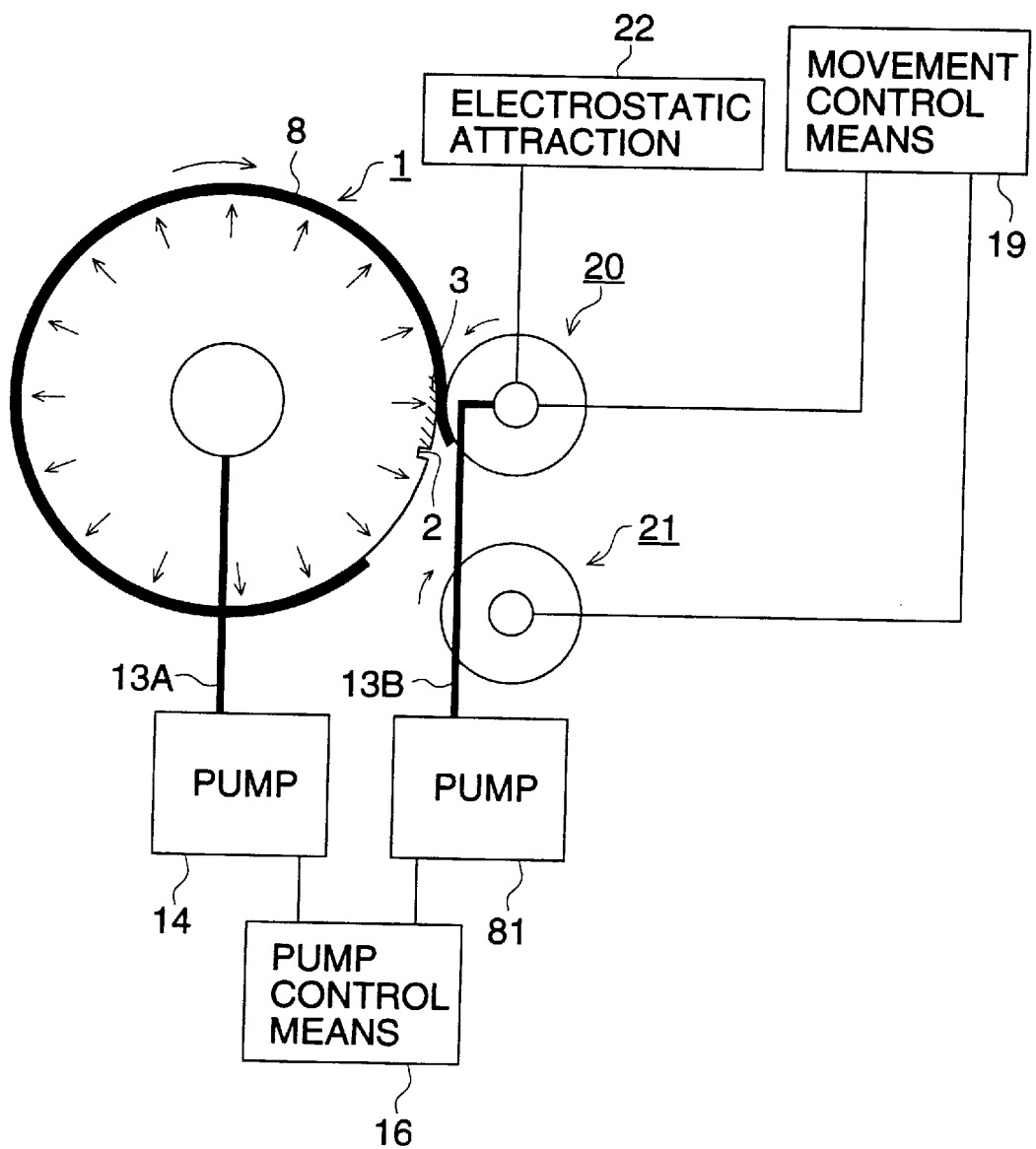

FIG. 13 is a schematic illustration showing a mechanism to start exfoliation when exfoliating a recording sheet from a drum.

Figure 14:
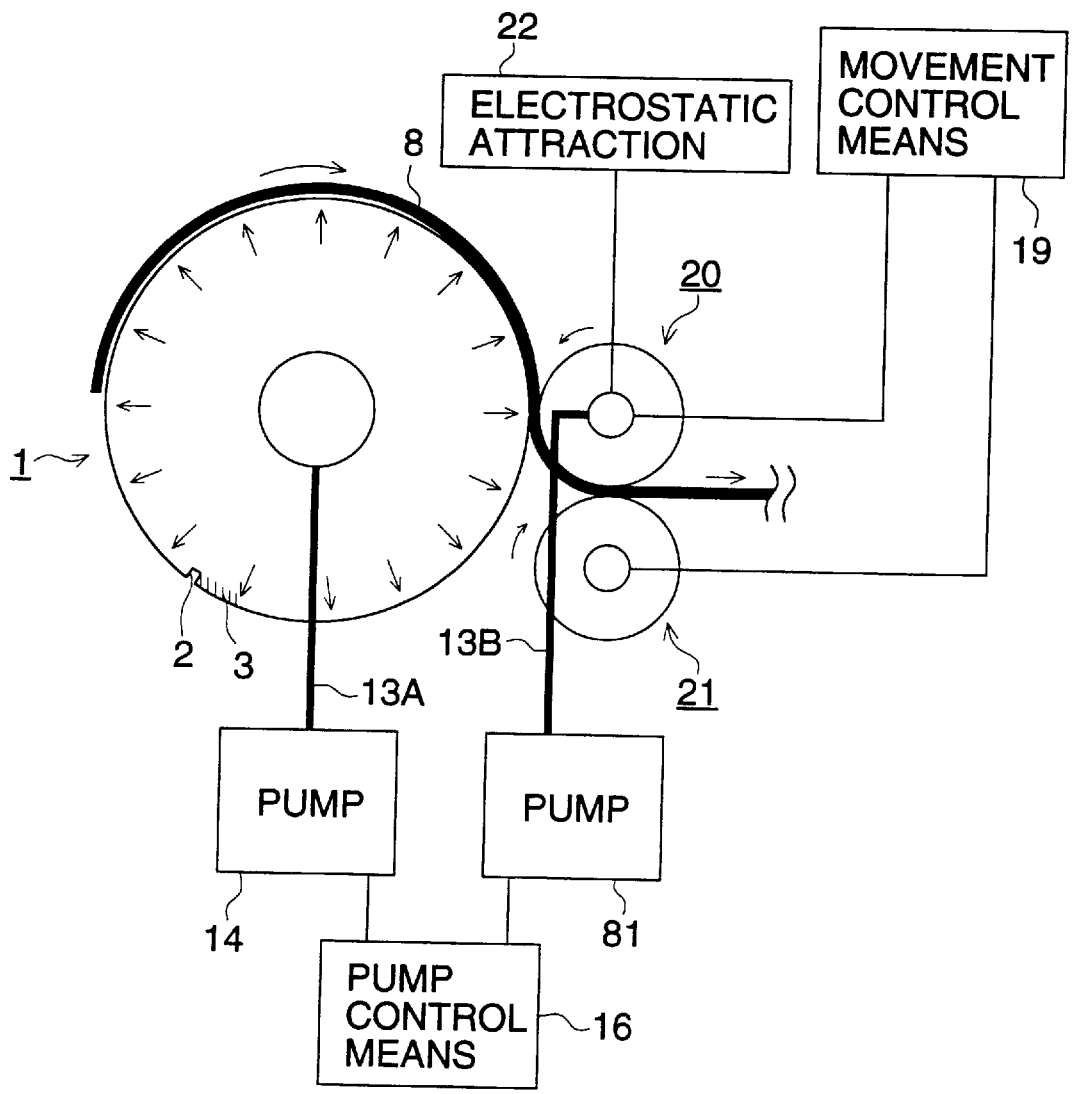

FIG. 14 is a schematic illustration showing an example of an embodiment of a mechanism to exfoliate a recording sheet from a drum.

Figure 15:
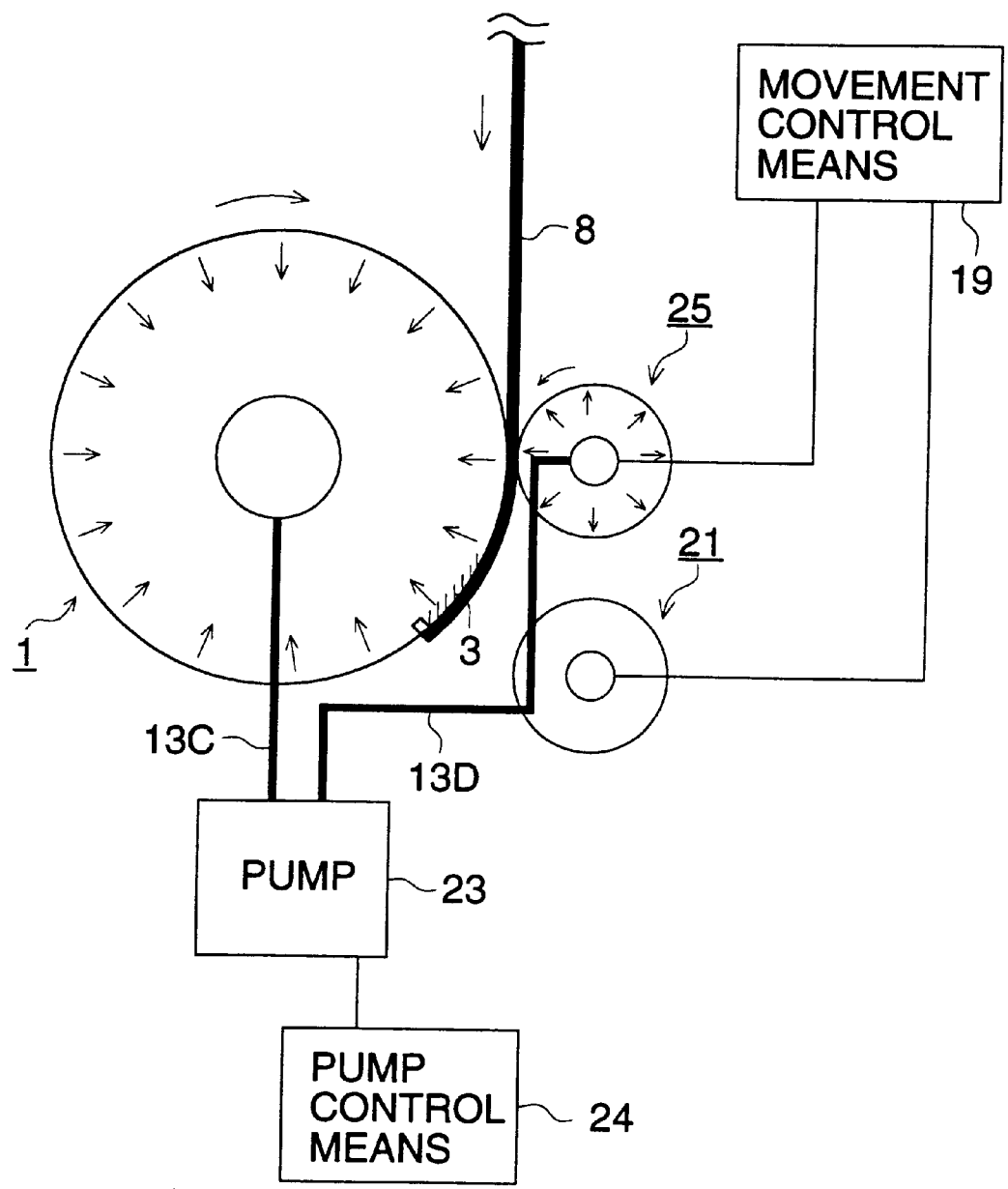

FIG. 15 is a schematic illustration showing an example of Embodiment 6 relating the mechanism for sheet supply to the drum.

Figure 16:
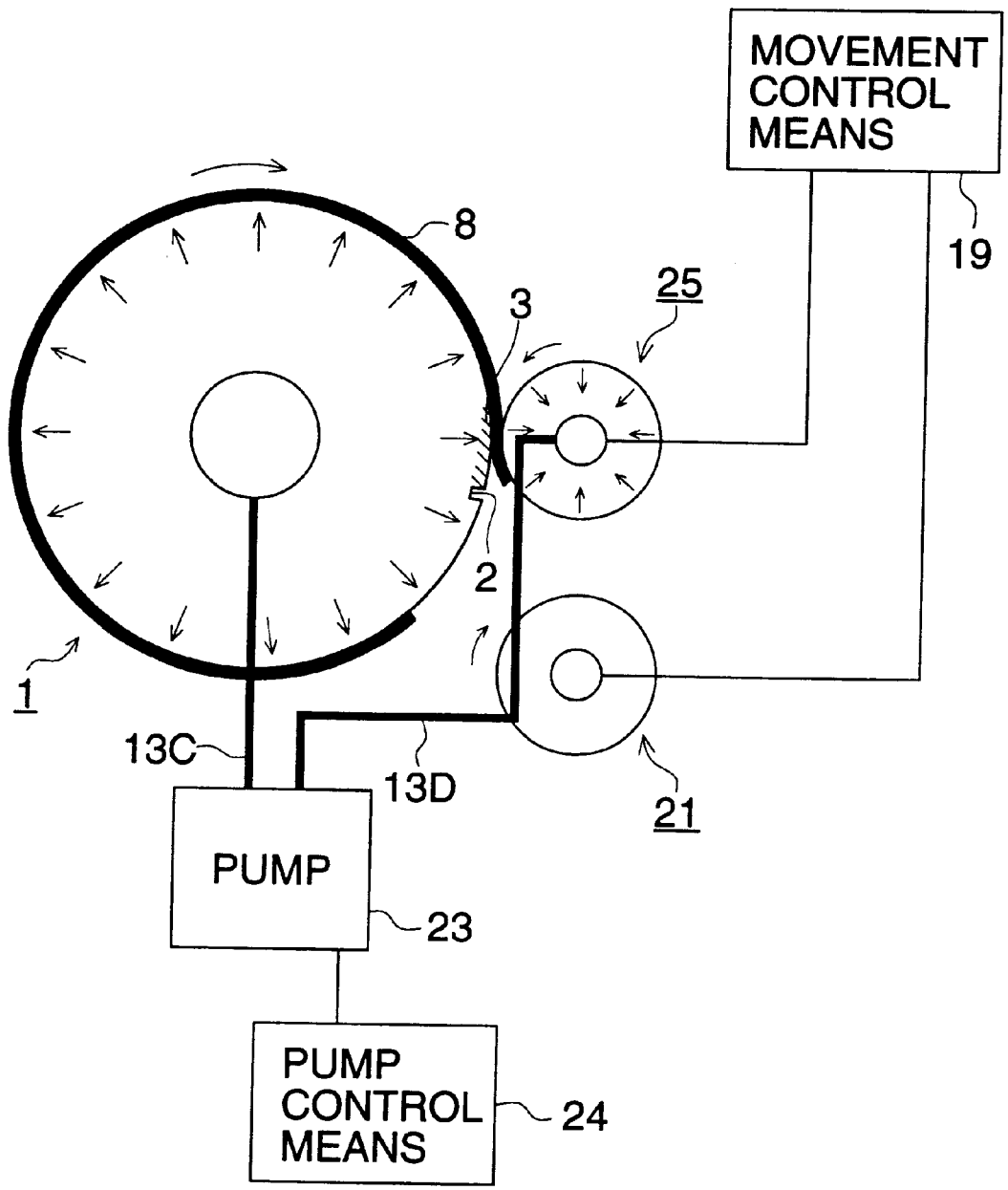

FIG. 16 is a schematic illustration showing a mechanism to start exfoliation when exfoliating a recording sheet from a drum.

Figure 17:
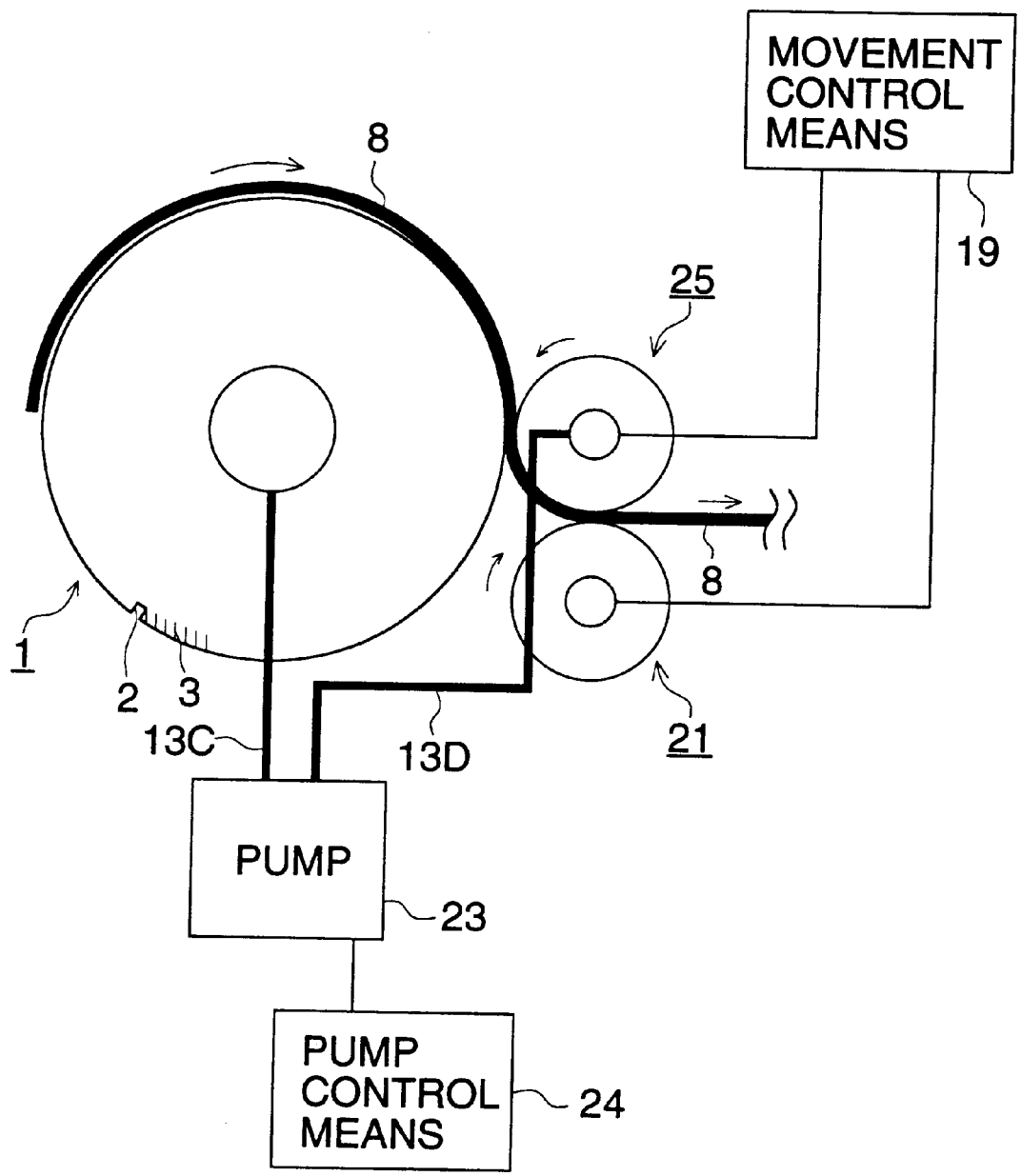

FIG. 17 is a schematic illustration showing an example of an embodiment of a mechanism to exfoliate a recording sheet from a drum.

Figure 18:
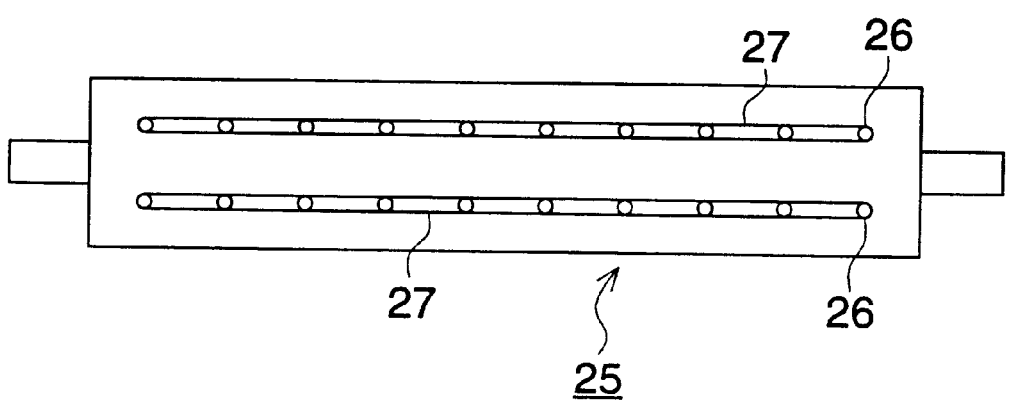

FIG. 18 is a front view of an example of Embodiment 6 relating to a vacuum suction exfoliating roller.

Figure 19:
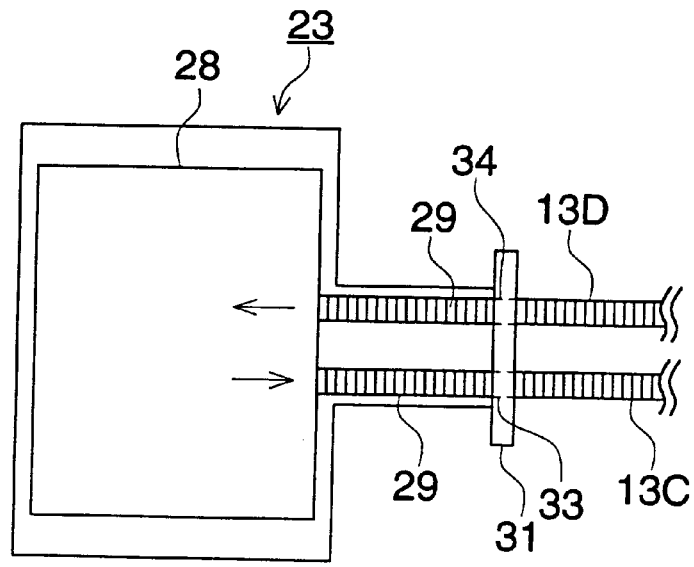
Figure 19:
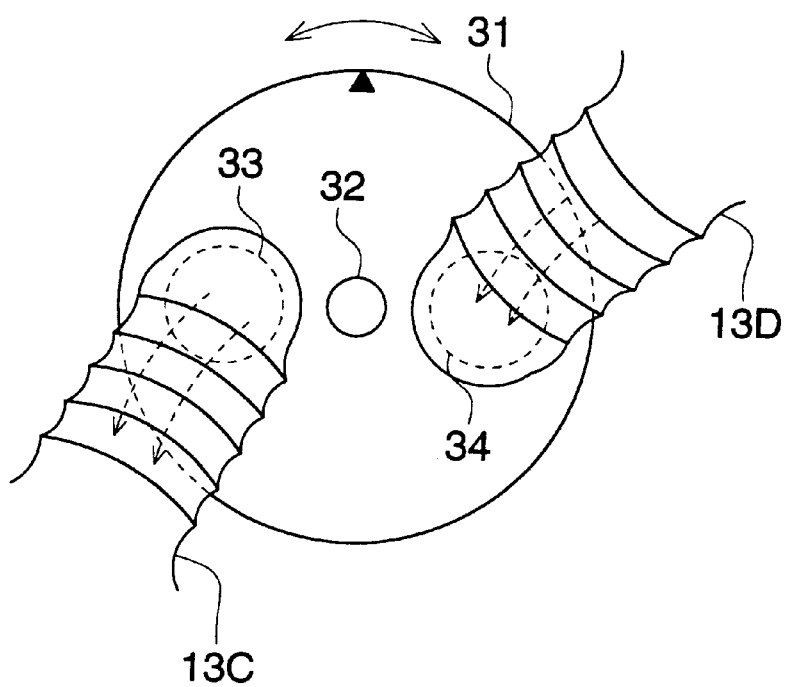

FIG. 19($a$) is a schematic structural diagram of an example of Embodiment 6 of a combined use type pump, and FIG. 19($b$) is a schematic diagram of a switching plate for suction and exhaust of the combined use type pump.

Figure 20:
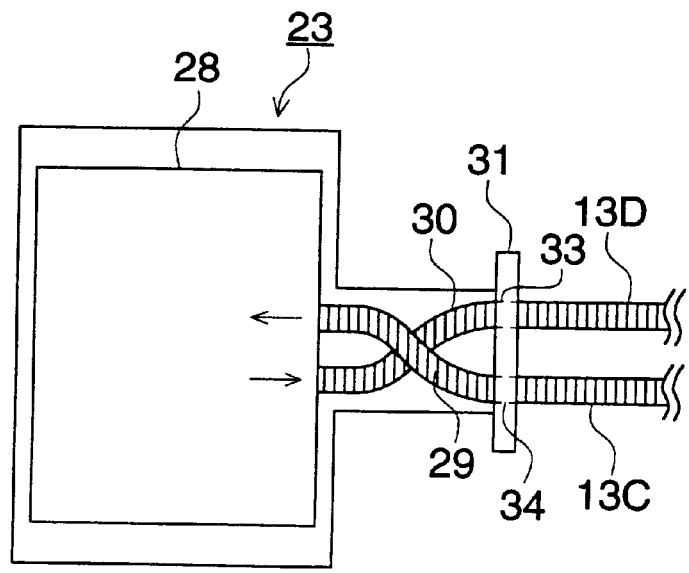
Figure 20:
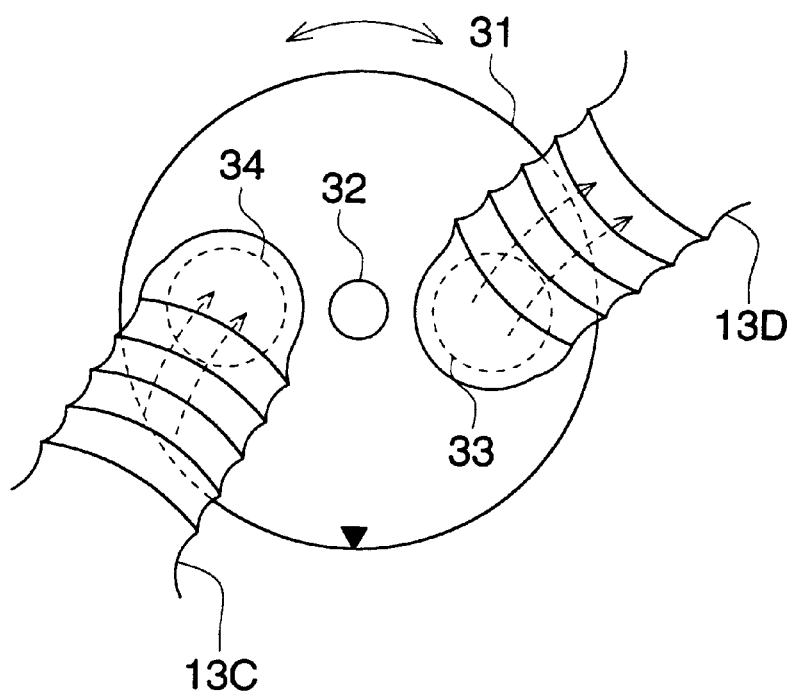

FIGS. 20($a$) and 20($b$) represent schematic diagrams showing the state wherein suction and exhaust of the combined use type pump are switched.

Figure 21:
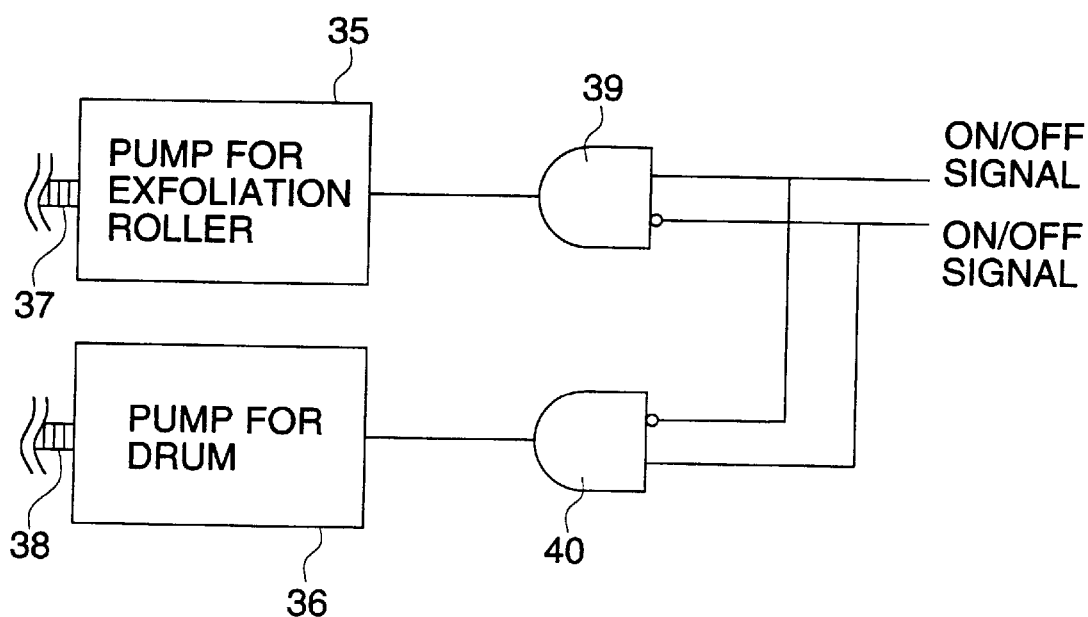

FIG. 21 is a schematic diagram of an example of a circuit for conducting the control of a pump.

Figure 22:
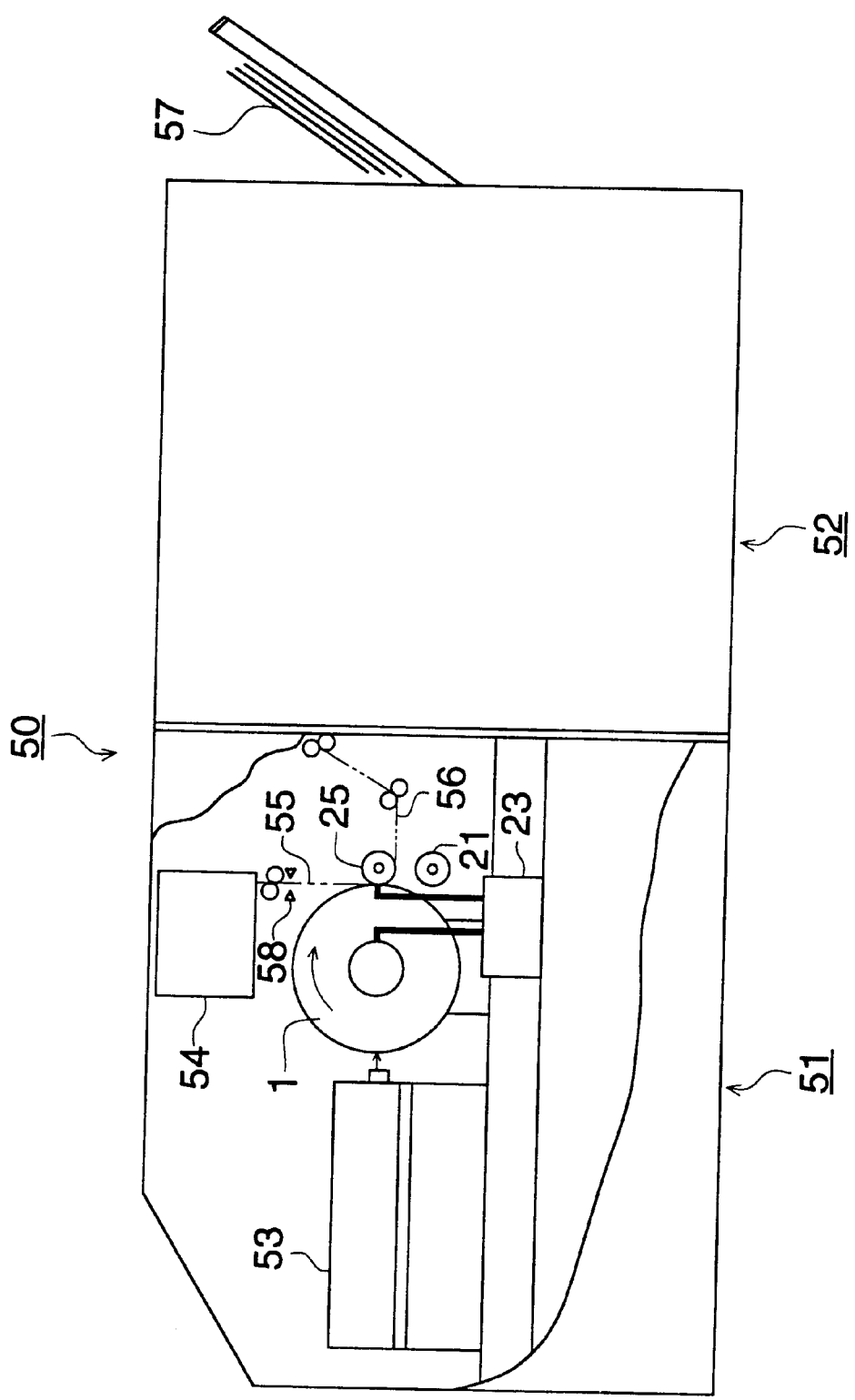

FIG. 22 is a schematic structural diagram of an example of an embodiment of an image recording apparatus related to the invention.

Figure 23:
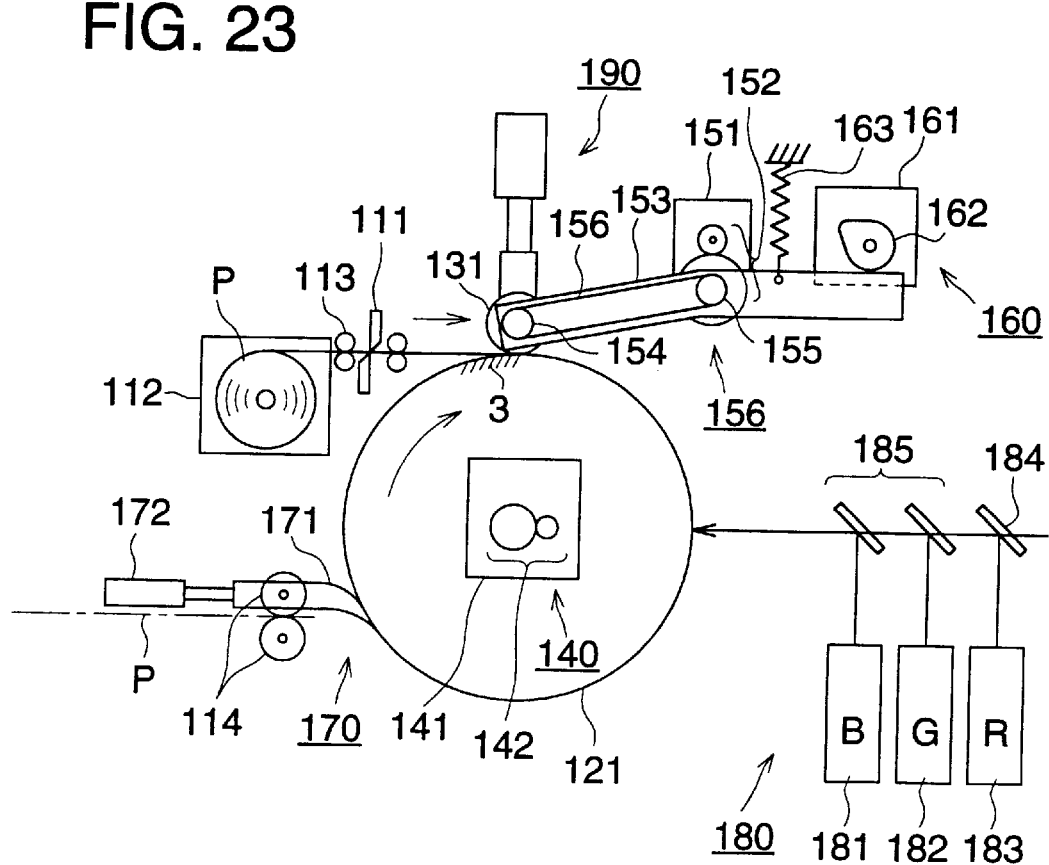

FIG. 23 is a general structural diagram of Embodiment 7 of the invention.

Figure 24:
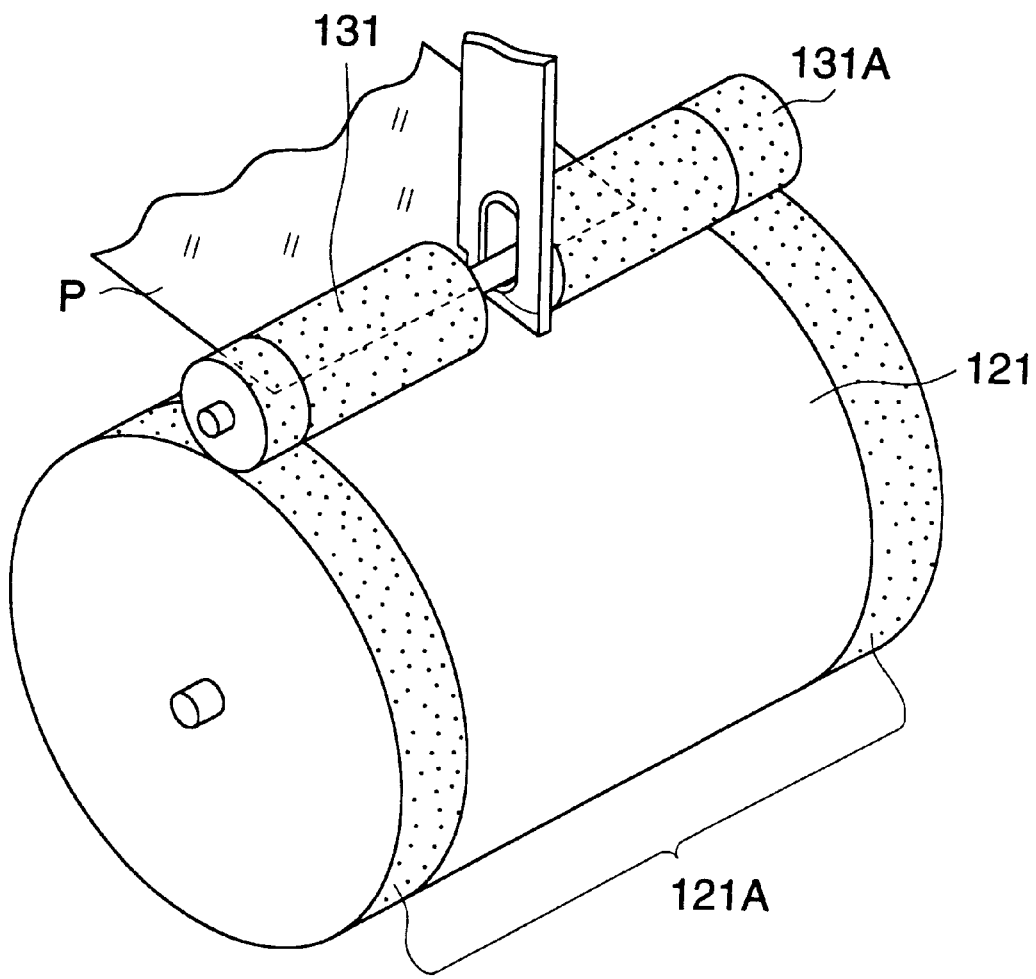

FIG. 24 is a structural perspective view of a drum and a squeeze roller.

Figure 25:
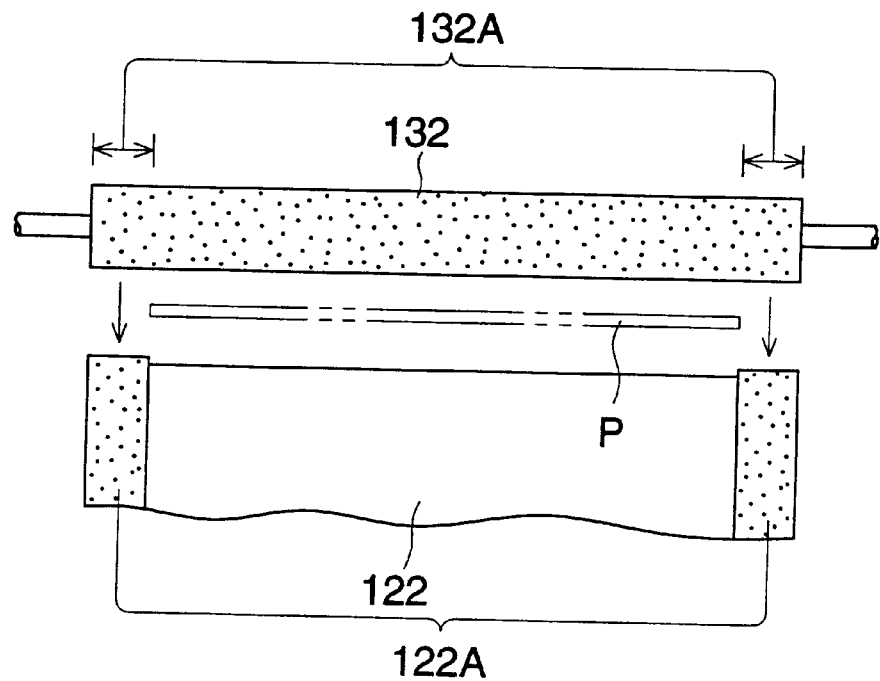
Figure 25:
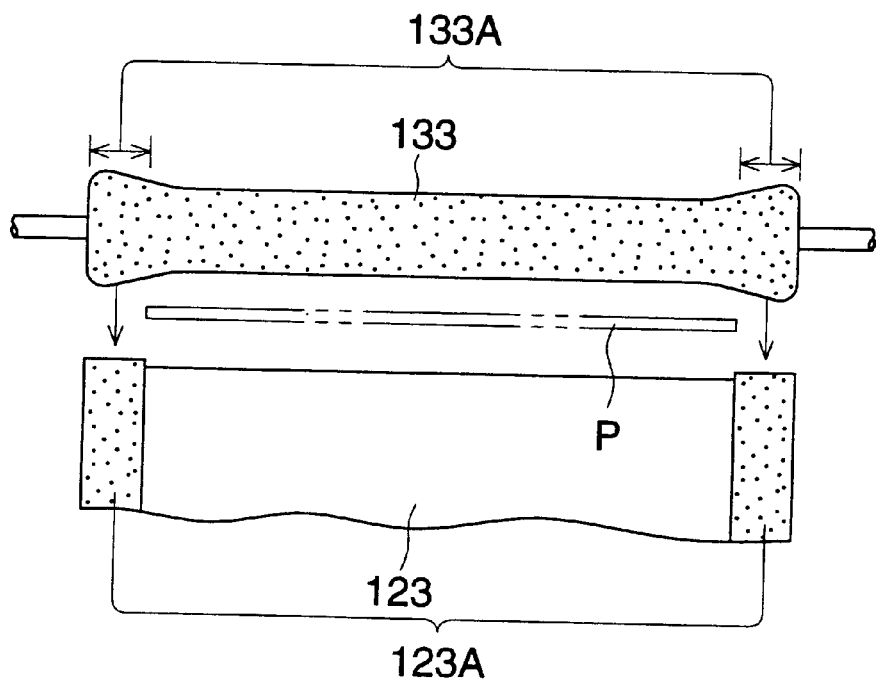

Each of FIGS. 25($a$) and 25($b$) represents a structural diagram of a drum a squeeze roller in another embodiment.

Figure 26:
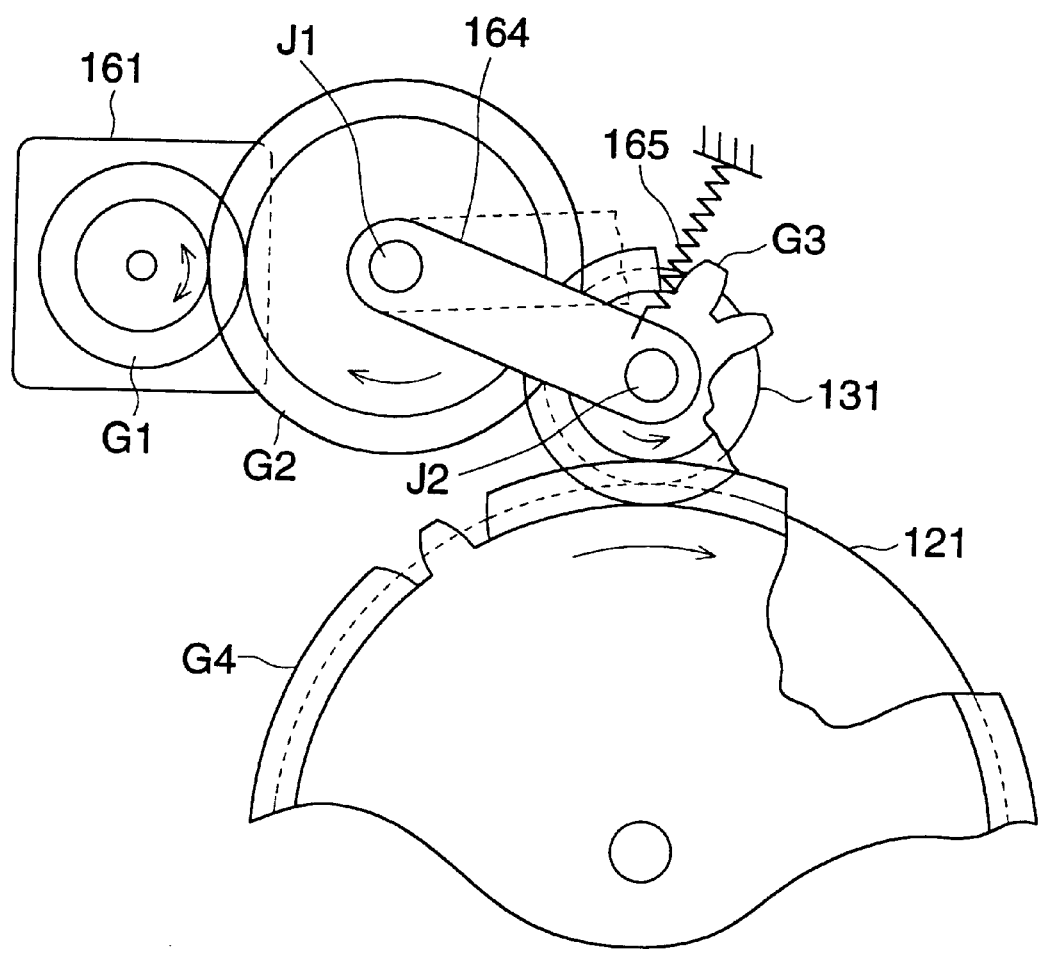

FIG. 26 is a structural diagram of primary portions in Embodiment 8 of the invention.

Figure 27:
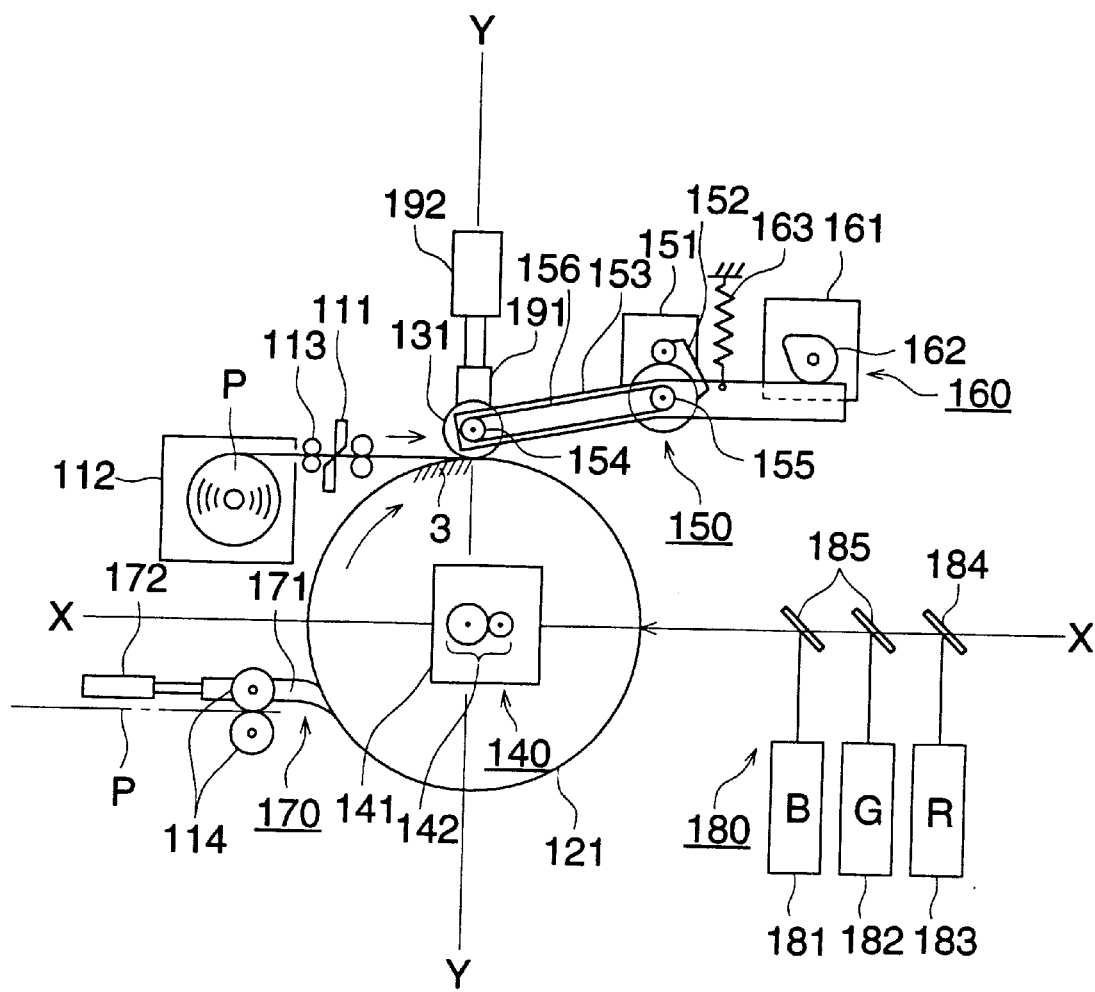

FIG. 27 is a general structural diagram of Embodiment 9 of the invention.

Figure 28:
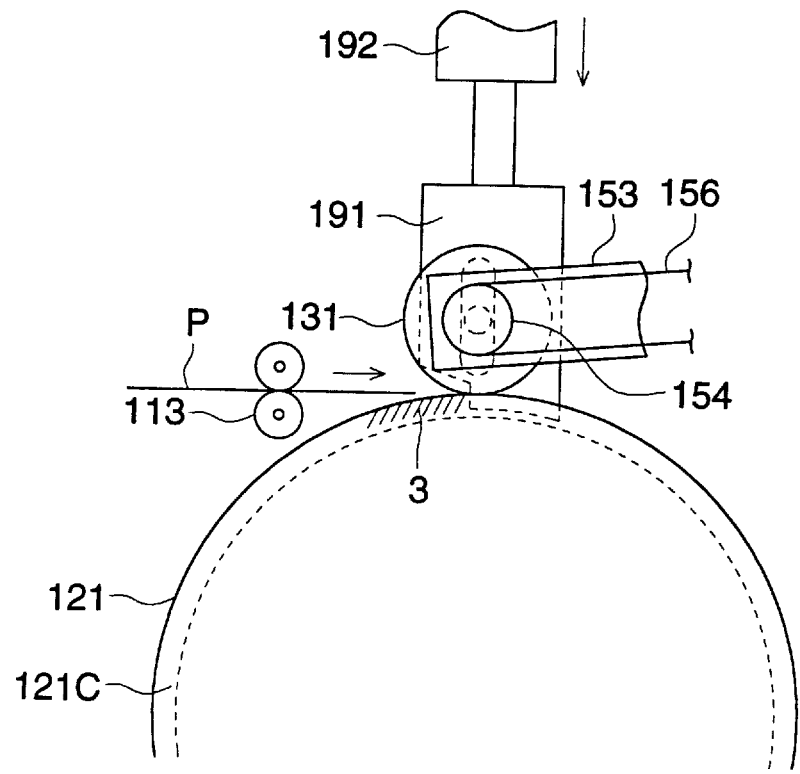
Figure 28:
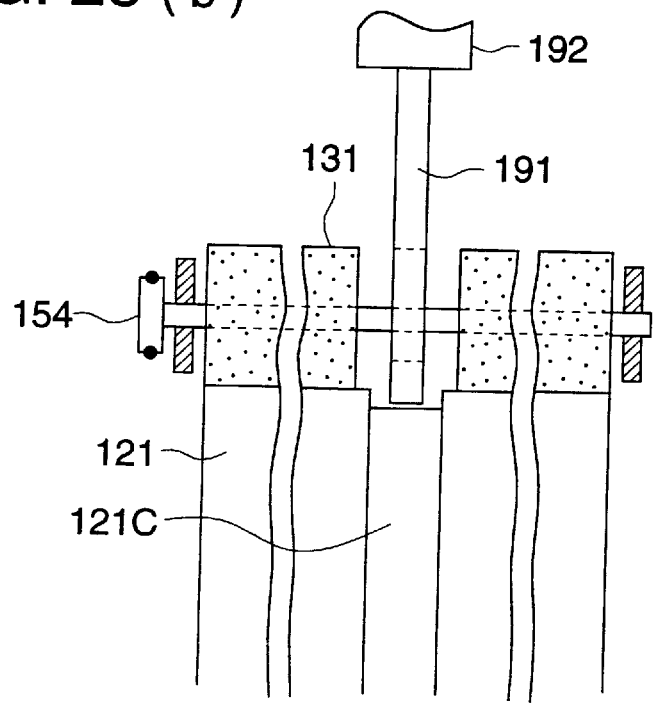

FIGS. 28($a$) and 28($b$) show structural diagrams of primary portions in Embodiment 9 of the invention.

Figure 29:
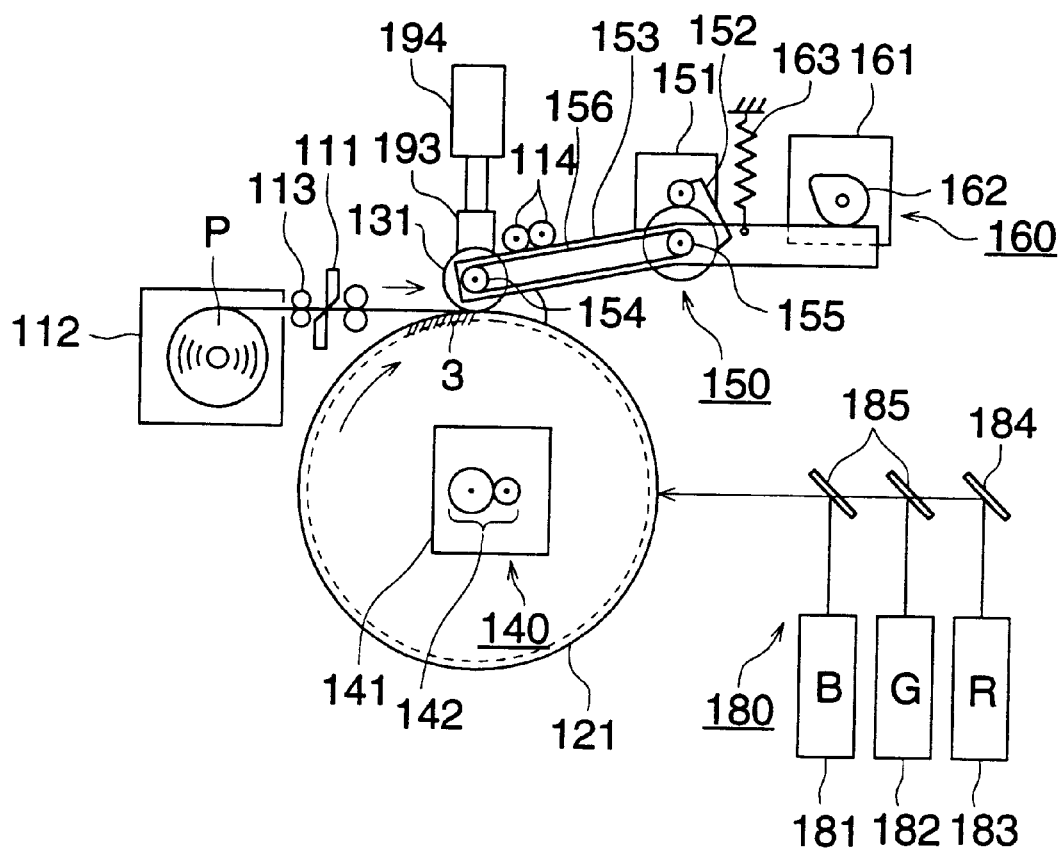

FIG. 29 is a general structural diagram of Embodiment 10 of the invention.

Figure 30:
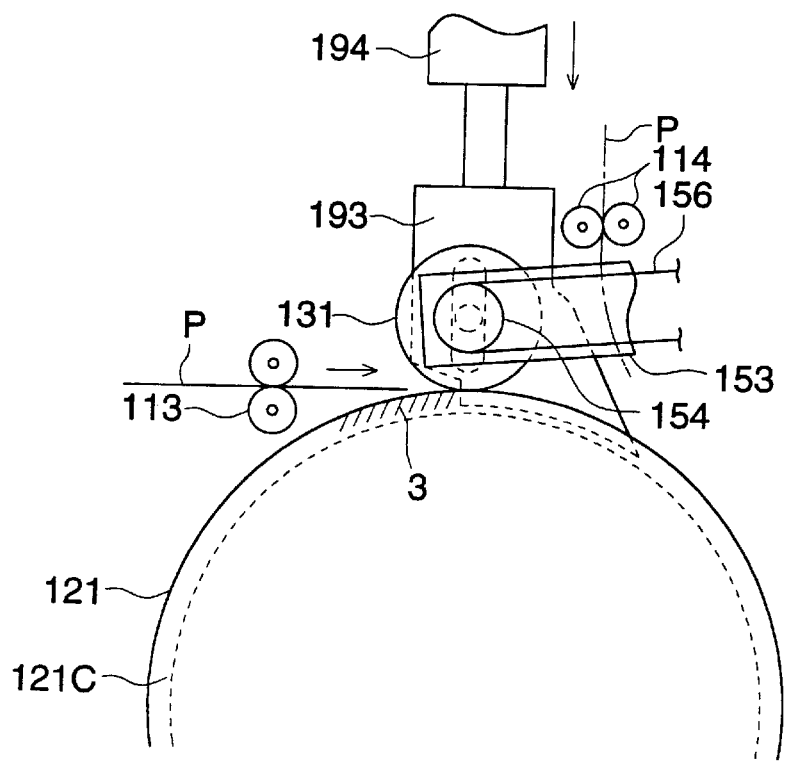
Figure 30:
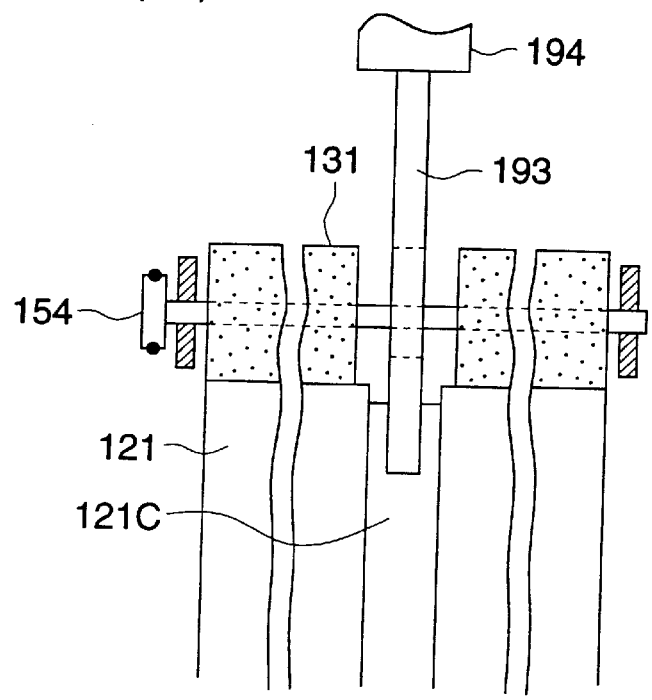

FIGS. 30($a$) and 30($b$) show structural diagrams of primary portions Embodiment 10 of the invention.

Figure 31:
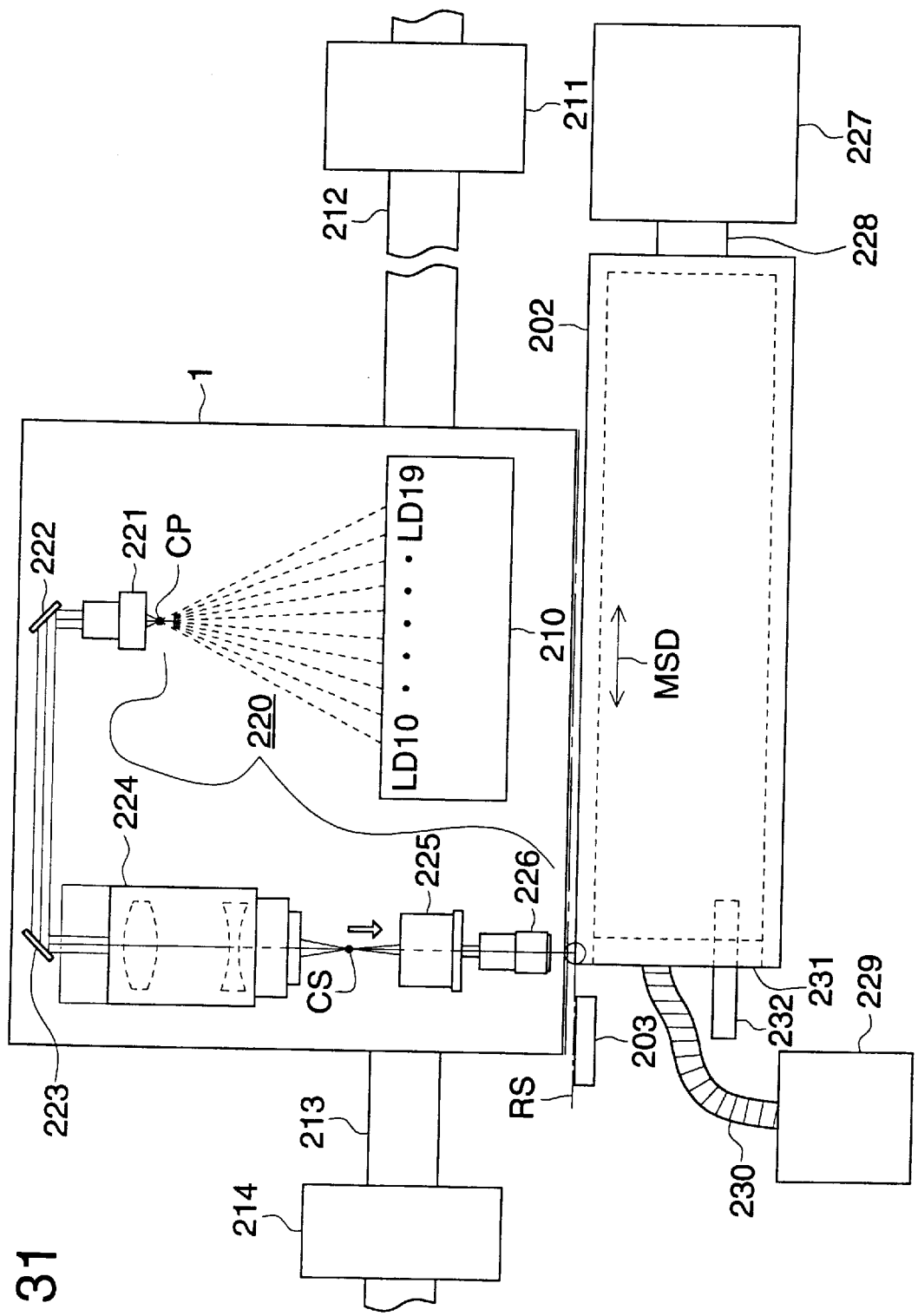

FIG. 31 is a schematic front view of an image recording apparatus in Embodiment 11.

Figure 32:
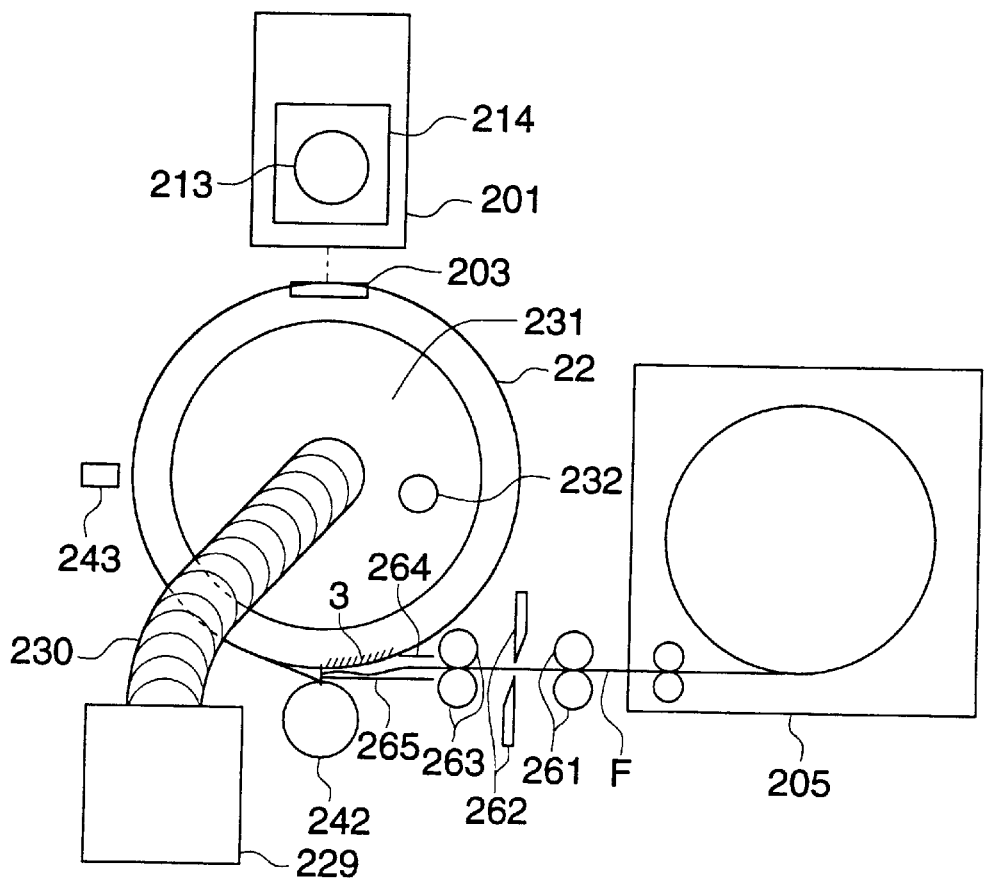

FIG. 32 is a schematic side view of an image recording apparatus in Embodiment 11.

Figure 33:
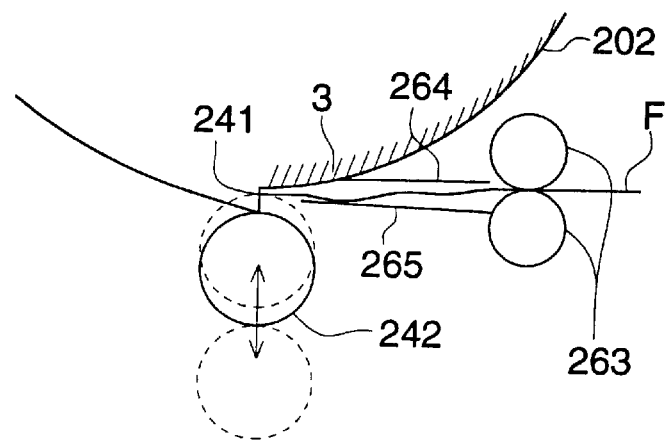

FIG. 33 is a partially enlarged side view of an image recording apparatus in Embodiment 11.

Figure 34:
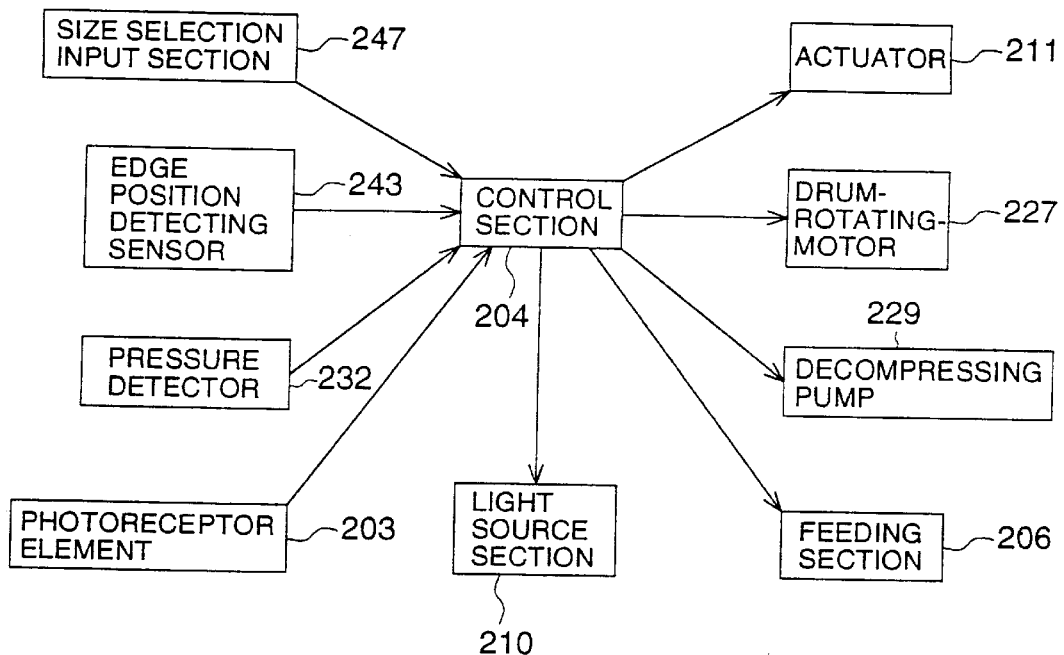

FIG. 34 is a block diagram of an image recording apparatus in Embodiment 11.

Figure 35:
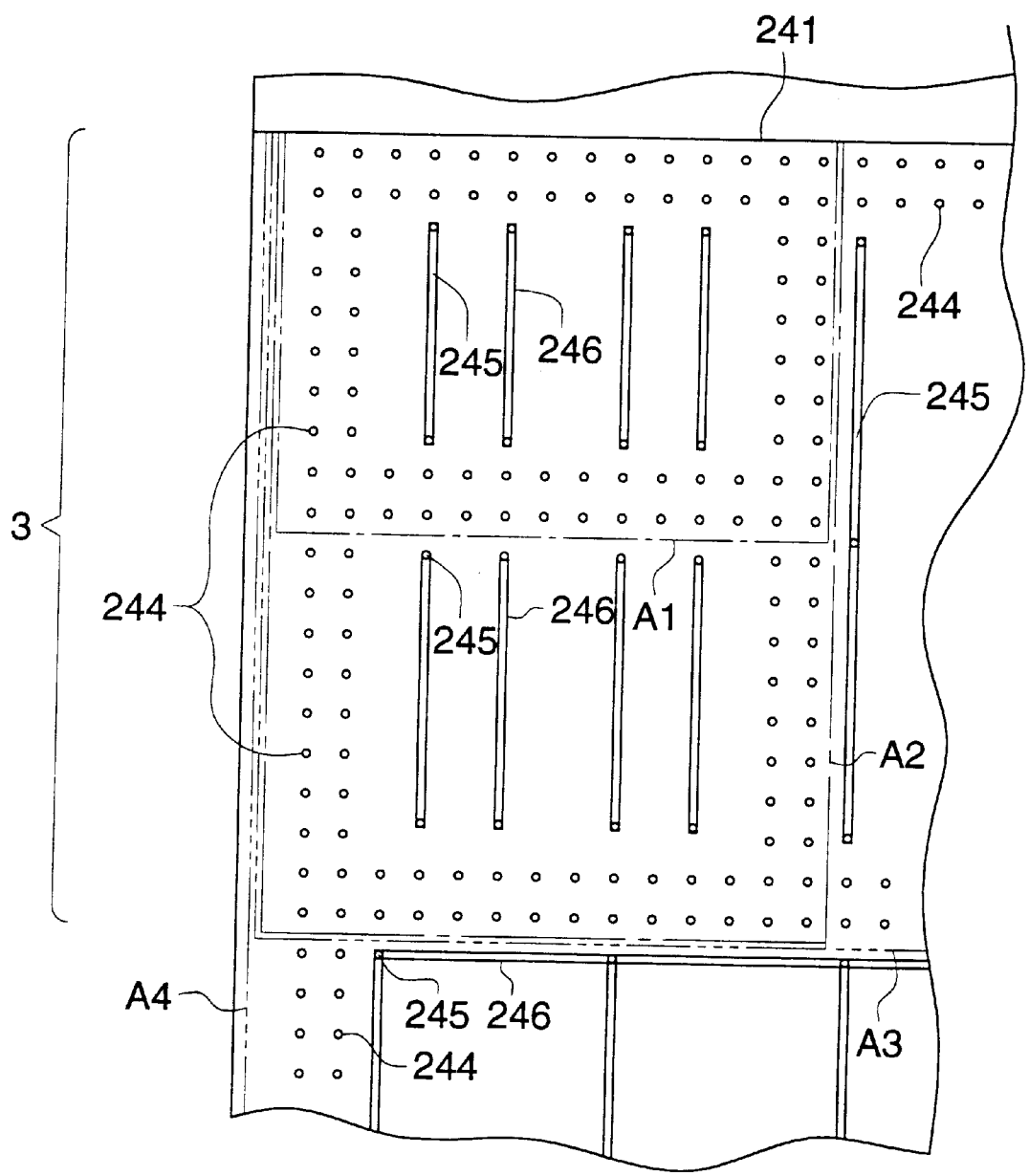

FIG. 35 is a partial development elevation of an example of a rotary drum in Embodiment 11.

Figure 36:
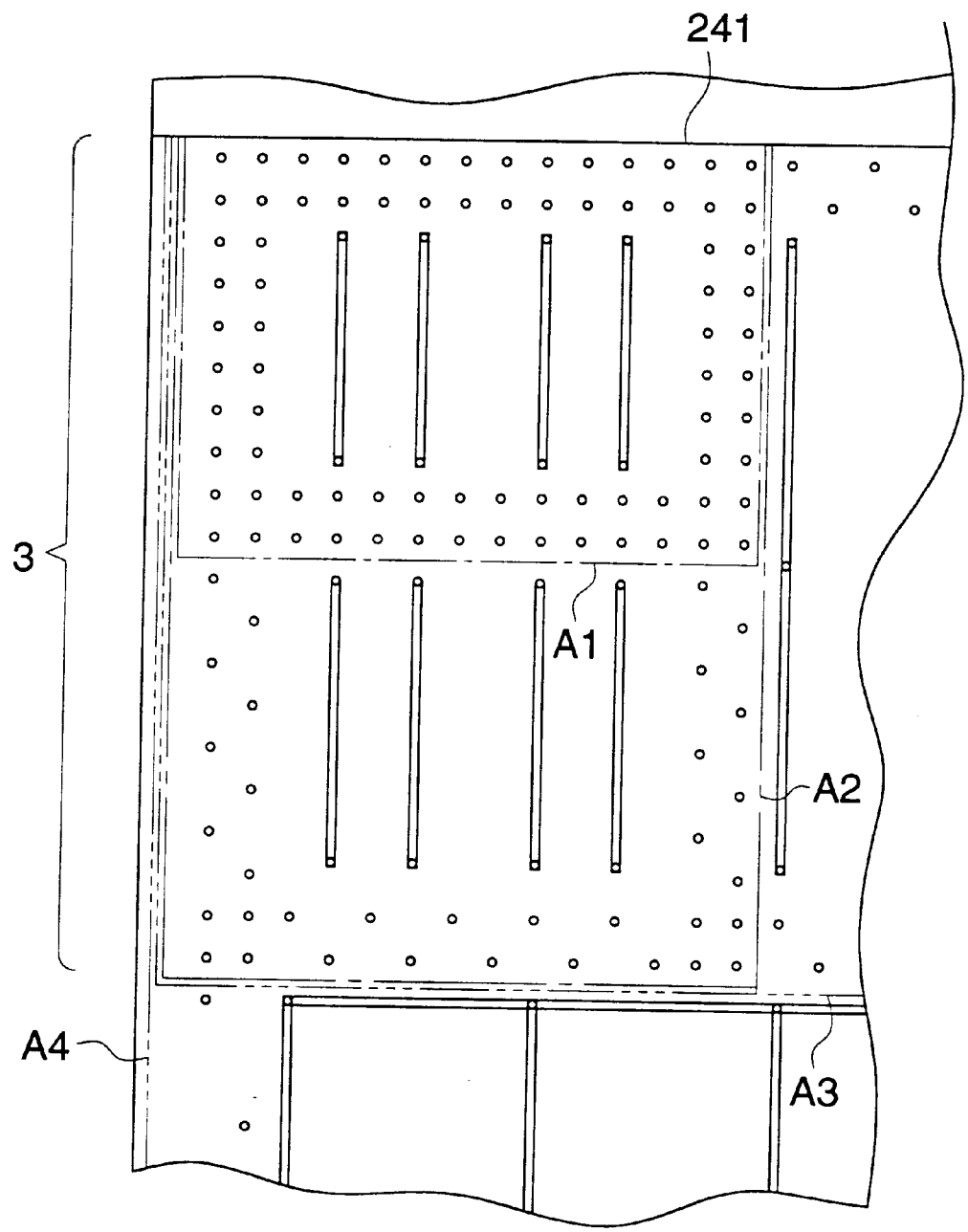

FIG. 36 is a partial development elevation of another example of a rotary drum in Embodiment 11.

DETAILED DESCRIPTION OF THE PREFERRED EMBODIMENT

As an example, there are shown as follows the embodiments of the invention to which the invention is not limited. The embodiments shown below indicate preferable examples of the invention and they limit neither the meaning of terminology in the invention nor the technical scope of the invention.

The image recording apparatus related to the invention will be explained first with reference to FIG. 22. FIG. 22 is a schematic structural diagram showing an example of an embodiment of the image recording apparatus related to the invention. Incidentally, this image recording apparatus has therein a recording sheet supplying mechanism related to Embodiment 6 and a recording sheet exfoliation mechanism.

Image recording apparatus 50 is one employing a recording sheet of a color photographic light-sensitive material as a recording sheet wherein images are recorded on the recording sheet as latent images each being formed by means of light in each of three colors and then the latent images are developed so that recording sheet 57 on which the images are recorded is obtained.

The image recording apparatus 50 has therein exposure section 51 and developing section 52. The exposure section 51 has therein recording sheet cartridge 54 containing web-shaped recording sheet on which no image has been recorded, laser section 53 which applies laser beams each being for blue, green and red on the recording sheet for image recording, and drum 1 which is rotated with the recording sheet wound around it in the course of image recording.

In the image recording apparatus 50, image information converted to digital data are stored in a storage section (not shown). When recording images, a recording sheet is taken out of recording sheet cartridge 54, and is conveyed to drum 1 along sheet-feeding path 55.

When the leading edge of the recording sheet comes in contact with the drum 1, combined-use pump 23 starts operating, and the drum 1 starts its vacuum suction through plural suction holes provided on its circumferential surface, and rotates in the direction shown with an arrow mark. simultaneously with this, the recording sheet is cut by cutter 58 to the prescribed length which can be wound around the circumferential surface of the drum 1. Furthermore, when supplying a recording sheet, vacuum suction exfoliation roller 25 (details of this vacuum suction exfoliation roller will be explained in Embodiment 6) plays a role of a squeeze roller by pressing the recording sheet on the circumferential surface of the drum 1 while conducting air jetting supported by operation of the combined-use pump 23 through plural suction holes provided on the circumferential surface.

Due to the drum 1 which rotates while conducting vacuum suction of the recording sheet and to the vacuum suction exfoliation roller 25 which rotates while conducting pressure contact of the recording sheet and air jetting, the recording sheet cut to the prescribed size can be wound to be free from unevenness on its surface.

After the recording sheet is wound around the circumferential surface of the drum 1, the vacuum suction exfoliation roller 25 is separated from the drum 1. Then, the laser section 53 applies laser beams each being for blue, green and red on the recording sheet on the circumferential surface of the drum 1 in accordance with image information stored in the storage section, while the drum 1 around which the recording sheet is wound is being rotated at the rotating speed of 2000 rpm. Irradiation by means of these laser beams respectively for three colors forms latent images on the recording sheet.

After images have been recorded, the rotating speed of the drum 1 is lowered. Then, when the combined-use pump 23 is controlled so that the drum 1 rotates while conducting air jetting from its circumferential surface, and when the vacuum suction exfoliation roller 25 rotates while conducting vacuum suction and thereby pressing the recording sheet to the circumferential surface of the drum 1, the recording sheet on which latent images are formed are exfoliated from the circumferential surface of the drum 1. The recording sheet thus exfoliated is ejected from the exposure section 51 along ejection path 106 by both the vacuum suction exfoliation roller 25 and conveyance roller 21 and is conveyed to developing section 52.

Then, the recording sheet on which latent images are formed which has been exfoliated from the circumferential surface of the drum 1 is subjected to processes of color developing, bleach-fixing, stabilizing and drying at the developing section 52 (internal structures are not shown) to turn into recording sheet 57 on which images based on image information stored in the storage section are recorded, and then is ejected out of image recording apparatus 50.

The image recording apparatus 50 may also be provided with a scanner section which reads images and converts the image information into digital data.

Structures of Items 1–32 which attain the first object of the invention will be explained with reference to Embodiments 1–6.

Embodiment 1

Figure 1:
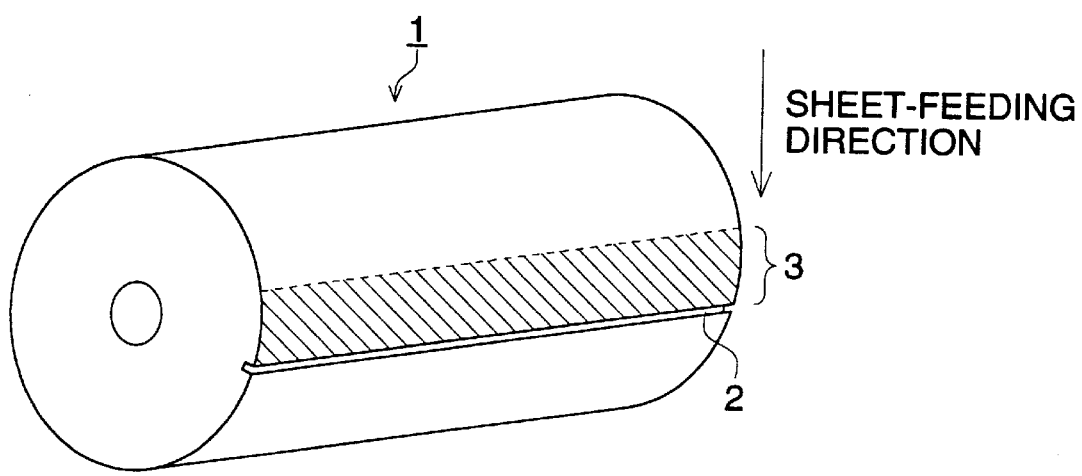
FIG. 1 is a perspective view of a drum of an image recording apparatus.
Figure 2:
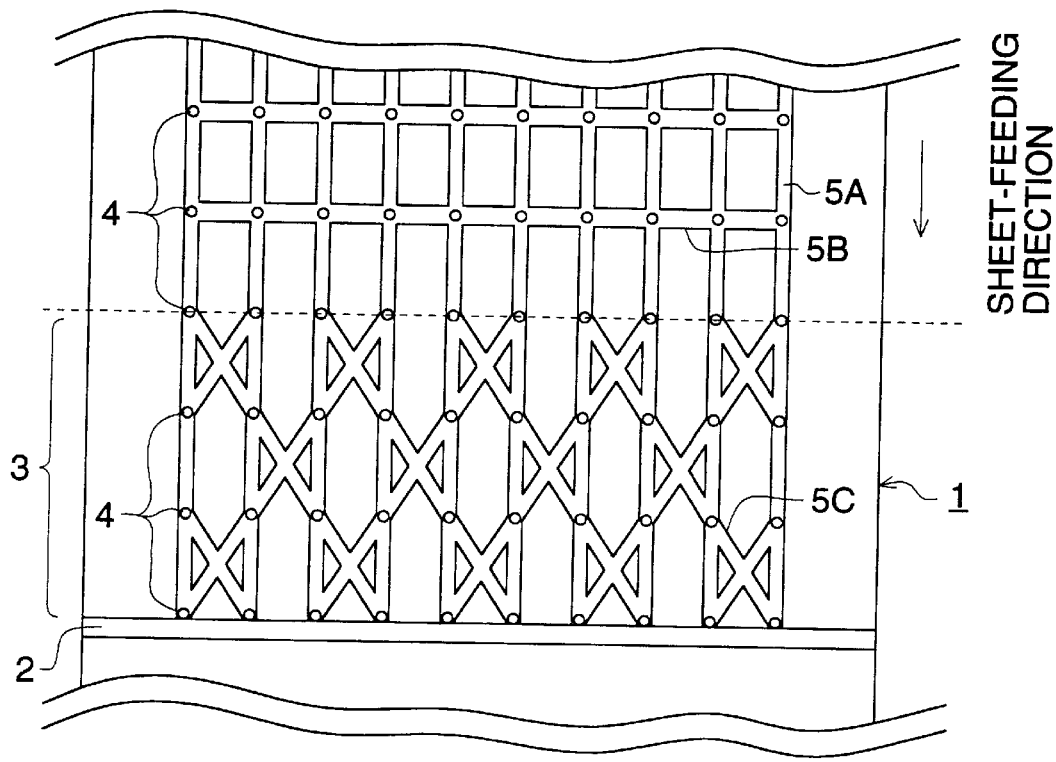
FIG. 2 is a development elevation of an example of Embodiment 1 of the drum circumferential surface related to the invention.

A drum of an image recording apparatus related to the present embodiment will be explained with reference to FIGS. 1 and 2. FIG. 1 is a perspective view of a drum of an image recording apparatus. FIG. 2 is a development elevation of the drum circumferential surface related to the present embodiment.

Drum 1 is a cylindrical one around which a recording sheet is wound to cover the circumferential surface to be rotated when images are recorded. In the case of recording images, a recording sheet is wound around the drum circumferential surface, and the drum around which the recording sheet is wound is rotated so that images are recorded on the recording sheet by an image recording means while the drum is being rotated.

In the present embodiment, the direction in which the recording sheet is fed to be wound around the drum is one shown by an arrow mark in FIGS. 1 and 2, and that direction is perpendicular to the axial direction of the drum.

On the circumferential surface of the drum 1, there is provided, in the axial direction representing the direction perpendicular to the sheet-feeding direction, leading edge positioning groove 2 which can position the leading edge of the recording sheet by catching it when feeding the recording sheet.

On the entire circumferential surface of the drum 1, there are provided, in a constant pattern, many suction holes 4 which fix the recording sheet stably on the drum circumferential surface through vacuum suction when the recording sheet is wound around the circumferential surface of the drum 1. In the present embodiment, the suction holes 4 are provided to be arranged regularly both in the circumferential direction and the axial direction.

In addition to the foregoing, suction-communicating grooves 5A, 5B and 5C which communicate the suction holes 4 are provided on the drum circumferential surface so that vacuum suction force from the suction hole 4 may be transmitted more evenly to the entire drum circumferential surface.

Suction-communicating grooves on the circumferential surface of the drum 1 are usually composed of suction-communicating groove 5A which communicates suction hole 4 with suction hole 4 in the circumferential direction of the drum 1 and of suction-communicating groove 5B which communicates suction hole 4 with suction hole 4 in the axial direction of the drum 1. In the present embodiment, however, there is provided suction-communicating groove 5C which is diagonal to the sheet-feeding direction on recording sheet leading edge supplying section 3 where the recording sheet touches the circumferential surface of the drum 1, in place of suction-communicating groove 5B in the axial direction of the drum 1.

Due to this structure, it is possible to prevent sheet-feeding trouble caused by the leading edge of the recording sheet which is caught by suction-communicating groove 5B in the axial direction when supplying the recording sheet to the drum 1.

Incidentally, for supplying a recording sheet, it is also possible to provide the suction-communicating groove 5C which is diagonal to the sheet-feeding direction not on the recording sheet leading edge supplying section 3 alone but on the entire circumferential surface of the drum 1 without providing the suction-communicating groove 5B in the axial direction of the drum 1

Embodiment 2

Figure 3:
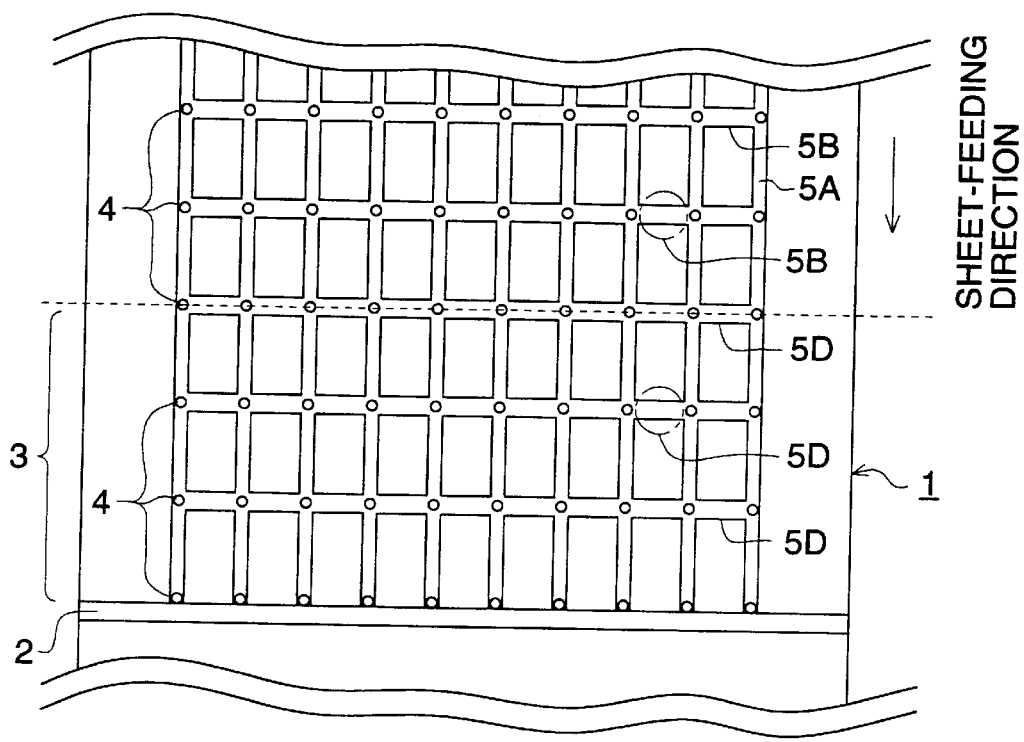
FIG. 3 is a development elevation of an example of Embodiment 2 of the drum circumferential surface related to the invention.
Figure 4:
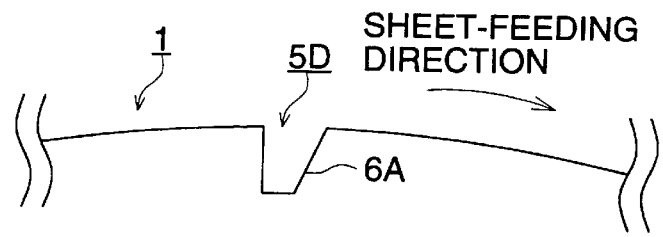
FIG. 4 is a sectional view of an example of Embodiment 2 of a suction-communicating groove related to the invention which is provided, to be in parallel with the axial direction of a drum, at the position on the circumferential surface that is touched by the recording sheet when it is supplied.
Figure 5:
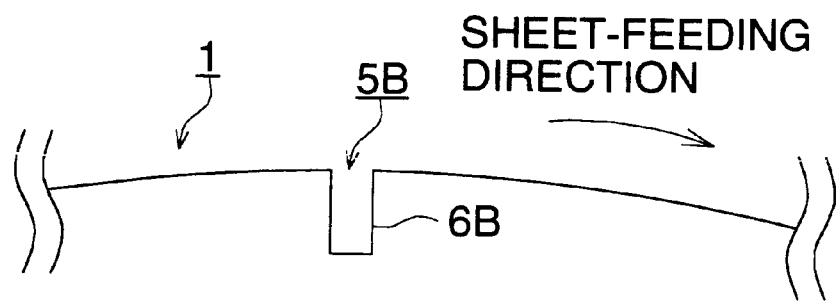
FIG. 5 is a sectional view of a conventional suction-communicating groove in the axial direction of the drum.
Figure 6:
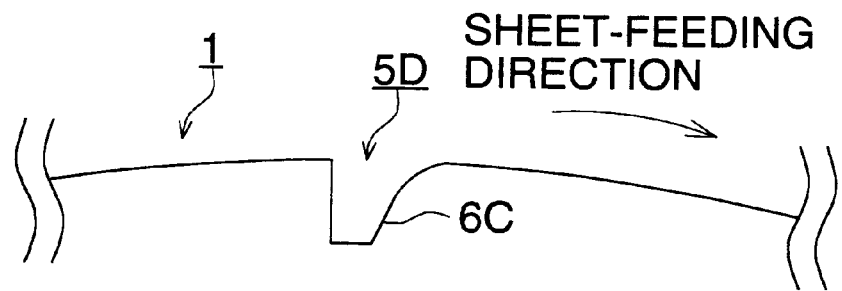
FIG. 6 is a sectional view of an example of Embodiment 2 of a suction-communicating groove related to the invention which is provided, to be in parallel with the axial direction of a drum, at the position on the circumferential surface that is touched by the recording sheet when it is supplied.

A drum of an image recording apparatus related to the present embodiment will be explained with reference to FIGS. 1 and 2. FIG. 1 is a perspective view of a drum of an image recording apparatus. FIG. 3 is a development elevation of the drum circumferential surface related to the present embodiment. FIG. 4 is a sectional view of a suction-communicating groove in the axial direction of the drum related to the present embodiment provided at the position on the circumferential surface that is touched by the recording sheet when it is supplied. FIG. 5 is a sectional view of an ordinary suction-communicating groove in the axial direction of the drum. FIG. 6 is a sectional view of another example of a suction-communicating groove related to the present embodiment which is provided at the portion on the circumferential surface that is touched by the recording sheet when it is supplied.

In the present embodiment, patterns of suction-communicating grooves 5A, 5B and 5D are different from those in Embodiment 1, but other structures are the same as those in Embodiment 1 and explanation of the details of them will be omitted here accordingly.

A suction-communicating groove on the circumferential surface of drum 1 is usually composed of suction-communicating groove 5A which communicates between suction hole 4 and suction hole 4 in the circumferential direction of the drum 1 and of suction-communicating groove 5B which communicates between suction hole 4 and suction hole 4 in the axial direction of the drum 1 which is perpendicular to the suction-communicating groove 5A. With regard to a section of the suction-communicating groove 5B provided in the axial direction, both the side of the section at the upstream side in the sheet-feeding direction and the side 6B of the section at the downstream side in the sheet-feeding direction are at right angles to the circumferential surface of the drum 1 as shown in FIG. 5. Therefore, when the leading edge of the recording sheet enters the suction-communicating groove 5B in the course of sheet-feeding, the leading edge of the recording sheet is caught by the groove, resulting in sheet-feeding trouble.

In the present embodiment, however, a section of suction-communicating groove 5D in the axial direction of the drum 1 located at the recording sheet leading edge supplying section 3 for sheet-feeding for winding a recording sheet around a drum is one shown in FIG. 4 wherein the side of the section at the upstream side in the sheet-feeding direction is at right angles to the circumferential surface of the drum 1 but the side 6A of the section at the downstream side in the sheet-feeding direction is tilted so that a width of the upper portion of the groove is greater. Therefore, even when the leading edge of the recording sheet enters the suction-communicating groove 5D in the course of sheet-feeding, the leading edge of the recording sheet can easily get out of the groove again without being caught by the suction-communicating groove 5D, resulting in no sheet-feeding trouble.

Further, when the side is tilted and chamfered as shown on side 6C of the section at the downstream side in the sheet-feeding direction of the suction-communicating groove 5D in FIG. 6, the leading edge of the recording sheet can get out of the groove more easily when it enters the suction-communicating groove 5D, thus the sheet-feeding trouble can further be prevented.

Incidentally, it is also allowed that not only the suction-communicating grooves on the recording sheet leading edge supplying section 3 for sheet-feeding but also all of the suction-communicating grooves in the axial direction on the entire circumferential surfaces of the drum 1 are made to be like the suction-communicating groove 5D whose side 6A at the downstream side in the sheet-feeding direction is tilted.

Embodiment 3

Figure 7:
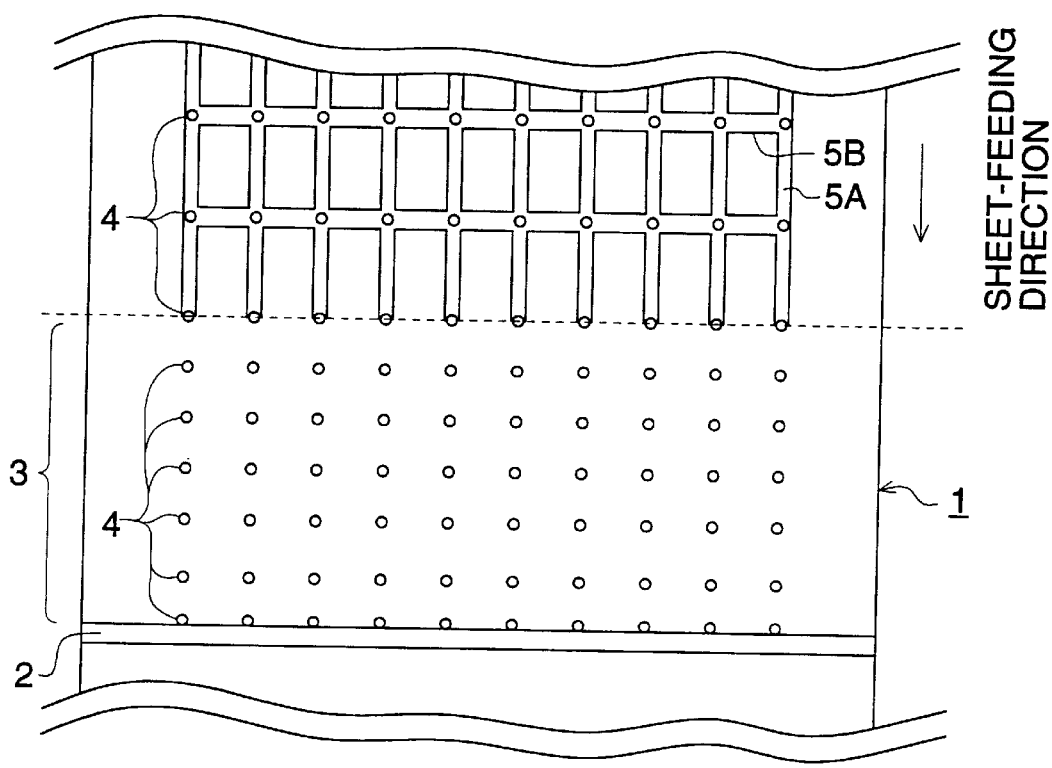
FIG. 7 is a development elevation of an example of Embodiment 1 of the drum circumferential surface related to the invention.

A drum of an image recording apparatus related to the present embodiment will be explained with reference to FIGS. 1 and 7. FIG. 1 is a perspective view of a drum of an image recording apparatus. FIG. 7 is a development elevation of the drum circumferential surface related to the present embodiment.

In the present embodiment, patterns of suction-communicating grooves 5A and 5B are different from those in Embodiment 1, but other structures are the same as those in Embodiment 1 and explanation of the details of them will be omitted here accordingly.

A suction-communicating groove on the circumferential surface of drum 1 is usually composed of suction-communicating groove 5A which communicates between suction hole 4 and suction hole 4 in the circumferential direction of the drum 1 and of suction-communicating groove 5B which communicates between suction hole 4 and suction hole 4 in the axial direction of the drum 1 which is perpendicular to the suction-communicating groove 5A. However, the present embodiment is characterized in that no suction-communicating groove is provided on the recording sheet leading edge supplying section 3 for sheet-feeding for winding a recording sheet around a drum. Instead, the number of suction holes 4 on the portion 3 where the recording sheet touches the drum circumferential surface 1 when feeding the recording sheet is made greater than that on the other circumferential surface of the drum 1 in the structure, so that uniformity of vacuum suction force may be kept.

Due to this structure, it is possible to prevent sheet-feeding trouble caused by the leading edge of the recording sheet which is caught by suction-communicating groove 5B in the axial direction when supplying the recording sheet to the drum 1.

Figure 8:
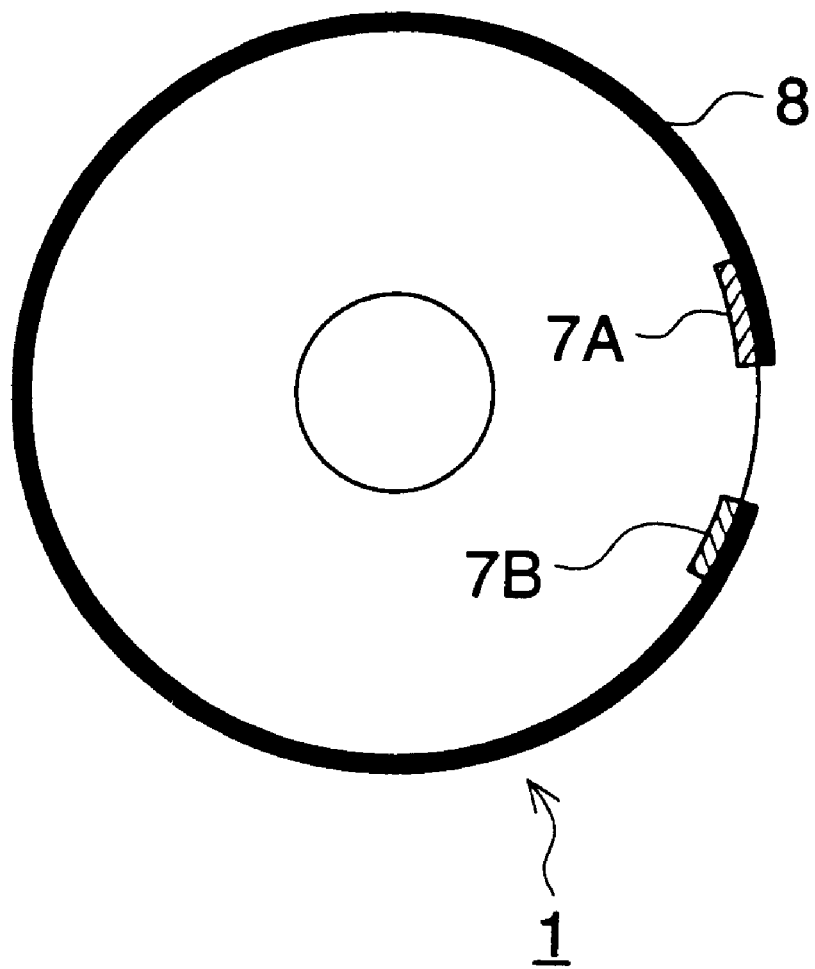
FIG. 8 is a sectional view of a drum related to the invention wherein an adhesive member is provided at the position on the circumferential surface that is touched by the recording sheet when it is supplied.

Incidentally, it is also possible in any of Embodiments 1–3 to provide adhesive members 7A and 7B respectively at a drum circumferential surface portion where the leading edge of the recording sheet is positioned when the recording sheet is wound around drum 1 and a drum circumferential surface portion where the trailing edge of the recording sheet is positioned so that the position of the leading edge of the recording sheet may be fixed through adhesion of the adhesive members 7A and 7B as shown in FIG. 8, in place of providing leading edge position determining groove 2 on the circumferential surface of the drum 1.

It is also acceptable that the leading edge position determining groove and the adhesive member are used together.

The foregoing represents examples of a drum circumferential surface related to the invention.

Next, there will be shown some embodiments concerning the mechanism for feeding a recording sheet to a drum and for exfoliating the recording sheet from the drum in an image recording apparatus related to the invention.

Though a drum used in the present embodiment is not limited in particular, it is preferable that a drum is one shown in either of Embodiments 1–3.

Incidentally, let it be assumed that the following embodiment employs a drum which is provided with a leading edge position determining groove as a means to determine a leading edge of the recording sheet, without using adhesive members.

Embodiment 4

Structures of surroundings of a drum and a mechanism for feeding a recording sheet to the drum and for exfoliating the recording sheet from the drum will be explained with reference to FIGS. 9(A), 9(B), 10 and 11. Each of FIGS. 9(A) and 9(B) is a schematic illustration showing an example of the embodiment relating to the mechanism for sheet supply to the drum. FIG. 10 is a schematic illustration showing an example of an embodiment of a mechanism for exfoliation of a recording sheet from the drum. FIG. 11 is a top view of an exfoliating roller and an exfoliating guide relating to the mechanism for sheet supply to the drum.

First, structures surrounding a drum will be explained as follows.

Since a shape and a role of drum 1 have already been explained in Embodiments 1–3, explanation thereof is omitted here. Drum-rotating pump 14 is connected to the drum 1 through vent pipe 13A for the purpose of conducting vacuum suction and air jetting through plural suction holes 4 on the circumferential surface of the drum 1. The drum-rotating pump 14 is connected to pump control means 16 which controls vacuum suction and air jetting.

Facing the drum 1, there is rotatably provided exfoliation roller 9 which is an exfoliating member for exfoliating recording sheet 8 wound around the circumferential surface of the drum 1 from the drum 1 by touching the recording sheet 8 wound around the circumferential surface of the drum 1. The exfoliation roller 9 is a tandem roller wherein plural small rollers are provided at prescribed internals on shaft 18 as shown in FIG. 11. A material of the surface of the roller is adhesive substance such as silicone. Therefore, the exfoliating member (exfoliation roller 9) exfoliates a recording sheet from the drum by sticking the recording sheet to the roller surface. Incidentally, a section of the shaft 18 of the exfoliation roller 9 can be regarded as a groove of the exfoliation roller 9. The shaft 18 is hollow, and it is provided with plural small air-jetting holes 80 communicating from the surface of the shaft to the surface of the roller.

The shaft 18 is connected to pump for exfoliation roller 15 through vent pipe 13B for jetting air through plural air-jetting holes 80 located on the circumferential surface of the exfoliation roller 9. The pump for exfoliation roller 15 is connected to the same pump control means 16 which is connected to the drum-rotating pump 14.

On the exfoliation roller 9, there is provided a moving means (not shown) which moves the exfoliation roller 9, and it is possible to cause the exfoliation roller 9 to be brought into pressure contact with a recording sheet on the circumferential surface of the drum 1 and to cause the exfoliation roller 9 to be separated from the drum 1 by moving the exfoliation roller 9 in the horizontal direction. To the moving means for the exfoliation roller 9, there is connected movement control unit 17 which controls a movement of the exfoliation roller 9.

Below the exfoliation roller 9, there is provided exfoliation guide 10 which is an exfoliation auxiliary member for exfoliating the recording sheet which has been exfoliated from the drum 1 by the exfoliation roller 9 from the exfoliation roller 9, in a way that the exfoliation guide is in contact with the groove of the exfoliation roller 9, namely with the section of the shaft 18. The exfoliation guide 10 whose front edge is of a crenel-shaped pattern which is the reverse of that of the exfoliation roller 9 representing a tandem roller as shown in FIG. 11 can come in contact with the exfoliation roller 9 with both crenel-shaped patterns engaged with each other.

On the exfoliation guide 10, there is provided a moving means (not shown) which lifts the front edge of the exfoliation guide 10 with a rear edge thereof serving as a fulcrum and thereby causes the front edge thereof to engage with the exfoliation roller 9. The exfoliation guide 10 is connected to the same movement control means 17 which is connected to the exfoliation foliation roller 9, and movement of the exfoliation guide 10 is controlled by the movement control means 17.

Under the exfoliation guide 10, there is provided recording sheet guide 11 which guides the recording sheet which has been exfoliated from the exfoliation roller 9 by the exfoliation guide 10, and on the edge portion of recording sheet guide, there is provided conveyance roller 12 which conveys the recording sheet to an ejection path.

The foregoing is explanation of the structures surrounding the drum. Next, a mechanism for feeding the recording sheet to the drum will be explained with reference to FIGS. 9(A) and 9(B).

When signals to conduct sheet feeding are received by a sheet-feeding means (not shown), recording sheet 8 is fed to the drum 1 by the sheet-feeding means in the sheet-feeding direction shown with an arrow mark.

In the case of sheet feeding, the leading edge of the recording sheet 8 enters leading edge position determining groove 2 on the drum circumferential surface 1, and thereby the position of the leading edge of the recording sheet on the drum circumferential surface is determined. Incidentally, the position of the drum rotation is detectable, and the drum 1 is arranged to rotate and to stop so that the position of the leading edge position determining groove 2 on the drum 1 is always constant when feeding the recording sheet. It is therefore possible to determine stably the position of the leading edge of the recording sheet in the case of sheet feeding.

Namely, as shown in FIG. 9(A), when supplying a recording sheet to a drum, a drum control means (not shown) controls so that the recording sheet leading edge supplying section 3 on the drum 1 which is not provided with a suction-communicating groove which is in parallel with a side of the leading edge of the recording sheet in the direction to supply the recording sheet to the drum may come to the position to which the leading edge of the recording sheet is supplied.

The drum control means may either be controlled by a control unit such as a computer or an LSI, or be controlled mechanically.

As a method by means of the control unit such as a computer or an LSI, there is considered a method wherein the position of a drum is detected by a detection means such as an infrared ray sensor or a pressure sensor, and when the recording sheet leading edge supplying section 3 on the drum 1 is detected by the detection means to come to the position to which the leading edge of the recording sheet is fed, detection signals are transmitted to a control unit, and the control unit controls a motor for rotating drum 1 to stop with transmission of the detection signals, and further controls to operate a brake means which stops drum 1 by applying physical force to the drum 1.

As a method to control mechanically, there is considered a method wherein rotation of a drum is stopped by providing an engaging means which engages mechanically so that recording sheet leading edge supplying section 3 on the drum 1 may come to the position to which the leading edge of the recording sheet is fed when supplying the recording sheet to the drum, or the recording sheet leading edge supplying section 3 moves the drum 1 mechanically to the position to which the leading edge of the recording sheet is fed when supplying the recording sheet to the drum 1.

When the leading edge of recording sheet 8 enters leading edge position determining groove 2 on the drum circumferential surface 1, and thereby the position of the leading edge of the recording sheet on the drum circumferential surface is determined, pump control means 16 controls drum-rotating pump 14 to perform vacuum suction and controls pump for exfoliation roller 15 to perform air-jetting.

With vacuum suction performed by the drum-rotating pump 14, suction force (illustrated as arrow marks in a drum in FIG. 9(B)) from suction holes and suction-communicating grooves on the drum circumferential surface makes the leading edge of recording sheet 8 to be in close contact with the circumferential surface of the drum 1 without causing unevenness. With air-jetting (illustrated as arrow marks from the exfoliation roller in FIG. 9(B)) performed by the pump for exfoliation roller 15, the recording sheet 8 is pressed against the circumferential surface of the drum 1 by air-jetting from air-jetting holes 80 on the surface of the exfoliation roller 9, and close contact of the recording sheet 8 on the circumferential surface of the drum 1 is improved.

Thus, the leading edge of the recording sheet 8 is caused to be in close contact with the circumferential surface of the drum 1 and then the drum 1 is rotated in the arrowed direction, whereby the recording sheet 8 can be wound around the circumferential surface of the drum 1 to be in close contact therewith. Owing to vacuum suction of the drum 1 and air-jetting force from the exfoliation roller 9, the recording sheet 8 can be wound around the circumferential surface of the drum 1 to be in close contact therewith without causing unevenness on the surface of the recording sheet 8. Due to the mechanism mentioned above, a recording sheet is supplied to a drum. After the recording sheet 8 is supplied to the drum 1 and wound around it, the recording sheet 8 is subjected to image recording.

Incidentally, the pump control means 16 controls so that the drum-rotating pump 14 continues vacuum suction even after the recording sheet has been supplied, while the pump for exfoliation roller 15 stops air-jetting after the recording sheet has been supplied.

Image recording is carried out by exposing the recording sheet 8 to light by means of a laser while rotating the drum 1 around which the recording sheet 8 is wound at a high rotation speed of 2000 rpm. Though it is preferable from a point of view of rapid image recording that the rotation speed is not less than 2000 rpm, the rotation speed of not less than 1000 rpm or not less than 300 rpm is also allowed. In the present embodiment, it is not necessary to provide on the drum 1 a groove for exfoliating a recording sheet which is in parallel with the direction of drum rotation. Therefore, swelling which is caused by air entering the groove for exfoliating a recording sheet under the high-speed rotation is not caused, flatness of the recording sheet wound around the drum circumferential surface can be kept in a good condition despite the high-speed rotation, and images with high image quality can be recorded.

Incidentally, even when a suction-communicating groove is provided on the circumferential surface of a drum as a groove which is in parallel with the direction of drum rotation, it is a groove for transmitting the vacuum suction force to the entire circumferential surface of the drum by communicating between suction holes. Therefore, even when air enters that groove under the high-speed rotation, the air is sucked, and thereby no swelling is caused, resulting in no deterioration of flatness of the recording sheet wound around the drum circumferential surface under the high-speed rotation. Then, after the image recording, the recording sheet 8 on which images are recorded is exfoliated from the circumferential surface of the drum 1 and is led to an ejection path.

Next, the mechanism through which recording sheet 8 is exfoliated from drum 1 will be explained with reference to FIG. 10.

The drum 1 is arranged to rotate and to stop while it carries recording sheet 8 wound around the drum so that the leading edge position determining groove 2 at which the leading edge of the recording sheet is positioned may come to the point where the groove faces exactly the exfoliation roller 9 when a drum rotation control means (not shown) receives signals for exfoliation of the recording sheet after image recording. Due to this, it is possible to determine stably the position of the leading edge of the recording sheet in the case of exfoliation.

After the drum 1 rotates and stops so that the leading edge position determining groove 2 at which the leading edge of the recording sheet 8 is positioned comes to the point where the groove faces exactly the exfoliation roller 9, movement control means 17 controls a moving means so that the moving means moves the exfoliation roller 9 horizontally to be brought into pressure contact with the drum 1. When the exfoliation roller 9 is moved horizontally to be brought into pressure contact with the drum 1, the leading edge of the recording sheet positioned at the point to face the exfoliation roller 9 comes in contact with the exfoliation roller 9 to be pressed thereby. Since the surface of the exfoliation roller 9 is adhesive, the exfoliation roller 9 can hold the leading edge of the recording sheet wound around the drum circumferential surface by making pressure contact with the leading edge of the recording sheet on the drum circumferential surface.

The movement control means 17 moves the exfoliation roller 9 and makes exfoliation guide 10 having on its front edge portion a crenel-shaped pattern which is the reverse of that of the exfoliation roller 9 representing a tandem roller to touch the groove of the exfoliation roller 9, namely to engage with a crenel-shaped pattern of the exfoliation roller 9, by lifting the front edge of the exfoliation guide 10 with its rear edge serving as a fulcrum.

After the leading edge of a recording sheet is held on the surface of the exfoliation roller 9 which has moved horizontally to press recording sheet 8, pump control means 16 releases vacuum suction of drum-rotating pump 14, and then controls the drum-rotating pump 14 to exhaust for air-jetting. Due to the air-jetting (illustrated as arrow marks in the drum in FIG. 10) through suction holes on the circumferential surface of the drum 1, recording sheet 8 wound around the circumferential surface of the drum 1 is lifted, making it easy to exfoliate the recording sheet and making it unnecessary to rotate the drum 1 depending on the exfoliating speed. Incidentally, air-jetting from the drum 1 may also be conducted after the exfoliation roller 9 rotates slightly while holding thereon the leading edge of the recording sheet and thereby the recording sheet 8 is exfoliated slightly from the drum 1, without being conducted immediately after the leading edge of the recording sheet is held on the surface the exfoliation roller 9.

The recording sheet 8 is exfoliated from the circumferential surface of the drum 1 by rotating the exfoliation roller 9 in the arrowed direction after the leading edge of the recording sheet is stuck to and held on the surface of the exfoliation roller 9. Further, concurrently with that, the drum 1 also rotates in the arrowed direction. The recording sheet 8 stuck to the exfoliation roller 9 is immediately exfoliated from the exfoliation roller 9 by exfoliation guide 10 which is in contact with the exfoliation roller 9, and is conveyed to conveyance roller 12 provided on the front edge of recording sheet guide 11 by the exfoliation guide 10 and the recording sheet guide 11 which is located at the position where it faces the exfoliation guide 10, then is nipped by the conveyance roller 12 rotating in the arrowed direction to be conveyed to an ejection path.

Upon completion of exfoliation of the recording sheet 8 from the circumferential surface of the drum 1, pump control means 16 controls to release exhaustion conducted by drum-rotating pump 14. Further, the drum 1, exfoliation roller 9 and conveyance roller 12 stop rotating, and movement control means 17 controls so that the front edge portion of the exfoliation guide 10 is lowered to be separated from the exfoliation roller 9, and the exfoliation roller 9 is moved to the position where the exfoliation roller 9 is away from the drum 1.

A recording sheet is exfoliated from a drum in the mechanism mentioned above.

Embodiment 5

Another embodiment of structures surrounding a drum in an image recording apparatus and of mechanisms for feeding a recording sheet to a drum and for exfoliating the recording sheet from the drum will be explained with reference to FIGS. 12, 13 and 14. FIG. 12 is a schematic illustration showing an example of Embodiment relating the mechanism for sheet supply to the drum. FIG. 13 is a schematic illustration showing a mechanism to start exfoliation when exfoliating a recording sheet from a drum. FIG. 14 is a schematic illustration showing an example of an embodiment of a mechanism to exfoliate a recording sheet from a drum.

The structures surrounding a drum are explained below.

Since a shape and a role of drum 1 have already been explained in Embodiments 1–3, explanation thereof is omitted here. Drum-rotating pump 14 is connected to the drum 1 through vent pipe 13A for the purpose of conducting vacuum suction and air jetting through plural suction holes 4 on the circumferential surface of the drum 1. The drum-rotating pump 14 is connected to pump control means 16 which controls vacuum suction and air jetting.

Facing the drum 1, there is rotatably provided to be away from the drum 1 electrostatic attraction exfoliation roller 20 which is an exfoliating member for exfoliating recording sheet 8 wound around the circumferential surface of the drum 1 through electrostatic attraction from the drum 1 by touching the recording sheet 8 wound around the circumferential surface of the drum 1 (the state wherein the electrostatic attraction exfoliation roller 20 is away from the drum 1 is not shown). The electrostatic attraction exfoliation roller 20 is not a tandem roller such as the exfoliation roller, but is a single cylindrical roller whose length is mostly the same as that of the drum. Incidentally, the electrostatic attraction exfoliation roller 20 is an exfoliation/squeeze combined use roller having a function to exfoliate a recording sheet from the drum and a function to squeeze the recording sheet in the course of sheet feeding and thereby to cause the recording sheet to come in close contact with the drum. On the surface thereof, there are provided plural holes for air-jetting.

On the electrostatic attraction exfoliation roller 20, there is provided an electrostatic charge generating means (not shown) to which electrostatic attraction control means 22 is connected. When the electrostatic attraction control means 22 controls an electrostatic charge generating means of the electrostatic attraction exfoliation roller 20 to generate electrostatic charges, electrostatic attractive force is generated on the surface of the electrostatic attraction exfoliation roller 20. The recording sheet is exfoliated from the drum when the electrostatic attraction exfoliation roller 20 is brought into contact with the recording sheet on the circumferential surface of the drum 1 under the condition that electrostatic attractive force is generated on the surface of the electrostatic attraction exfoliation roller 20.

For the purpose of jetting air through plural air-jetting holes located on the circumferential surface of the electrostatic attraction exfoliation roller 20, pump 81 for electrostatic attraction exfoliation roller is connected through vent pipe 13B. The pump 81 for electrostatic attraction exfoliation roller is connected to the same pump control means 16 to which the drum-rotating pump 14 is connected, and air-jetting is controlled by the pump control means 16.

On the electrostatic attraction exfoliation roller 20, there is provided a moving means (not shown) which can press the electrostatic attraction exfoliation roller 20 against the drum 1 or separate the electrostatic attraction exfoliation roller 20 from the drum 1, by moving the electrostatic attraction exfoliation roller 20 horizontally. To the moving means for the electrostatic attraction exfoliation roller 20, there is connected movement control means 19 which controls the movement of the electrostatic attraction exfoliation roller 20.

Under the electrostatic attraction exfoliation roller 20, there is provided conveyance roller 21 which nips a recording sheet together with the electrostatic attraction exfoliation roller 20 to convey the recording sheet to an ejection path, to be away from and to face the electrostatic attraction exfoliation roller 20.

On the conveyance roller 21, there is provided a moving means (not shown) which moves on the conveyance roller 21 upward and downward and can press the conveyance roller 21 against the electrostatic attraction exfoliation roller 20 or separate the conveyance roller 21 from the electrostatic attraction exfoliation roller 20. The moving means for conveyance roller 21 is connected to the same movement control means 19 with which the electrostatic attraction exfoliation roller 20 is connected, and movement of the conveyance roller 21 is controlled by the movement control means 19.

The foregoing is explanation of the structures surrounding the drum. Next, a mechanism for feeding the recording sheet to the drum will be explained with reference to FIG. 12.

When signals to conduct sheet feeding are received by a sheet-feeding means (not shown), recording sheet 8 is fed to the drum 1 by the sheet-feeding means in the sheet-feeding direction shown with an arrow mark.

In the case of sheet feeding, the leading edge of the recording sheet 8 enters leading edge position determining groove 2 on the drum circumferential surface 1, and thereby the position of the leading edge of the recording sheet on the drum circumferential surface is determined. Incidentally, the position of the drum rotation is detectable, and the drum 1 is arranged to rotate and to stop so that the position of the leading edge position determining groove 2 on the drum 1 is always constant when feeding the recording sheet. It is therefore possible to determine stably the position of the leading edge of the recording sheet in the case of sheet feeding. Namely, when supplying a recording sheet to a drum, a drum control means (not shown) controls so that the recording sheet leading edge supplying section 3 on the drum 1 which is not provided with a suction-communicating groove which is in parallel with a side of the leading edge of the recording sheet in the direction to supply the recording sheet to the drum may come to the position to which the leading edge of the recording sheet is supplied, which is the same as the description in Embodiment 4.

When the leading edge of recording sheet 8 enters leading edge position determining groove 2 on the drum circumferential surface 1, and thereby the position of the leading edge of the recording sheet on the drum circumferential surface is determined, pump control means 16 controls drum-rotating pump 14 to perform vacuum suction and pump 81 for electrostatic attraction exfoliation roller to perform air-jetting.

Movement control means 19 controls the electrostatic attraction exfoliation roller 20 to move horizontally and thereby to press recording sheet 8 on the circumferential surface of the drum 1. Incidentally, in this case, electrostatic attractive force of the electrostatic attraction exfoliation roller 20 is not generated.

Due to vacuum suction conducted by the drum-rotating pump 14, suction force on the drum circumferential surface and suction force (illustrated as arrow marks in the drum in FIG. 12) coming from suction-communicating grooves make the leading edge of recording sheet 8 to be in close contact with the circumferential surface of the drum 1 without causing unevenness. Due to pressing of the recording sheet 8 against the circumferential surface of the drum 1 conducted by the electrostatic attraction exfoliation roller 20 and air-jetting (illustrated as arrow marks in the electrostatic attraction exfoliation roller in FIG. 12) from air-jetting holes on the surface of the electrostatic attraction exfoliation roller 20 make the recording sheet 8 to be pressed against the circumferential surface of the drum 1, and thereby close contact between the recording sheet 8 and the circumferential surface of the drum 1 is improved.

When the leading edge of the recording sheet 8 is brought into closed contact with the circumferential surface of the drum 1 and then the drum 1 and the electrostatic attraction exfoliation roller 20 are rotated in the arrowed direction in the above-mentioned way, the recording sheet 8 is wound around the circumferential surface of the drum 1 to be close contact therewith. Vacuum suction force of the drum 1, pressing force of the electrostatic attraction exfoliation roller 20 and air-jetting from the electrostatic attraction exfoliation roller 20 can make the recording sheet 8 to be wound around the circumferential surface of the drum 1 to be in close contact therewith without causing unevenness on the surface of the recording sheet 8. The recording sheet is fed to the drum through the mechanism stated above. After the recording sheet is fed to and wound around the drum 1, images are recorded on the recording sheet 8.

Pump control means 16 controls so that drum-rotating pump 14 continues vacuum suction even when sheet-feeding is completed while pump 81 for the electrostatic attraction exfoliation roller stops air-jetting. When sheet-feeding is completed, movement control means 19 controls a moving means of the electrostatic attraction exfoliation roller 20 to move the electrostatic attraction exfoliation roller 20 horizontally and thereby to separate it from the drum 1.

Image recording is carried out by exposing the recording sheet 8 to light by means of a laser while rotating the drum 1 around which the recording sheet 8 is wound at a high rotation speed of 2000 rpm. In the present embodiment, it is not necessary to provide on the drum 1 a groove for exfoliating a recording sheet which is in parallel with the direction of drum rotation. Therefore, swelling which is caused by air entering the groove for exfoliating a recording sheet under the high-speed rotation is not caused, flatness of the recording sheet wound around the drum circumferential surface can be kept in a good condition despite the high-speed rotation, and images with high image quality can be recorded.

Incidentally, even when a suction-communicating groove is provided on the circumferential surface of a drum as a groove which is in parallel with the direction of drum rotation, it is a groove for transmitting the vacuum suction force to the entire circumferential surface of the drum by communicating between suction holes. Therefore, even when air enters that groove under the high-speed rotation, the air is sucked, and thereby no swelling is caused, resulting in no deterioration of flatness of the recording sheet wound around the drum circumferential surface under the high-speed rotation. Then, after the image recording, the recording sheet 8 on which images are recorded is exfoliated from the circumferential surface of the drum 1 and is led to an ejection path.

Next, the mechanism through which exfoliation of the recording sheet 8 from drum 1 is started will be explained with reference to FIG. 13.

The drum 1 is arranged to rotate and to stop while it carries recording sheet 8 wound around the drum so that the leading edge position determining groove 2 at which the leading edge of the recording sheet is positioned may come to the point where the groove faces exactly the electrostatic attraction exfoliation roller 20 when a drum rotation control means (not shown) receives signals for exfoliation of the recording sheet after image recording. Due to this, it is possible to determine stably the position of the leading edge of the recording sheet in the case of exfoliation.

After the drum 1 rotates and stops so that the leading edge position determining groove 2 at which the leading edge of the recording sheet 8 is positioned comes to the point where the groove faces exactly the electrostatic attraction exfoliation roller 20, electrostatic attraction control means 22 controls so that electrostatic attractive force may be generated on the surface of the electrostatic attraction exfoliation roller 20, and further controls the moving means so that the movement control means 19 moves the electrostatic attraction exfoliation roller 20 horizontally to be pressed against the drum 1. Since the leading edge of the recording sheet on the drum circumferential surface is located at the position to face the electrostatic attraction exfoliation roller 20, when the electrostatic attraction exfoliation roller 20 is moved horizontally to be pressed against the drum 1, the leading edge of the recording sheet on the drum circumferential surface comes in contact with the electrostatic attraction exfoliation roller 20 to be pressed against it. Since the surface of the electrostatic attraction exfoliation roller 20 has electrostatic attractive force, the electrostatic attraction exfoliation roller 20 can hold the leading edge of the recording sheet wound around the drum circumferential surface by making pressure contact with the leading edge of the recording sheet on the drum circumferential surface.

After the leading edge of a recording sheet is held by electrostatic attractive force on the surface of the electrostatic attraction exfoliation roller 20 which has moved horizontally to press recording sheet 8, pump control means 16 releases vacuum suction of drum-rotating pump 14, and then controls the drum-rotating pump 14 to exhaust for air-jetting (illustrated as arrow marks in the drum in FIG. 13). Due to the air-jetting through suction holes on the circumferential surface of the drum 1, recording sheet 8 wound around the circumferential surface of the drum 1 is lifted, making it easy to exfoliate the recording sheet and making it unnecessary to rotate the drum 1 depending on the exfoliating speed. (In the drawing, the recording sheet 8 is not lifted yet because the drawing shows the moment to start air-jetting.) Incidentally, air-jetting from the drum 1 may also be conducted after the electrostatic attraction exfoliation roller 20 rotates slightly while holding thereon the leading edge of the recording sheet and thereby the recording sheet 8 is exfoliated slightly from the drum 1, without being conducted immediately after the leading edge of the recording sheet is held on the surface of the electrostatic attraction exfoliation roller 20.

When the exfoliation roller 9 is rotated in the arrowed direction after the leading edge of the recording sheet is held by electrostatic attractive force on the surface of the electrostatic attraction exfoliation roller 20, exfoliation of the recording sheet from the drum 1 is started. Concurrently with that, the drum 1 is also rotated in the arrowed direction.

Next, the mechanism through which recording sheet 8 is exfoliated from drum 1 will be explained with reference to FIG. 14.

Movement control means 19 controls conveyance roller 21 to be moved upward and thereby to be pressed against the electrostatic attraction exfoliation roller 20 when the leading edge of the recording sheet almost comes to the lower portion of the electrostatic attraction exfoliation roller 20 after the leading edge of the recording sheet 8 is held by electrostatic attractive force on the surface of the electrostatic attraction exfoliation roller 20 and the electrostatic attraction exfoliation roller 20 rotates by a prescribed angle. Due to this, the recording sheet 8 is nipped between the electrostatic attraction exfoliation roller 20 and conveyance roller 21.

When the conveyance roller 21 moves and thereby makes pressure contact with the recording sheet 8 on the electrostatic attraction exfoliation roller 20, electrostatic attraction control means 22 controls to stop generation of electrostatic charges on the surface of the electrostatic attraction exfoliation roller 20. Due to this, electrostatic attractive force on the surface of the electrostatic attraction exfoliation roller 20 disappears, making the recording sheet 8 to be exfoliated easily from the electrostatic attraction exfoliation roller 20 and making it possible for the electrostatic attraction exfoliation roller 20 and the conveyance roller 21 to convey the recording sheet 8 by nipping the same.

When the drum 1 rotates in the arrowed direction while jetting air (illustrated as arrow marks in the drum in FIG. 14) and the electrostatic attraction exfoliation roller 20 and the conveyance roller 21 rotate in the arrowed direction while nipping the recording sheet 8, the recording sheet 8 is exfoliated from the circumferential surface of the drum 1 and is conveyed to an ejection path.

After completion of exfoliation of the recording sheet 8 from the drum surface 1, pump control means 16 controls drum-rotating pump 14 to release its exhaust. Further, the drum 1, the electrostatic attraction exfoliation roller 20 and the conveyance roller 21 stop rotating, and the movement control means 19 moves the conveyance roller 21 downward to separate it from the electrostatic attraction exfoliation roller 20, and controls so that the electrostatic attraction exfoliation roller 20 is moved horizontally to the position which is away from the drum 1.

A recording sheet is exfoliated from a drum in the mechanism mentioned above.

Embodiment 6

Another embodiment of structures surrounding a drum in an image recording apparatus and of mechanisms for feeding a recording sheet to a drum and for exfoliating the recording sheet from the drum will be explained with reference to FIGS. 15–20. FIG. 15 is a schematic illustration showing an example of the embodiment relating the mechanism for sheet supply to the drum. FIG. 16 is a schematic illustration showing a mechanism to start exfoliation when exfoliating a recording sheet from a drum. FIG. 17 is a schematic illustration showing an example of an embodiment of a mechanism to exfoliate a recording sheet from a drum. FIG. 18 is a front view of a vacuum suction exfoliating roller used in the present embodiment. FIG. 19 represents a schematic structural diagram of a pump used in the present embodiment and a schematic diagram of a switching plate for suction and exhaust of the pump. FIG. 20 represents a schematic diagram showing the state wherein suction and exhaust of the pump are switched.

The structures surrounding a drum are explained below.

Since a shape and a role of drum 1 have already been explained in Embodiments 1–3, explanation thereof is omitted here. Drum vacuum attraction exfoliation roller combination pump 23 (hereinafter referred to as "a combined-use pump") is connected to the drum 1 through vent pipe 13C for the purpose of conducting vacuum suction and air jetting through plural suction holes 4 on the circumferential surface of the drum 1. The combined-use pump 23 is connected to pump control means 24 which controls vacuum suction and air jetting.

Facing the drum 1, there is rotatably provided to be away from the drum 1 vacuum suction exfoliation roller 25 which is an exfoliating member for exfoliating recording sheet 8 wound around the circumferential surface of the drum 1 through vacuum suction from the drum 1 by touching the recording sheet 8 wound around the circumferential surface of the drum 1 (the state wherein the vacuum suction exfoliation roller 25 is away from the drum 1 is not shown).

On the vacuum suction exfoliation roller 25, there is provided a moving means (not shown) which can press the vacuum suction exfoliation roller 25 against the drum 1 or separate it from the drum 1, by moving the vacuum suction exfoliation roller 25 horizontally. To the moving means for the vacuum suction exfoliation roller 25, there is connected movement control means 19 which controls the movement of the vacuum suction exfoliation roller 25.

The vacuum suction exfoliation roller 25 is not a tandem roller like an exfoliating roller in Embodiment 4 as shown in FIG. 18, but is a cylindrical hollow roller whose length in the axial direction is mostly the same as that of the drum. On the surface thereof, there are provided a plurality of through-holes 26 each leading to the inside of the hollow roller for vacuum suction and air-jetting and suction-communicating grooves 27 representing grooves provided on the roller surface to communicate between though holes.

The vacuum suction exfoliation roller 25 is connected, through vent pipe 13D, to the same combined-use pump 23 to which the drum 1 is connected, for conducting vacuum suction and air-jetting through the plural through-holes 26 on the circumferential surface of the vacuum suction exfoliation roller 25. The combined-use pump 23 is connected to pump control means 24 as stated above, and vacuum suction and air-jetting are controlled by the pump control means 24.

The combined-use pump used in the present embodiment will be explained with reference to FIGS. 19 and 20.

The combined-use pump 23 is one wherein suction and exhaust of the drum 1 and the vacuum suction exfoliation roller 25 can be switched only by rotating switching plate 31.

The combined-use pump 23 has therein pump main body 28, suction hose 29 for suction, exhaust hose 30 for exhaust and switching plate 31 for switching suction and exhaust of drum 1 and vacuum suction exfoliation roller 25, and is connected to vent pipe 13C communicated with the drum 1 through the switching plate 31 and to vent pipe 13D communicated with the vacuum suction exfoliation roller 25.

For example, at the start of exfoliation of the recording sheet, the switching plate 31 is rotated on its rotary axis 32 to be in the state shown in FIGS. 19(*a*) and 19(*b*), because the drum 1 needs to conduct air-jetting and the vacuum suction exfoliation roller 25 needs to conduct suction.

If pump main body 28 operates under the condition mentioned above, suction is performed by the vacuum suction exfoliation roller 25 because suction inlet 34 communicated with suction hose 29 of the switching plate 31 agrees positionally with the vent pipe 13D communicated with the vacuum suction exfoliation roller 25.

On the other hand, air-jetting is performed by the drum 1 because exhaust outlet 33 communicated with exhaust hose 30 of the switching plate 31 agrees positionally with vent pipe 13 C communicated with the drum 1.

Next, when feeding a recording sheet, the drum 1 needs to conduct suction and the vacuum suction exfoliation roller 25 needs to conduct air-jetting, and it is possible to switch easily between air-jetting and suction of the drum 1 and the vacuum suction exfoliation roller 25, by rotating the switching plate 31 on its rotary axis 32 to obtain the state shown in FIGS. 20(a) and 20(b).

If pump main body 28 operates under the condition mentioned above, suction is performed by the drum 1 because suction inlet 34 communicated with suction hose 29 of the switching plate 31 agrees positionally with the vent pipe 13C communicated with the drum 1.

On the other hand, air-jetting is performed by the vacuum suction exfoliation roller 25 because exhaust outlet 33 communicated with exhaust hose 30 of the switching plate 31 agrees positionally with vent pipe 13 D communicated with the vacuum suction exfoliation roller 25.

As stated above, it is possible to make the combined-use pump 23 to switch easily between suction and exhaust of the drum 1 and the vacuum suction exfoliation roller 25 only by rotating the switching plate 31, namely, a single pump can operate so that the vacuum suction exfoliation roller 25 may perform suction when the drum 1 is jetting air, while, the vacuum suction exfoliation roller 25 may perform air-jetting when the drum 1 is performing suction.

The combined-use pump 23 controls a rotation of the switching plate 31 with pump control means 24.

The foregoing is explanation of the combined-use pump 23.

Below the vacuum suction exfoliation roller 25, there is provided conveyance roller 21 which nips a recording sheet together with the vacuum suction exfoliation roller 25 to convey it to an ejection path in a way that the conveyance roller 21 is positioned to be away from the vacuum suction exfoliation roller 25 to face it.

On the conveyance roller 21, there is provided a moving means (not shown) which can move in the vertical direction of the conveyance roller 21 to press the conveyance roller 21 against the vacuum suction exfoliation roller 25 and to separate the conveyance roller 21 from the vacuum suction exfoliation roller 25. The moving means of the conveyance roller 21 is connected to the same movement control means 19 to which the vacuum suction exfoliation roller 25 is connected, and movement of the moving means is controlled by the movement control means 19.

The foregoing is explanation of the structures surrounding the drum. Next, a mechanism for feeding a recording sheet to the drum will be explained with reference to FIG. 15.

When signals for sheet-feeding are received by a sheet-feeding means (not shown), recording sheet 8 is fed to drum 1 in the arrowed direction by the sheet-feeding means.

When feeding a recording sheet, the leading edge of recording sheet 8 enters leading edge positioning groove 2 on drum circumferential surface 1 and the position of the leading edge of the recording sheet on the drum circumferential surface is determined. Incidentally, the position of drum rotation is detectable, which makes the drum 1 to rotate and stop so that the position of leading edge positioning groove 2 on the drum 1 may always be constant in the course of sheet-feeding. Accordingly, positioning of the leading edge of the recording sheet can stably be conducted in the case of sheet-supplying. Namely, in the same way as description in Embodiment 4, when supplying a recording sheet to a drum, a drum control means (not shown) controls so that the recording sheet leading edge supplying section 3 on the drum 1 which is not provided with a suction-communicating groove which is in parallel with a side of the leading edge of the recording sheet in the direction to supply the recording sheet to the drum may come to the position to which the leading edge of the recording sheet is supplied.

When the leading edge of recording sheet 8 enters leading edge positioning groove 2 on drum circumferential surface 1 and thereby the position of the leading edge of the recording sheet on the drum circumferential surface is determined, the pump control means 24 controls the combined-use pump 23 so that the drum 1 may perform vacuum suction and the vacuum suction exfoliation roller 25 may jet air.

Further, the movement control means 19 controls the vacuum suction exfoliation roller 25 to move horizontally and thereby to press recording sheet 8 against the circumferential surface of the drum 1.

Under the condition that the combined-use pump 23 makes the drum 1 to perform vacuum suction, the leading edge portion of recording sheet 8 is brought into close contact with the circumferential surface of the drum 1 without causing unevenness by suction force (illustrated as arrow marks in the drum in FIG. 15) from suction holes and suction-communicating grooves on the drum circumferential surface. Further, pressure contact of recording sheet 8 with the circumferential surface of the drum 1 conducted by the vacuum suction exfoliation roller 25 and air-jetting (illustrated as arrow marks in the vacuum suction exfoliation roller in FIG. 15) performed by the vacuum suction exfoliation roller 25 in accordance with instruction of the combined-use pump 23 make the recording sheet 8 to be pressed against the circumferential surface of the drum 1, making close contact of the recording sheet 8 with the circumferential surface of the drum 1 to be improved.

When the leading edge portion of the recording sheet 8 is made to be in close contact with the circumferential surface of the drum 1 and then the drum 1 and the vacuum suction exfoliation roller 25 are rotated in the arrowed direction in the way stated above, the recording sheet 8 can be wound around the circumferential surface of the drum 1 to be in close contact therewith. Due to vacuum attractive force of the drum 1, pressure contact force of the vacuum suction exfoliation roller 25 and air-jetting force from the vacuum suction exfoliation roller 25, the recording sheet 8 can be wound around the circumferential surface of the drum 1 to be in close contact therewith without causing unevenness on the surface of the recording sheet 8. Through the mechanism stated above, the recording sheet is fed to the drum. After the recording sheet 8 is fed to the drum 1 and is wound around it, the recording sheet 8 is subjected image recording.

When sheet-feeding is completed, the movement control means 19 controls the moving means of the vacuum suction exfoliation roller 25 so that the vacuum suction exfoliation roller 25 is moved horizontally to be separated from the drum 1.

Image recording is conducted by giving exposure to the recording sheet 8 with a laser while rotating the drum 1 around which the recording sheet 8 is wound at the high-speed of 2000 rpm. In the present embodiment wherein a groove which is in parallel with the direction of drum rotation and is for exfoliation of a recording sheet does not need to be provided on the drum 1, there occurs no swelling which is caused by air entering the groove for exfoliation of a recording sheet under the high-speed rotation, and it is possible to keep flatness of the recording sheet wound around the drum circumferential surface to be excellent despite the high-speed rotation, and to record images with high quality.

Incidentally, even when suction-communicating grooves are provided on the drum circumferential surface as grooves which are in parallel with the direction of drum rotation, the grooves those which communicate between suction holes and transmit the vacuum attractive force to the entire circumferential surface of the drum. Therefore, even when air enters the grooves under the high-speed rotation, the air is sucked, and no swelling is caused, resulting in no deterioration of flatness of the recording sheet wound around drum circumferential surface in the case of high-speed rotation. Then, after image recording, the recording sheet 8 on which images are recorded is exfoliated from the circumferential surface of the drum 1 to be conveyed to an ejection path.

Next, the mechanism through which exfoliation of the recording sheet 8 from drum 1 is started will be explained with reference to FIG. 16.

The drum 1 is arranged to rotate and to stop while it carries recording sheet 8 wound around the drum so that the leading edge position determining groove 2 at which the leading edge of the recording sheet is positioned may come to the point where the groove faces exactly the vacuum suction exfoliation roller 25 when a drum rotation control means (not shown) receives signals for exfoliation of the recording sheet after image recording. Due to this, it is possible to determine stably the position of the leading edge of the recording sheet in the case of exfoliation.

After the drum 1 rotates and stops so that the leading edge position determining groove 2 at which the leading edge of the recording sheet 8 is positioned comes to the point where the groove faces exactly the vacuum suction exfoliation roller 25, movement control means 19 controls a moving means so that the moving means moves the vacuum suction exfoliation roller 25 horizontally to be brought into pressure contact with the drum 1. When the vacuum suction exfoliation roller 25 is moved horizontally to be brought into pressure contact with the drum 1, the leading edge of the recording sheet positioned at the point to face the vacuum suction exfoliation roller 25 comes in contact with the vacuum suction exfoliation roller 25 to be pressed thereby. Since the surface of the vacuum suction exfoliation roller 25 is adhesive, the vacuum suction exfoliation roller 25 can hold the leading edge of the recording sheet wound around the drum circumferential surface by making pressure contact with the leading edge of the recording sheet on the drum circumferential surface.

After the vacuum suction exfoliation roller 25 moves horizontally and presses the recording sheet 8, pump control means 24 controls switching of switching plate 31 so that combined-use pump 23 causes the drum 1 to jet air and causes the vacuum suction exfoliation roller 25 to perform vacuum suction.

Since the vacuum suction exfoliation roller 25 is in the state of having vacuum suction force (illustrated as arrow marks in the vacuum suction exfoliation roller in FIG. 16), the vacuum suction exfoliation roller 25 can hold the leading edge of the recording sheet wound around the drum circumferential surface.

On the other hand, since air-jetting (illustrated as arrow marks in the drum in FIG. 16) is performed by the drum 1, the recording sheet wound around the circumferential surface of the drum 1 is lifted, making it easy to exfoliate the recording sheet. (Since the diagram shows the start of air-jetting, the recording sheet 8 is not yet lifted from the circumferential surface of the drum 1.)

When the vacuum suction exfoliation roller 25 starts rotating in the arrowed direction after it has held the leading edge of the recording sheet on the surface by vacuum suction force, exfoliation of the recording sheet from the drum 1 is started. Concurrently with this, the drum 1 also rotates in the arrowed direction.

Next, the mechanism through which recording sheet 8 is exfoliated from drum 1 will be explained with reference to FIG. 17.

Movement control means 19 controls conveyance roller 21 to be moved upward and thereby to be pressed against the vacuum suction exfoliation roller 25 when the leading edge of the recording sheet almost comes to the lower portion of the vacuum suction exfoliation roller 25 after the leading edge of the recording sheet 8 is held by vacuum suction force on the surface of the vacuum suction exfoliation roller 25 and the vacuum suction exfoliation roller 25 rotates by a prescribed angle. Due to this, the recording sheet 8 is nipped between the vacuum suction exfoliation roller 25 and conveyance roller 21.

When the conveyance roller 21 moves and thereby makes pressure contact with the recording sheet 8 on the vacuum suction exfoliation roller 25, pump control means 24 controls to stop operation of combined-use pump 23. Namely, the control is made so that vacuum suction of the vacuum suction exfoliation roller 25 and air-jetting from the drum 1 may be stopped. Due to this, vacuum suction force on the surface of the vacuum suction exfoliation roller 25 disappears, making the recording sheet 8 to be exfoliated easily from the vacuum suction exfoliation roller 25 and making it possible for the vacuum suction exfoliation roller 25 and the conveyance roller 21 to convey the recording sheet 8 by nipping the same.

When the drum 1 rotates in the arrowed direction and the vacuum suction exfoliation roller 25 and the conveyance roller 21 rotate in the arrowed direction while nipping the recording sheet 8, the recording sheet 8 is exfoliated from the circumferential surface of the drum 1 and is conveyed to an ejection path.

After completion of exfoliation of the recording sheet 8 from the drum surface 1, the drum 1, the vacuum suction exfoliation roller 25 and the conveyance roller 21 stop rotating, and the movement control means 19 moves the conveyance roller 21 downward to separate it from the vacuum suction exfoliation roller 25, and controls so that the vacuum suction exfoliation roller 25 is moved horizontally to the position which is away from the drum 1.

A recording sheet is exfoliated from a drum in the mechanism mentioned above.

Incidentally, it is also possible to provide two pumps including a drum-rotating pump and a pump for vacuum suction exfoliation roller, without using the combined-use pump and thereby to control with a pump control means so that when either one of them is exhausting, the other performs suction.

Or, it is also possible to arrange so that each of the drum-rotating pump and the pump for vacuum suction exfoliation roller performs suction or exhaust independently when it is needed.

Or, it is also possible to provide a cover for opening and closing on a suction inlet and an exhaust outlet of a switching plate for a combined-use pump, and thereby to arrange, in addition to exclusively conducting suction and air-jetting respectively with the drum and the vacuum suction exfoliation roller, so that when one of them is doing suction, the other can discontinue suction and air-jetting.

These structures mentioned above make it possible that air-jetting is made by the drum while only the vacuum suction exfoliation roller discontinues suction and air-jetting, when the recording sheet is exfoliated from the drum.

Incidentally, when pump for exfoliation roller 35 and drum-rotating pump 36 are provided separately in all of the Embodiments 4–6, it is also possible to employ the structure shown in FIG. 21 wherein when one of two pumps is operating, the other pump is controlled to discontinue.

Incidentally, the image recording apparatus to which the invention is applicable can be applied to all image recording apparatuses, provided that they represent an image recording apparatus wherein a recording sheet is wound around a drum circumferential surface so that an image is recorded thereon.

For example, the image recording apparatus is one shown in the embodiment wherein a photographic paper wound around a drum is subjected to laser exposure, or one wherein a thermosensitive paper wound around a drum is subjected to laser exposure.

Embodiments 1–6 stated above offer the following effects.

By providing no suction-communicating groove being in parallel with the side representing a leading edge of the recording sheet in the direction for supplying it at the drum circumferential surface portion which is touched by the leading edge of the recording sheet in the direction for supplying it when supplying the recording sheet to the drum, it is possible to prevent erroneous supply of the recording sheet when it is supplied and thereby to improve sharply the stability of operations of the image recording apparatus, without deteriorating the efficiency to suck and fix the recording sheet and without providing complicated mechanisms.

Even when a drum around which a recording sheet is wound is rotated at a high speed in the case of image recording, occurrence of unevenness on the surface of the recording sheet is prevented, and the recording sheet is prevented from being lifted accidentally, thereby stable fixing of the recording sheet is realized and outputted images with high quality can be obtained.

It is possible to prevent poor feeding of the recording sheet to the drum, and to conduct the feeding stably, and further, positioning of the leading edge of the recording sheet on the drum circumferential surface can surely be realized with a simple structure, and the fixing of the recording sheet on the drum can be made sure.

In the same way as description in Embodiment 4, when supplying a recording sheet to a drum, a drum control means (not shown) controls so that the recording sheet leading edge supplying section 3 on the drum 1 which is not provided with a suction-communicating groove which is in parallel with a side of the leading edge of the recording sheet in the direction to supply the recording sheet to the drum may come to the position to which the leading edge of the recording sheet is supplied.

Embodiment 7

Items 33–34 which attain the second object of the invention will be explained with reference to Embodiments 7–8.

FIG. 23 is a general structural diagram of the embodiment of the invention, FIG. 24 is a structural perspective view of a drum and a squeeze roller, and FIG. 25 represents a structural diagram of a drum and a squeeze roller in another embodiment. In FIG. 23, cartridge 112 is one in which recording sheets P are contained. The recording sheet P in the present embodiment is a color photographic paper. Cutter 111 cuts recording sheet P to a prescribed length. A drum means is structured so that recording sheet P is wound around an outer circumferential surface of the drum, and on the outer circumferential surface of drum 121, portions which do not touch the recording sheet P but make pressure contact with squeeze roller 131 are made to be roughened surface 21A (FIG. 24). Incidentally, in the same way as description in Embodiment 4, when supplying a recording sheet to a drum, a drum control means (not shown) controls so that the recording sheet leading edge supplying section 3 on the drum 1 which is not provided with a suction-communicating groove which is in parallel with a side of the leading edge of the recording sheet in the direction to supply the recording sheet to the drum may come to the position to which the leading edge of the recording sheet is supplied. The drum is further structured so that it attracts a recording sheet thereon on a vacuum attraction basis. First drum driving means 140 is structured to rotate the drum 121 at a writing speed in the course of image writing, and to be concrete, it is structured so that rotation of motor 141 is transmitted to gear train 142 to rotate the drum 121. The squeeze roller 131 representing a squeeze roller means rotates while being brought into pressure contact with the drum by force of spring 163, and makes the recording sheet P to be in pressure contact with drum 121.

Next, the squeeze roller and the drum will be explained in further detail with reference to FIG. 24. The squeeze roller 131 is made of synthetic rubber, and portions on its outer circumferential surface which do not touch recording sheet P are made to be roughened surface 131A. Portions on the outer circumferential surface of drum 121 which do not touch the recording sheet P are made to be roughened surface 121A. This surface 121A is at least in pressure contact with the surface 131A, whereby the squeeze roller 131 can drive the drum 121 to rotate in the present embodiment. Incidentally, it is also satisfactory that the drum 121 drives the squeeze roller 131 to rotate.

Another embodiment of the drum and the squeeze roller will be explained with reference to FIG. 25. In FIG. 25(a), roughened surfaces 132A representing portions on the outer circumferential surface of the squeeze roller 132 made of synthetic rubber which do not touch recording sheet P and roughened surface 122A representing portions on the outer circumferential surface of the drum 122 which do not touch recording sheet P are at least in pressure contact with each other, so that the squeeze roller 132 may drive the drum 122 to rotate, or the drum 122 may drive the squeeze roller 132 to rotate. In the same way, in FIG. 25(b), roughened surfaces 133A representing portions on the outer circumferential surface of the squeeze roller 133 made of synthetic rubber which do not touch recording sheet P and have diameter greater than that of the central portion and roughened surfaces 123A representing portions on the outer circumferential surface of the drum 123 which do not touch recording sheet P are at least in pressure contact with each other, so that the squeeze roller 133 may drive the drum 123 to rotate, or the drum 123 may drive the squeeze roller 133 to rotate.

Going back to FIG. 23 to keep up the explanation, a squeeze roller displacement means is a means to bring the squeeze roller 131 into pressure contact with the drum 121 and to separate the squeeze roller 131 from the drum 121. For the pressure contact, cam 162 is rotated by rotation of motor 161 to be separated from lever 153, and the lever 153 is moved by the force of spring 163 to bring the squeeze roller 131 into pressure contact with the drum 121, while for the separation, the cam 162 is rotated by rotation of the motor 161 to move the lever 153 against the spring 163, and thereby to separate the squeeze roller 131 from the drum 121.

Second drum driving means 150 is so structured as to rotate the drum 121 with the squeeze roller 131, and when motor 151 rotates, pulley 155 provided on the lever 153 through gear train 152 is rotated, then, belt 156 is driven, and further, pulley 154 is rotated so that the squeeze roller 131 which is united solidly with the pulley 154 may be rotated. In the course of supplying recording sheet P to the drum 121 and of ejecting recording sheet P from the drum 121, the drum 121 is rotated at a low speed by rotation of the squeeze roller 131.

Writing means 180 is structured so that beams of light emitted respectively from laser 181 and laser 182 each being for each color are deflected in terms of optical path by half-mirror 185 and a beam of light from laser 183 is deflected in terms of optical path by mirror 184, and they are further composed to be projected on a recording sheet to write images thereon. Exfoliating means 170 is arranged to exfoliate recording sheet P which is in close contact with the outer circumferential surface of the drum 121, and in the case of exfoliation, exfoliating claw 171 is caused to approach the drum 121 by the moving part 172 to exfoliate the recording sheet, beginning from the leading edge thereof. Incidentally, in the case of no exfoliation, the exfoliating claw 171 is caused to leave the drum 121 by the moving part 172. Roller 114 is an ejection roller which ejects the recording sheet P.

Now, image writing operations will be explained as follows.

1) Operation to supply a recording sheet; Recording sheet P is drawn out of cartridge 112 by roller 113. The recording sheet P is wound around the drum 121 by squeeze roller 131. In this case, the squeeze roller 131 is rotated so that the recording sheet P is sucked by an unillustrated vacuum attractive means to be brought into close contact with the drum while the drum 121 is being rotated at a low speed clockwise in the diagram. After the recording sheet P is conveyed by a prescribed length, it is cut by cutter 111. Now, the squeeze roller 131 leaves the drum 121.
2) Operations to write images: While the drum 121 is rotated at a high speed, a laser beam moves in the direction perpendicular to the page of FIG. 1 to write image signals on the recording sheet P placed on the drum.
3) Operations to eject a recording sheet: Exfoliation claw 171 is caused to approach the drum 121. The drum is rotated by the squeeze roller 131 and the recording sheet is exfoliated from the drum, and is ejected by roller 114. Then, a color photographic paper representing the recording sheet which has been subjected to writing is processed.

Embodiment 8

Embodiment 8 is another embodiment of how a squeeze roller drives to rotate a drum and how the squeeze roller is separated from the drum. FIG. 26 is a structural diagram of primary sections in another embodiment of the invention.

Rotation of the drum made by the squeeze roller is explained as follows. When motor 161 rotates, gear G1 fixed on the shaft of the motor 161 rotates in the arrowed direction. Then, sun gear G2 supported rotatably on shaft J1 rotates in the arrowed direction. Further, planetary pinion gear G3 provided on lever 164 supported rotatably on the shaft J1 is rotated by G2 and it revolves clockwise on the shaft J1, thus G4 which is united solidly with the drum 121 rotates in the arrowed direction.

Now, separation of the squeeze roller 131 from the drum 121 is explained as follows. When the motor 161 stops, the sun gear G2 and the planetary pinion gear G3 stop rotating. Then, the lever 164 supported rotatably on the shaft J1 is rotated counterclockwise by spring force of spring 165, thereby gear G4 which is united solidly with the drum 121 is separated from gear G4 which is united solidly with the squeeze roller 131. In this case, therefore, there is a merit that a motor which displaces the squeeze roller 131 from the drum 121 is not required.

Incidentally, though a color laser writing apparatus has been explained as an image forming apparatus in the embodiment, any of a monochromatic (black and white) laser writing apparatus and one wherein images are written on a plain paper through an ink jet system can be used.

In Embodiment 7, there are provided a drum means which winds around its outer circumferential surface a recording sheet on which Y image is recorded, a first drum driving means which rotates the drum means at the writing speed in the course of image writing, a squeeze roller means which causes the recording sheet to be in close contact with the drum means, a squeeze roller displacement means which moves the squeeze roller means to the position of close-contact and to the position of separation, and a second drum driving means which rotates the drum means at the speed slower than that of the first drum driving means through the squeeze roller means when supplying the recording sheet to the drum means and when ejecting the recording sheet. It is therefore possible to drive the drum at a low speed with a simple mechanism when supplying and ejecting the recording sheet.

In Embodiment 8, there are provided a drum means around which a recording sheet is wound to cover its outer circumferential surface and a squeeze means which causes the recording sheet to be in close contact with the drum means, and in an image recording apparatus to write images on the recording sheet wound around the drum means, an outer circumferential surface of the squeeze roller means excluding a portion that touches the recording sheet and an outer circumferential surface of the drum means excluding a portion that touches the recording sheet are at least in pressure contact with each other and thus the squeeze roller means can drive the drum means to rotate, or the drum means can drive the squeeze roller means to rotate. Therefore, it is possible either to drive surely the squeeze roller to rotate from the drum or to drive surely the drum to rotate from the squeeze roller.

Embodiment 9

FIG. 27 is a general structural diagram of the embodiment of the invention, and

FIG. 28 shows structural diagrams of primary portions in the embodiment of the invention. To be concrete, FIG. 28(a) is a front view of primary portions and FIG. 28(b) is a side view of primary portions. In FIGS. 27 and 28, cartridge 112 is one in which recording sheet P is contained, and the recording sheet P is a color photographic paper in the present embodiment. Cutter 111 cuts recording sheet P to a prescribed length. A drum means is structured so that recording sheet P is wound around its outer circumferential surface. In the same way as description in Embodiment 4, when supplying a recording sheet to a drum, a drum control means (not shown) controls so that the recording sheet leading edge supplying section 3 on the drum 1 which is not provided with a suction-communicating groove which is in parallel with a side of the leading edge of the recording sheet in the direction to supply the recording sheet to the drum may come to the position to which the leading edge of the recording sheet is supplied. Incidentally, in FIG. 27, let it be assumed that a rotary central axis of drum 121 represents an origin, a horizontal line passing through the origin is an X axis and a vertical line passing through the origin is a Y axis. It is arranged so that recording sheet P is attracted to the drum 121 by an unillustrated method through vacuum attraction. It is so arranged that drum driving section 140 causes the drum 121 to make high-speed rotation at the writing speed, and rotation of motor 141 is transmitted to gear train 142 to rotate the drum 121.

Positioning means 191 determines the position of the leading edge of recording sheet P. Positioning moving means 192 is arranged to approach an outer circumferential surface of the drum 121 and then leaves the outer circumferential surface of the drum 121 after completion of positioning of recording sheet P. The positioning means 191 is provided within a range including the locations on X axis and Y axis in the first quadrant. To be concrete, when positioning recording sheet P, positioning means 191 is caused by positioning moving means 192 to enter concave groove 121 C provided annularly on a part of the outer circumferential surface of the drum 121 and determines the position of the leading edge of the recording sheet P. It is so arranged that positioning means 191 is caused by positioning moving means 192 to leave the concave groove 121C of the drum 121 after completion of the positioning. The squeeze roller 131 representing a squeeze roller means rotates while being brought into pressure contact with the drum by force of spring 163, and makes the recording sheet P to be in pressure contact with drum 121.

Squeeze roller displacement section 160 is arranged to make the squeeze roller 131 to be brought into pressure contact with the drum 121 or to be separated from the drum 121. With regard to pressure contact, cam 162 is rotated by rotation of motor 161 to leave lever 153, then the lever 153 is moved by the force of spring 163 so that the squeeze roller 131 is brought into pressure contact with the drum 121. With regard to separation, on the other hand, the cam 162 is rotated by rotation of the motor 161, as in the case of the pressure contact, to move the lever 153 against the spring 163 so that the squeeze roller 131 is separated from the drum 121. Driving means 150 is arranged so that the squeeze roller 131 may rotate the drum 121, and when motor 151 rotates, pulley 155 provided on the lever 153 is rotated through gear train 152, then belt 156 is driven, further, pulley 154 is rotated, thus the squeeze roller 131 which is united solidly with the pulley 154 is rotated. When supplying recording sheet P to drum 121 and when ejecting recording sheet P from drum 121, the drum 121 is rotated at a low speed by rotation of the squeeze roller 131.

Writing means 180 is structured so that beams of light emitted respectively from laser 181 and laser 182 each being for each color are deflected in terms of optical path by half-mirror 185 and a beam of light from laser 183 is deflected in terms of optical path by mirror 184, and they are further composed to be projected on a recording sheet to write images thereon. A light source of the writing means is arranged on X axis in the first quadrant.

Exfoliating means 170 is arranged to exfoliate recording sheet P which is in close contact with the outer circumferential surface of the drum 121, and in the case of exfoliation, exfoliating claw 171 is caused to approach the drum 121 by the moving part 172 to exfoliate the recording sheet, beginning from the leading edge thereof. Incidentally, in the case of no exfoliation, the exfoliating claw 171 is caused to leave the drum 121 by the moving part 172. The exfoliating means is provided within a range including the locations on X axis and Y axis in the third quadrant. Roller 114 ejects the recording sheet P with an ejection roller.

Now, operations to write images will be explained.

1) Operations to supply recording sheet: Recording sheet P is drawn out of cartridge 12 by roller 113. Simultaneously with this, positioning means 191 is caused to enter concave groove 121 C of drum 121. The leading edge of the recording sheet P is caused to hit positioning claw 191 so that the position of the leading edge of the recording sheet P may be regulated. The recording sheet P is brought into close contact with the drum 121 by the squeeze roller 131. At this moment, the positioning claw 191 is separated from the concave groove 121 C of the drum 121. The squeeze roller 131 is rotated so that the recording sheet P is sucked by an unillustrated vacuum attractive means to be brought into close contact with the drum while the drum 121 is being rotated at a low speed clockwise in FIG. 27. After the recording sheet P is conveyed by a prescribed length, it is cut by cutter 111. Now, the squeeze roller 131 leaves the drum 121.

2) Operations to write images: While the drum 121 is rotated at a high speed, a laser beam moves in the direction perpendicular to the page of FIG. 27 to write image signals on the recording sheet P placed on the drum.

3) Operations to eject a recording sheet: Exfoliation claw 171 is caused to approach the drum 121. The squeeze roller 131 is rotated and the recording sheet P is exfoliated from the drum 121, and is ejected by roller 114. Then, a color photographic paper representing the recording sheet P is processed.

Embodiment 10

FIG. 29 is a general structural diagram of the embodiment of the invention, and FIG. 30 shows structural diagrams of primary portions in the embodiment of the invention. To be concrete, FIG. 30(a) is a front view of primary portions and FIG. 30(b) is a side view of primary portions. In FIGS. 29 and 30, cartridge 112 is one in which recording sheet P is contained, and the recording sheet P is a color photographic paper in the present embodiment. Cutter 111 cuts recording sheet P to a prescribed length. Drum 121 which is a drum means is structured so that recording sheet P is wound around its outer circumferential surface. Incidentally, in the same way as description in Embodiment 4, when supplying a recording sheet to a drum, a drum control means (not shown) controls so that the recording sheet leading edge supplying section 3 on the drum 1 which is not provided with a suction-communicating groove which is in parallel with a side of the leading edge of the recording sheet in the direction to supply the recording sheet to the drum may come to the position to which the leading edge of the recording sheet is supplied. It is arranged so that recording sheet P is attracted to the drum 121 by an unillustrated method through vacuum attraction. It is so arranged that drum driving section 140 causes the drum 121 to make high-speed rotation at the writing speed, and rotation of motor 141 is transmitted to gear train 142 to rotate the drum 121.

Positioning exfoliation claw 193 which is a positioning exfoliation means is arranged so that positioning and separation of a recording sheet can be carried out by the same member. Positioning exfoliation moving means 194 is arranged to approach an outer circumferential surface of the drum 121 to position the leading edge of recording sheet P and then leaves the outer circumferential surface of the drum 121 after completion of the positioning, and is further arranged to approach the outer circumferential surface of the drum 121 to exfoliate the trailing edge of the recording sheet P and then leaves the outer circumferential surface of the drum 121 after completion of the exfoliation. To be concrete, an arrangement is made so that when positioning recording sheet P, positioning exfoliation claw 193 is caused by positioning exfoliation moving means 194 to enter concave groove 121 C of the drum 121 to position the leading edge of the recording sheet P and the positioning exfoliation claw 193 is caused by the positioning exfoliation moving means 194 to leave the concave groove 121 C of the drum 121 after completion of the positioning. When exfoliating the recording sheet P, positioning exfoliation claw 193 is caused by positioning exfoliation moving means 194 to enter concave groove 121 C of the drum 121 to exfoliate the trailing edge of the recording sheet P and the positioning exfoliation claw 193 is caused by the positioning exfoliation moving means 194 to leave the concave groove 121 C of the drum 121 after completion of the exfoliation.

Squeeze roller 131 which is a squeeze roller means is arranged to rotate while being pressed against the drum by the force of spring 163 and thereby to make recording sheet P to be in close contact with drum 121. Squeeze displacement section 160 is arranged to make the squeeze roller 131 to be brought into pressure contact with the drum 121 or to be separated from the drum 121. With regard to pressure contact, cam 162 is rotated by rotation of motor 161 to leave lever 153, then the lever 153 is moved by the force of spring 163 so that the squeeze roller 131 is brought into pressure contact with the drum 121. With regard to separation, on the other hand, the cam 162 is rotated by rotation of the motor 161, as in the case of the pressure contact, to move the lever 153 against the spring 163 so that the squeeze roller 131 is separated from the drum 121.

Driving means 150 is so structured as to rotate drum 121 regularly and reversely with squeeze roller 131, and when motor 151 rotates, pulley 155 provided on lever 153 through gear train 152 is rotated, then, belt 156 is driven, and further, pulley 154 is rotated so that the squeeze roller 131 which is united solidly with the pulley 154 may be rotated. In the course of supplying recording sheet P, the drum 121 is rotated slowly in the regular direction by the rotation of the squeeze roller 131. When ejecting the recording sheet, the drum 121 is slowly in the reverse direction by the rotation of the squeeze roller 131.

Writing means 180 is structured so that beams of light emitted respectively from laser 181 and laser 182 each being for each color are deflected in terms of optical path by half-mirror 185 and a beam of light from laser 183 is deflected in terms of optical path by mirror 184, and they are further composed to be projected on a recording sheet to write images thereon.

Now, operations to write images will be explained.
1) Operation to supply a recording sheet; Recording sheet P is drawn out of cartridge 112 by roller 113. Simultaneously, positioning exfoliation claw 193 is caused to approach the drum 121.

The leading edge of the recording sheet P is caused to hit positioning exfoliation claw 193 so that the position of the leading edge of the recording sheet P may be regulated. At this moment, the positioning exfoliation claw 193 is separated from the drum 21. The squeeze roller 131 is rotated so that the recording sheet P is sucked by an unillustrated vacuum attractive means to be brought into close contact with the drum while the drum 121 is being rotated at a low speed clockwise in the diagram. After the recording sheet P is conveyed by a prescribed length, it is cut by cutter 111. Now, the squeeze roller 131 leaves the drum 121.

2) Operations to write images: While the drum 121 is rotated at a high speed, a laser beam moves in the direction perpendicular to the page of FIG. 29 to write image signals on the recording sheet P placed on the drum.

3) Operations to eject a recording sheet: Positioning exfoliation claw 193 is caused to approach concave groove 121 C of the drum 121. The drum 121 is rotated reversely by the squeeze roller 131 and the recording sheet P is exfoliated from the drum, and is ejected by roller 114. Then, a color photographic paper representing the recording sheet is processed.

Incidentally, though a color laser writing apparatus has been explained as an image forming apparatus in the embodiment, any of a monochromatic (black and white) laser writing apparatus and one wherein images are written on a plain paper through an ink jet system can be used.

Embodiments 9–10 offer the following effects. Namely, even when a drum is rotated at a high speed, the drum is stable, hardly causing its imbalance and the leading edge of a recording sheet can be positioned accurately without requiring any specific processing on the part of the drum, because there are provided a drum means around which a recording sheet on which an image is recorded is wound to cover its outer circumferential surface, a positioning means to position the leading edge of the recording sheet on the drum means, and a positioning moving means which brings the positioning means into contact with the drum means when positioning the leading edge of the recording sheet on the drum means, and separates the positioning means from the drum means after completion of the positioning.

Even when a drum is rotated at a high speed, the drum is stable, the leading edge of a recording sheet can be positioned accurately and a recording sheet can be in close contact with the drum, because there are provided a drum means around which a recording sheet on which an image is recorded is wound to cover its outer circumferential surface, a positioning means to position the leading edge of the recording sheet on the drum means, a positioning moving means which brings the positioning means into contact with the drum means when positioning the leading edge of the recording sheet on the drum means, and separates the positioning means from the drum means after completion of the positioning, and a squeeze roller means which brings the recording sheet into close contact with the drum means at the position which passes through the contact point between the positioning means and the drum means and is in parallel with a drum axis, and thereby the recording sheet is brought into close contact with the drum by the squeeze roller means at the position where the recording sheet is positioned.

An image recording apparatus can be small in size and a flow of a recording sheet to the succeeding process such as processing including development is smooth, because there are provided a drum means wherein a recording sheet on which an image is recorded is wound around its outer circumferential surface and a rotary central axis is an origin, a horizontal line passing through the origin is an X axis and a vertical line passing through the origin is a Y axis, a writing means wherein a light source for image writing is arranged on the X axis on the part of the first quadrant of coordinates having the X axis and the Y axis, a positioning means to position the leading edge of the recording sheet on the outer circumferential surface of the drum means provided within a range including points on the X axis and the Y axis in the first quadrant, and an exfoliating means which exfoliates the recording sheet on the outer circumferential surface of the drum means provided within a range including points on the X axis and the Y axis in the third quadrant, in an image recording apparatus wherein an image is written on a recording sheet wound around the outer circumferential surface of a drum.

A length of a period time from exfoliation of a recording sheet to the start of supplying the succeeding recording sheet is short especially when the recording sheet is small, resulting in improvement of operating efficiency of an apparatus, because there are provided a drum means around which a recording sheet on which an image is recorded is wound to cover its outer circumferential surface, and a driving means which drives the drum means so that the recording sheet is supplied by the rotation of the drum means in the regular direction and the recording sheet is ejected by the reverse rotation of the drum means.

Cost reduction can be attained by the member which serves both for positioning and exfoliation, because there are provided a drum means around which a recording sheet on which an image is recorded is wound to cover its outer circumferential surface, and a positioning exfoliation means which serves for both positioning of the leading edge of the recording sheet on the drum means and exfoliation of the recording sheet from the drum means.

The leading edge of a recording sheet can surely hit the positioning section because a ring-shaped concave groove is provided at a part on the outer circumferential surface of the drum means and the positioning means touches the concave groove when positioning the leading edge of the recording sheet on the drum means.

Since the shape of a portion of the positioning means which comes close to the drum means is mostly the same as that of the drum in terms of curvature, an exfoliating section of the positioning means is in a shape which it easy to exfoliate, and the portion to come close to the drum can be sufficiently strong and is in a shape which makes it easy to form.

Since the shape of a portion of the positioning exfoliation means which comes close to the drum means is mostly the same as that of the drum in terms of curvature, an exfoliating section of the positioning means is in a shape which it easy to exfoliate, and the portion to come close to the drum can be sufficiently strong and is in a shape which makes it easy to form.

Structures of Item 38 which attain the fourth object of the invention will be explained with reference to Embodiment 11.

Embodiment 11.

An image recording apparatus in the present embodiment is an apparatus for recording latent images on a plate-making photographic film representing a silver halide light-sensitive monochromatic photographic material in which a red sensitive light-sensitive layer is provided wherein plural red beams are generated simultaneously and are arranged in the main scanning direction MSD to be projected, and thereby latent images are recorded on a plate-making photographic film (hereinafter referred to as a recording sheet because this plate-making photographic film corresponds to the recording sheet of the invention in the present embodiment). FIG. 31 is a schematic front view of an image recording apparatus in the present embodiment, FIG. 32 is a schematic side view of an image recording apparatus in the present embodiment and FIG. 33 is a partially enlarged side view of the image recording apparatus shown FIG. 32. The image recording apparatus in the present embodiment will be explained as follows with reference to FIGS. 31, 32 and 33.

In recording head section 1, there are provided light source section 210 in which a plurality (for example, 10 pieces) of laser diodes LD 10–LD 19 are provided to be lined up and beam arranging optical system 220 which causes a plurality of beams emitted from plural laser diodes LD 10–LD 19 to form a line on a recording surface of a plate-making photographic film wound around rotary drum 202 in the main scanning direction MSD.

The rotary drum 202 is one around which a plate-making photographic film is wound to be fixed, and it rotates at a constant speed, when recording images, to move the plate-making photographic film relatively to plural laser beams emitted from plural laser diodes LD 10–LD 19 in the sub-scanning direction SSD. The rotary drum 202 is hollow and is provided thereon with a large number of through holes each penetrating toward the inside of the drum from its surface, and it rotates while holding a recording sheet wound around the rotary drum.

Further, through shaft 228 of the rotary drum 202, the rotary drum 202 is linked with drum-rotating-motor 227 which is for rotating the rotary drum 202 thereby to be rotated by the drum-rotating-motor 227.

The rotary drum 202 is cylindrical in shape with its side on the part of the shaft 28 being covered and with an internal surface of the cylinder on the other side is rotatably supported by disk-shaped holding plate 231 is structured so that no outside air leaks into the inside of the rotary drum 202 except leakage through through-holes penetrating from the circumferential surface to the inside of the drum. A hole provided on the holding plate 231 is connected to decompressing pump 229 which reduces pressure in the rotary drum 202 through pipe 230. When the decompressing pump 229 operates, the inside of the rotary drum 202 is decompressed. On the holding plate 231, there is provided pressure detector 232 which detects the pressure in the inside of the rotary drum 202 around which a recording sheet is wound.

The recording head section 201 is fixed on shaft 212 of actuator 211 and is capable of being moved in the main scanning direction MSD by the actuator 211. Also on the side opposite to the shaft 212, there is provided shaft 213, and shaft holding member 214 which holds the shaft 213 slidably is provided so that recording head section 201 can be moved stably in the main scanning direction MSD. When the recording head 201 moves relatively to the rotary drum 202 in the main scanning direction MSD, latent images are recorded on the whole plate-making photographic film wound around the rotary drum 202 to be fixed thereon.

The rotary drum 202 which is mainly responsible to apparatus vibration is provided on the bottom portion of an apparatus and the recording head section 201 is provided above the rotary drum 202. Due to this, heavy strength members which prevent apparatus vibration can be centralized on the bottom of the apparatus, total weight of the whole apparatus can be reduced, and vibration of the whole apparatus and withstand load strength of a housing can be controlled because the rotary drum 202 that is a main factor of apparatus vibration is provided on the bottom portion of the apparatus. Further, work efficiency of adjusting work such as adjustment of parallelism between the shaft of the rotary drum 202 and the main scanning axis of the recording head section 201 can be improved because the recording head section 201 is arranged above the rotary drum 202. Further, spaces on both sides of the rotary drum 202 in the horizontal direction can be secured, thereby degree of freedom for installation of a mechanism for feeding and ejection of a recording sheet is increased, thus a whole apparatus can be made small in size.

There is provided photoreceptor element 203 on the same plane as of the recording surface of a plate-making photographic film for plural laser beams. When the recording head section 201 moves in the main scanning direction MSD and plural laser beams enter the photoreceptor element 203, the photoreceptor element 203 measures beam intensity of each laser beam emitted from each of plural laser diodes of the light source section 210.

Control section 204 shown in FIG. 34 which is a block diagram of an image recording apparatus in the present embodiment controls, in accordance with beam intensity of each laser beam measured by the photoreceptor element 203, each of plural laser diodes of light source 210 so that beam intensity of each laser beam may be the same.

Incidentally, 10 laser diodes LD 10–LD 19 are provided to form a line at prescribed intervals in the light source 210. These 10 laser diodes LD 10–LD are arranged so that laser beams may be converged to center point CP located on this side of lens 221.

Beam arranging optical system 220 is provided therein with the following items. Lens 221 collimate 10 laser beams emitted from these 10 laser diodes. These 10 laser beams collimated by the lens 221 are reflected at right angles on mirror 222 and they are further reflected at right angles on mirror 223 to enter converging lens section 224. Then, the converging lens section 224 converges the entered 10 laser beams to convergent point CS. Then, 10 laser beams which have passed through the convergent point CS enter reduction optical lens group 225. The reduction optical lens group 225 causes the entered 10 laser beams to be reduced and focused for images on recording surface RS on the recording sheet wound around the rotary drum 202. Then, 10 laser beams emerged from the reduction optical lens group 225 enter cylindrical lens 226. The cylindrical lens 226 is a lens having refractive power only in the sub-scanning direction, and it converges so that positions of the 10 laser beams on the recording surface RS in the sub-scanning direction may be constant, and causes 10 laser beams having the constant beam diameter BR to form a line at constant beam pitches BP in the main scanning direction MSD on the recording surface RS.

When the recording head section 201 moves relatively to the rotary drum 202 by constant movement quantity FQ (=10×BP) in the main scanning direction MSD while the rotary drum 202 makes one turn, latent images are recorded evenly on the whole plate-making photographic film wound around the rotary drum 202 to be fixed thereon. Incidentally, the beam diameter BR and beam pitch BP are in the range from several microns to several tens microns.

The photoreceptor element 203 is one which can detect simultaneously light quantity distribution in the main scanning direction MSD on the recording surface RS like a one-dimensional CCD image pick-up element or a two-dimensional image pick-up element, and it can detect beam intensity of each laser beam emitted from each of plural laser diodes LD 10–LD 19 when the recording head section 201 moves so that a laser beam may enter the photoreceptor element 203. The control section 204 controls each laser diode of plural laser diodes of the light source 210 in accordance with beam intensity of each laser beam measured by the photoreceptor element 203, so that beam intensity of each laser beam may the same each other.

Next, there will be explained a mechanism for cutting a recording sheet contained in magazine 205 to a prescribed size and for winding the recording sheet around the rotary drum 202. In the magazine 205, there is contained a rolled web-shaped recording sheet having a certain width. Feeding section 206 feeds the recording sheet to the rotary drum 202 from the magazine 205, and when the point a prescribed length behind the leading edge on the recording sheet arrives at a cutting position of cutter 262, the cutter 262 is operated to cut the recording sheet at the point a prescribed length behind the leading edge on the recording sheet, and the recording sheet having a prescribed length is wound around the rotary drum 202.

In the feeding section 206, there are provided a pair of feeding rollers 261 and 263 in a way that they the feeding rollers sandwich the cutting position, and feeding is stopped only when a recording sheet is cut by cutter 262 so that cutting to a prescribed length can be conducted stably.

The recording sheet fed by the paired feeding rollers 261 and 263 of the feeding section 206 is led to the rotary drum 2 while being guided by guides 264 and 265. There is further provided squeeze roller 242 which is pressed against the area to which the recording sheet is led by the guides 264 and 265 of the rotary drum 202. When feeding a recording sheet to the rotary drum 202, the squeeze roller 242 is pressed against the rotary drum 202 to press the fed recording sheet so that it may be brought into close contact with the rotary drum 202, and then leaves the rotary drum 202 when the recording sheet has been fed to the rotary drum 202. In the same way as description in Embodiment 4, when supplying a recording sheet to a drum, a drum control means (not shown) controls so that the recording sheet leading edge supplying section 3 on the drum 1 which is not provided with a suction-communicating groove which is in parallel with a side of the leading edge of the recording sheet in the direction to supply the recording sheet to the drum may come to the position to which the leading edge of the recording sheet is supplied.

Further, there is provided step 241 on the circumferential surface of the rotary drum corresponding to the leading edge of a recording sheet. When the squeeze roller 242 is pressed against the point that is in the vicinity of the step 241 on the rotary drum 202 in the case of feeding a recording sheet to the rotary drum 202, the leading edge of the recording sheet hits the step 241 and thereby the leading edge of the recording sheet is positioned at the step 241. Due to this, high accuracy is not required for the pressure contact position of the squeeze roller 242 in the course of feeding a recording sheet to the rotary drum 202, thereby sure and accurate positioning of the leading edge of the recording sheet can be carried out, and exfoliating force caused by an air flow acting on the leading edge of the recording sheet when recording images on the recording sheet wound around the rotary drum 202 can be controlled, thus, it is possible to improve surely the quality of recorded images with a simple structure. It is further possible to reduce sharply the deviation of an edge position of the recording sheet at low cost, to raise the speed for recording on the recording sheet by enhancing the speed of rotation of the rotary drum 202 without lowering quality of the recorded image, and to increase the number of sizes of selectable recording sheets.

The image recording apparatus of the present embodiment is one capable of recording images on recording sheets in plural sizes, wherein control section 204 is connected to size selection input section 247 as shown in FIG. 34, and edge position detecting sensor 243 which detects an edge position of a recording sheet wound around the rotary drum 202 is provided on the outer circumferential surface of the rotary drum 202.

The control section 204 judges whether or not a recording sheet with a size inputted in size selection input section 247 can be supplied from the magazine 205 which is presently set. When the control section 204 judges that a recording sheet with a size inputted in size selection input section 247 can not be supplied from the magazine 205 which is presently set, a display which instructs replacement of the magazine 205 is shown, while when the control section 204 judges that a recording sheet with a size inputted in size selection input section 247 can be supplied from the magazine 205 which is presently set, the control section 204 controls the rotary drum 202 and squeeze roller 242 so that the squeeze roller 242 may be pressed against the portion that is close to step 241 on the rotary drum 202.

Next, feeding section 206 is controlled so that a recording sheet may be cut to a prescribed length corresponding to the inputted size to be fed, and when the leading edge of the recording sheet arrives at step 241, depression pump 229 is operated to depress the inside of the rotary drum 202, then the rotary drum 202 is rotated slowly (at the speed of rotation which is far below that for image recording) and the recording sheet is brought into close contact with the rotary drum 202 while squeeze roller 242 is being pressed against the rotary drum 202, and after the rotary drum 202 has make one turn, the squeeze roller 242 is retreated.

Then, pressure detector 232 detects pressure inside the rotary drum 202 around which a recording sheet is wound.

Then, the edge position detecting sensor 243 detects the edge position of the recording sheet. After that, the control section 204 on which an allowable range for the edge position is set in advance judges whether or not the edge position of the recording sheet detected by the edge position detecting sensor 243 is within the allowable range set in advance. When the control section 204 judges that the edge position is out of the allowable range, the control section 204 controls each section so that the fed recording sheet may be ejected and a succeeding recording sheet may be fed again.

The control section 204 obtains the speed of rotation of the rotary drum 202 in accordance with edge position PE of the recording sheet detected by the edge position detecting sensor 243, pressure inside the rotary drum 202 detected by the pressure detector 232 and with the inputted size SS. Incidentally, on the control section 4, there is provided three-dimensional LUT with which the speed of rotation of the rotary drum 202 can be obtained from variables PE, PD and SS, and the speed of rotation of the rotary drum 202 is obtained by inputting the variables PE, PD and SS in the three-dimensional LUT. Incidentally, LUT data of the three-dimensional LUT can be obtained by experiments.

Drum-rotating-motor 227 is controlled so that the speed of rotation of the rotary drum 202 may represent the obtained speed of rotation, and light source section 210 of recording head 201 is controlled in accordance with the speed of rotation of the rotary drum 202 to control light quantity, emission intervals and emission timing for laser beams emitted from the light source section 210, and further, actuator 211 is controlled in accordance with the speed of rotation of the rotary drum 202 to control the relative movement speed of the recording head 201 in the main scanning direction MSD, thus, images are recorded on the recording sheet wound around the rotary drum 202.

Then, after completion of recording of images on the recording sheet, the control section 204 controls so that the rotary drum 202 rotates slowly, decompressing pump 229 suspends and the recording sheet is ejected by an unillustrated ejecting mechanism.

Due to this, the speed of rotation of the rotary drum 202 is controlled in accordance with the inputted size, the edge position of the recording sheet detected by the edge position detecting sensor 243 and with pressure inside the rotary drum 202 detected by the pressure detector 232. Therefore, suction force which is generated by decompressing pump 229 to be applied to the recording sheet, centrifugal force which varies depending on the speed of rotation of the rotary drum 202 and is applied to the recording sheet and exfoliating force caused by an air current can be balanced excellently, whereby it is possible to increase sharply the number of sizes of selectable recording sheets and to record images on the recording sheet stably with the broadened allowable range for deviation of the edge position of the recording sheet, all without lowering quality of the recorded images.

Next, holes 244 and 245 and communicating grooves 46 all provided on an example of the rotary drum 202 will be explained with reference to FIG. 35 representing a partial development elevation of an example of the rotary drum 202.

Since the leading edge of the recording sheet is caused to hit the step 241 provided on the outer circumferential surface of the rotary drum 202, the recording sheet is positioned mostly to the prescribed position depending on the size of the recording sheet. For example, a recording sheet in the smallest size is positioned mostly to area A1 shown with one-dot chain lines in FIG. 35, a recording sheet in the second size which is the second smallest size is positioned mostly to area A2 shown with one-dot chain lines in FIG. 35, a recording sheet in the third size which is the third smallest size is positioned mostly to area A3 shown with two-dot chain lines in FIG. 35, and a recording sheet in the largest size is positioned mostly to area A4 shown with two-dot chain lines in FIG. 35.

As is apparent from FIG. 35, density of holes 244 provided on the area where the recording sheet is wound in the vicinity of the edge position (the position shown with one-dot chain lines and two-dot chain lines in FIG. 35) of the recording sheet wound around the rotary drum 202 is higher than that of holes 245 provided on the other area, regardless of the size of the recording sheet wound around the rotary drum 202. Due to this, it is possible to raise, at low cost, suction force which is generated by decompressing pump 229 and is applied to the recording sheet, to raise the speed of recording on the recording sheet by enhancing the speed of rotation of the rotary drum 202, and further to record images on the recording sheet stably without lowering quality of the recorded images with the broadened allowable range for deviation of the edge position of the recording sheet.

A large number of communicating grooves which communicate plural holes are provided on the circumferential surface of the rotary drum 202. As is clear from FIG. 35, there is no communicating groove striding the edge position (the position shown with one-dot chain lines and two-dot chain lines in FIG. 35) of the recording sheet wound around the rotary drum 202, regardless of the size of the recording sheet wound around the rotary drum 202, and density of grooves 246 provided on the other area is high. Due to this, it is possible to control, at low cost, that air leaks through communicating grooves 246, to enhance suction force which is generated by decompressing pump 229 and is applied to the recording sheet, to raise the speed of recording on the recording sheet by enhancing the speed of rotation of the rotary drum 202, and further to record images on the recording sheet stably without lowering quality of the recorded images with the broadened allowable range for deviation of the edge position of the recording sheet.

Next, holes 244 and 245 and communicating grooves 246 all provided on another example of the rotary drum 202 will be explained with reference to FIG. 35 representing a partial development elevation of another example of the rotary drum 202. Points different from those in the example shown in FIG. 35 include that density of holes 44 provided on the area where the recording sheet is wound in the vicinity of the edge position of the recording sheet on area A1 is higher than that of holes 44 provided on the area where the recording sheet is wound in the vicinity of the edge position of the recording sheet on area A2 or area A3 other than area A1, and density of holes 244 provided on the area where the recording sheet is wound in the vicinity of the edge position of the recording sheet on area A2 or area A3 other than area A1 is higher than that of holes 244 provided on the area where the recording sheet is wound in the vicinity of the edge position of the recording sheet on the area A4 other than area A3.

In this way, compared with the preceding example, the number of holes which do not contribute to density of a recording sheet but only inhale the outside air is less and the smallest recording sheet can be brought into closed contact more firmly when the smallest recording sheet is wound around the rotary drum 22.

Embodiment 11 offers the following effects.

Suction force which is generated by the decompressing means to be applied to the recording sheet and varies depending on the size of a recording sheet, centrifugal force which varies depending on the speed of rotation of the rotary drum and is applied to the recording sheet and exfoliating force caused by an air current can be balanced excellently, whereby it is possible to increase sharply the number of sizes of selectable recording sheets without lowering quality of the recorded images.

Even when the edge position of the recording sheet is changed, suction force which is generated by the decompressing means to be applied to the recording sheet, centrifugal force which varies depending on the speed of rotation of the rotary drum and is applied to the recording sheet and exfoliating force caused by an air current can be balanced excellently, whereby it is possible to broaden an allowable range for deviation of the edge position of the recording sheet, without lowering quality of the recorded images.

Suction force which is generated by the decompressing means to be applied to the recording sheet and is changed depending on pressure inside the rotary drum, centrifugal force which varies depending on the speed of rotation of the rotary drum and is applied to the recording sheet and exfoliating force caused by an air current can be balanced excellently, whereby it is possible record images on the recording sheet stably with a simple mechanism without lowering quality of the recorded images.

It is possible to raise, at low cost, the speed for recording on the recording sheet by increasing suction force which is generated by the decompressing means and is applied to the recording sheet and thereby by enhancing the speed of rotation of the rotary drum, whereby it is possible to record images on the recording sheet stably without lowering quality of the recorded images.

It is possible to control, at low cost, that air leaks through communicating grooves, thereby to enhance suction force which is generated by the decompressing means and is applied to the recording sheet, thus the speed of rotation of the rotary drum can be raised and thereby the speed for recording on the recording sheet can be enhanced. Further, the allowable range of deviation for edge position of the recording sheet can be broadened, and images can be recorded stably on the recording sheet without lowering quality of the recorded images.

Since the rotary drum which is mainly responsible to apparatus vibration is installed on the bottom portion of the apparatus, heavy strength members which prevent the apparatus vibration can be concentrated on the bottom portion of the apparatus, and the total weight of the apparatus can be lightened, and vibration of the total apparatus and withstand load strength of the casing can be controlled. Further, since the recording head is arranged over the rotary drum, work efficiency of adjusting work such as adjustment of parallelism between the shaft of the rotary drum and the main scanning axis of the recording head can be improved sharply. Further, spaces on both sides of the rotary drum in the horizontal direction can be secured, thereby degree of freedom for installation of a mechanism for feeding and ejection of a recording sheet is increased, thus a whole apparatus can be made small in size.

Positional accuracy for the pressure contact position of a squeeze roller is not required to be high in the case of feeding a recording sheet to the rotary drum, and still the leading edge of the recording sheet can be positioned surely and accurately, and it is possible to control exfoliating force caused by an air current acting on the edge of the recording sheet when recording images on the recording sheet wound around the rotary drum, and thereby it is possible to improve quality of recorded images stably with a simple structure.

What is claimed is:

1. An image recording apparatus for recording an image on a recording sheet wound around an outer circumferential surface of a drum, comprising:

the drum rotatable while retaining the recording sheet wound around the outer circumferential surface thereof, the drum comprising a plurality of through holes to suck the recording sheet, connecting grooves provided on the outer circumferential surface of the drum so as to connect among the plurality of through holes, a rotation axis on which the drum rotates, and a leading end supply section at which the leading end of the recording sheet is supplied onto the outer circumferential surface of the drum, wherein the connecting grooves shaped in parallel to the rotation axis are not provided on the outer circumferential surface of the leading end supply section, and drum control means for controlling a position of the circumferential surface of the drum so as to supply the leading end of the recording sheet to the leading end supply section when the recording sheet is supplied to the drum.

2. The image recording apparatus of claim 1, wherein the connecting grooves are not provided to the leading end supply section.

3. The image recording apparatus of claim 1, wherein connecting grooves shaped in vertical or diagonal to the rotation axis are provided to the leading end supply section.

4. The image recording apparatus of claim 1, wherein the leading end supply section comprises an adhesive member to adhere to the leading end of the recording sheet so that the position of the recording sheet on the circumferential surface of the drum is determined.

5. The image recording apparatus of claim 1, wherein the leading end supply section comprises a positioning groove shaped in vertical to a recording sheet supplying direction and the leading end of the recording sheet is hooked in the positioning groove so that the position of the recording sheet on the circumferential surface of the drum is determined.

6. The image recording apparatus of claim 1, further comprising a peeling member to come in contact with the recording sheet wound on the circumferential surface of the drum from an outside of the drum and to peel the recording sheet.

7. The image recording apparatus of claim 6, wherein the peeling member peels the recording sheet by adhesion.

8. The image recording apparatus of claim 6, wherein the peeling member peels the recording sheet by electrostatic attraction.

9. The image recording apparatus of claim 6, wherein the peeling member peels the recording sheet by vacuum suction.

10. The image recording apparatus of claim 6, wherein the peeling member peels the recording sheet by coming in contact with the edge of the recording sheet.

11. The image recording apparatus of claim 6, wherein the peeling member is a peeling roller.

12. The image recording apparatus of claim 11, further comprising a peeling helping member to come in contact with the recording sheet peeled by the peeling member and to peel the recording sheet from the peeling member.

13. The image recording apparatus of claim 12, wherein a ring-shaped groove is provided on a part of the circumferential surface of the peeling roller, the peeling helping member has a protrusion and the peeling helping member engages the protrusion in the groove of the peeling roller so as to peel the recording sheet from the peeling roller.

14. The image recording apparatus of claim 13, wherein the peeling roller comprises plural rollers arranged in tandem on a shaft and the peeling helping member is a plate teethed so as to conform with the configuration of the plural rollers arranged in tandem.

15. The image recording apparatus of claim 11, wherein the peeling roller is a peeling squeezing roller and, when the recording sheet is supplied to the drum, the peeling squeezing roller come in contact with the recording sheet on the circumferential surface of the drum so that the recording sheet is brought in close contact with the circumferential surface of the drum.

16. The image recording apparatus of claim 15, wherein, when the recording sheet is peeled from the drum, the peeling squeezing roller peels the recording sheet with electrostatic attraction, and when the recording sheet is supplied to the drum, the peeling squeezing roller releases the electrostatic attraction and brings the recording sheet in close contact with the circumferential surface of the drum.

17. The image recording apparatus of claim 15, wherein when the recording sheet is peeled from the drum, the peeling squeezing roller peels the recording sheet with vacuum suction, and when the recording sheet is supplied to the drum, the peeling squeezing roller releases the vacuum suction and brings the recording sheet in close contact with the circumferential surface of the drum.

18. The image recording apparatus of claim 15, wherein when the recording sheet is peeled from the drum, the peeling squeezing roller peels the recording sheet with vacuum suction, and when the recording sheet is supplied to the drum, the peeling squeezing roller blows air through its circumferential surface and brings the recording sheet in close contact with the circumferential surface of the drum.

19. The image recording apparatus of claim 11, further comprising a conveying roller to convey the recording sheet, wherein the conveying roller is constructed so as to form a pair of rollers with the peeling roller and wherein when the recording sheet is peeled from the drum, the peeling roller peels the recording sheet with electrostatic attraction, when the recording sheet is held between the peeling roller and the conveying roller, the peeling roller releases the electrostatic attraction.

20. The image recording apparatus of claim 11, further comprising a conveying roller to convey the recording sheet, wherein the conveying roller is constructed so as to form a pair of rollers with the peeling roller and wherein when the recording sheet is peeled from the drum, the peeling roller peels the recording sheet with vacuum suction, when the recording sheet is held between the peeling roller and the conveying roller, the peeling roller releases the vacuum suction.

21. The image recording apparatus of claim 11, further comprising a conveying roller to convey the recording sheet, wherein the conveying roller is constructed so as to form a pair of rollers with the peeling roller and is shiftable so as to come in press contact with or to be spaced from the peeling roller.

22. The image recording apparatus of claim 6, wherein when the peeling member peels the recording sheet from the drum, the drum releases the vacuum suction.

23. The image recording apparatus of claim 6, wherein the peeling member peels the recording sheet from the drum by vacuum suction, and wherein when one of the drum and the peeling member conducts the vacuum suction, the other one releases the vacuum suction.

24. The image recording apparatus of claim 23, wherein when the peeling member peels the recording sheet from the drum, the drum blows air through the circumferential surface of the drum, when the recording sheet is supplied to the drum, the peeling member blows air, and wherein when one of the drum and the peeling member conducts vacuum suction, the other one blows air.

25. The image recording apparatus of claim 6, wherein when the recording sheet is supplied to the drum, the peeling member blows air to the recording sheet on the circumferential surface of the drum.

26. The image recording apparatus of claim 6, wherein when the peeling member peels the recording sheet from the drum, the drum blows air through the circumferential surface of the drum.

27. The image recording apparatus of claim 1, further comprising means for conducting scanning exposing on the recording sheet while rotating the drum around which the recording sheet is wound.

28. The image recording apparatus of claim 1, wherein the image is recorded on the recording sheet while rotating the drum around which the recording sheet is wound, and the drum is rotated 300 revolutions per minutes or more during the image recording.

29. The image recording apparatus of claim 1, further comprising positioning means for determining the position of the leading end of the recording sheet on the circumferential surface of the drum, and shifting means for shifting the positioning means so that the positioning means is brought in contact with the drum when the position of the leading end of the recording sheet is determined or is moved away from the drum after the position determination is completed.

30. The image recording apparatus of claim 29, further comprising a squeeze roller to bring the recording sheet in close contact with the drum, wherein the squeeze roller is provided in the vicinity of a position which is parallel to the axis of the drum on a contacting point between the position determining section of the positioning means and the circumferential surface of the drum.

31. The image recording apparatus of claim 1, further comprising, in the coordinates that the rotation axis of the drum is the origin, the horizontal line passing through the origin is X-axis and the vertical line passing through the origin is Y-axis, image writing means for recording an image with light on the recording sheet, the image writing means provided on the X-axis on the first quadrant in the coordinates;

positioning means for determining the position of the leading end of the recording sheet on the circumferential surface of the drum, the positioning means provided in the region including the X-axis and the Y-axis on the first quadrant in the coordinates; and peeling means for peeling the recording sheet wound around the circumferential surface of the drum, the peeling means provided in the region including the X-axis and the Y-axis on the third quadrant in the coordinates.

32. The image recording apparatus of claim 1, further comprising drum driving means for driving the drum such that the recording sheet is supplied from its leading end toward the drum when the drum is rotated in the regular direction and the recording sheet is removed from its trailing end from the drum when the drum is rotated in the reverse direction.

33. The image recording apparatus of claim 1, further comprising positioning peeling means for determining the position of the leading end of the recording sheet on the circumferential surface of the drum and for peeling the trailing end of the recording sheet from the circumferential surface of the drum.

34. The image recording apparatus of claim 29, wherein the drum is provided with a ring U-shaped groove on its outer circumferential surface and the positioning means engages with the U-shaped groove so as to determine the position of the leading end of the recording sheet on the circumferential surface of the drum.

35. The image recording apparatus of claim 29, wherein the positioning means has a portion coming close to the drum and the portion has a substantially same curvature as that of the drum.

36. The image recording apparatus of claim 1, further comprising:
first drum driving means for rotating the drum at an image writing rotating speed during image writing;
squeezing roller for bringing the recording sheet in close contact with the drum;
shifting means for shifting the squeezing roller to a close contacted position or to a separated position for the drum; and
second drum driving means for rotating the drum through the squeezing roller at a speed lower than the image writing rotating speed when the recording sheet is supplied to the drum or when the recording sheet is peeled from the drum.

37. The image recording apparatus of claim 1, further comprising:
squeezing roller for bringing the recording sheet in close contact with the drum,
wherein at least an outer circumferential surface of the squeezing roller other than the surface contacting with the recording sheet comes in pressure contact with an outer circumferential surface of the drum other than the surface around which the recording sheet is wound, and wherein the drum is rotated by the driving force of the squeezing roller or the squeezing roller is rotated by the driving force of the drum.

38. The image recording apparatus of claim 1, wherein an image writing rotating speed of the drum is changed in accordance with the size of the recording sheet wound around the drum.

39. The image recording apparatus of claim 1, further comprising:
edge position detecting means for detecting an edge of the recording sheet wound around the drum,
wherein an image writing rotating speed of the drum is changed in accordance with the edge position of the recording sheet detected by the edge position detecting means.

40. The image recording apparatus of claim 1, further comprising:
pressure detecting means for detecting an inside pressure of the drum when the recording sheet is wound around the drum,
wherein an image writing rotating speed of the drum is changed in accordance with the inside pressure of the drum detected by the pressure detecting means.

41. The image recording apparatus of claim 1, wherein an density of the through holes provided on a region of the drum, around which the recording sheet is wound, in the vicinity of the edge position of the wound recording sheet is higher than that provided on the other region of the drum.

42. The image recording apparatus of claim 1, wherein the density of the suctioning connecting grooves in the vicinity of the edge position of the recording sheet wound around the drum is lower than that provided on the other region of the drum.

43. The image recording apparatus of claim 1, wherein the suctioning connecting grooves are not provided so as to cross the edge position of the recording sheet wound around the drum.

44. The image recording apparatus of claim 1, further comprising:
image writing means for recording the image on the recording sheet wound around the drum, wherein the drum is located at an bottom section of the apparatus and the image writing means is provided above the drum.

45. The image recording apparatus of claim 1, further comprising:
a squeezing roller for pressing the recording sheet onto the drum when the recording sheet is supplied to the drum so that the recording sheet is brought in close contact with the circumferential surface of the drum,
wherein the drum provided with a step on the circumferential surface of the drum in parallel to the rotation axis of the drum; and the drum control means control the position of the drum such that the leading end of the recording sheet is brought in contact with the step of the drum when the recording sheet is supplied to the drum.

46. The image recording apparatus of claim 45, wherein when the recording sheet is supplied to the drum, the drum control means control the position of the drum such that the leading end of the recording sheet is brought in contact with the step of the drum when the squeezing roller is pressed in the vicinity of the step.

* * * * *

UNITED STATES PATENT AND TRADEMARK OFFICE
CERTIFICATE OF CORRECTION

PATENT NO. : 6,088,081
DATED : July 11, 2000
INVENTOR(S) : Masato Doi

It is certified that error appears in the above-identified patent and that said Letters Patent is hereby corrected as shown below:

Column 15,
Line 50, after "drum" insert -- and --

Column 16,
Line 52, delete "simultaneously" and insert therefor -- Simultaneously --

Column 21,
Line 14, after "roller" delete "15" and insert therefor -- 9 --
Line 17, after "roller" (second occurrence) delete "15" and insert therefor -- 9 --

Column 48,
Line 29, after "has" delete "make" and insert therefor -- made --

Column 51,
Line 7, after "possible" insert -- to --

Column 53,
Line 4, after "roller" delete "come" and insert therefor -- comes --

Column 54,
Line 21, after "per" delete "minutes" and insert therefor -- minute --

Column 56,
Line 9, after "wherein" delete "an" and insert therefor -- a --
Line 27, after "at" delete "an" and insert therefor -- a --

Signed and Sealed this

Twenty-seventh Day of January, 2004

JON W. DUDAS
*Acting Director of the United States Patent and Trademark Office*